United States Patent
Jin et al.

(10) Patent No.: US 8,257,662 B2
(45) Date of Patent: Sep. 4, 2012

(54) PROCESS FOR PRODUCING NANOSTRUCTURE COMPOSITE-COVERED STRUCTURE, NANOSTRUCTURE COMPOSITE-COVERED STRUCTURE, AND REACTOR USING NANOSTRUCTURE COMPOSITE-COVERED STRUCTURE

(75) Inventors: Ren-Hua Jin, Tokyo (JP); Jian-Jun Yuan, Sakura (JP)

(73) Assignees: Kawamura Institute of Chemical Research, Sakura-shi (JP); DIC Corporation, Tokyo (JP)

( * ) Notice: Subject to any disclaimer, the term of this patent is extended or adjusted under 35 U.S.C. 154(b) by 288 days.

(21) Appl. No.: 12/675,959

(22) PCT Filed: Sep. 1, 2008

(86) PCT No.: PCT/JP2008/065646
§ 371 (c)(1),
(2), (4) Date: Mar. 1, 2010

(87) PCT Pub. No.: WO2009/031489
PCT Pub. Date: Mar. 12, 2009

(65) Prior Publication Data
US 2010/0215555 A1 Aug. 26, 2010

(30) Foreign Application Priority Data

Sep. 3, 2007 (JP) ................................. 2007-227627
Dec. 26, 2007 (JP) ................................. 2007-334052
Feb. 28, 2008 (JP) ................................. 2008-047671

(51) Int. Cl.
*B01J 8/02* (2006.01)
*B01J 35/02* (2006.01)
*G11B 5/64* (2006.01)

(52) U.S. Cl. ........ 422/222; 422/211; 977/700; 977/840; 428/336

(58) Field of Classification Search .................. 422/211, 422/222; 977/700, 840; 428/336
See application file for complete search history.

(56) References Cited

U.S. PATENT DOCUMENTS
4,861,441 A 8/1989 Saito et al.
(Continued)

FOREIGN PATENT DOCUMENTS
JP 63-153295 A 6/1988
(Continued)

OTHER PUBLICATIONS

Japanese Office Action dated Apr. 30, 2009, issued in corresponding Japanese Patent Application No. 2007-227627.
(Continued)

*Primary Examiner* — Walter D Griffin
*Assistant Examiner* — Lessanework Seifu
(74) *Attorney, Agent, or Firm* — Westerman, Hattori, Daniels & Adrian, LLP

(57) ABSTRACT

The present invention provides a structure in which the surface of a solid substrate of any shape is covered with metal oxide, in particular, a nanostructure composite in which polyethyleneimine, which is an organic substance, and metal oxide, which is an inorganic substance, are combined in nanometer scale, spreads at the entire surface of a substrate, and the nanostructure composite forms a nano-boundary of complex shapes so as to thoroughly cover the entire surface of the substrate; a structure in which metal ions, metal nano-particles, organic pigment molecules are contained in the nanostructure composite; a process for producing these structures which can produce these structures with ease and efficiently; and an application method for the structures as an immobilized catalyst type reactor.

6 Claims, 35 Drawing Sheets

U.S. PATENT DOCUMENTS

| | | | |
|---|---|---|---|
| 5,011,744 | A | 4/1991 | Saito et al. |
| 6,838,160 | B2 * | 1/2005 | Sasaki et al. ............. 428/220 |
| 2007/0166472 | A1 | 7/2007 | Jin et al. |
| 2007/0197708 | A1 | 8/2007 | Jin et al. |
| 2009/0155591 | A1 | 6/2009 | Jin et al. |

FOREIGN PATENT DOCUMENTS

| | | | |
|---|---|---|---|
| JP | 2001-270022 | A | 10/2001 |
| JP | 2005-264421 | A | 9/2005 |
| JP | 2005-336440 | A | 12/2005 |
| JP | 2006-063097 | A | 3/2006 |
| JP | 2007-051056 | A | 3/2007 |
| JP | 2007-161755 | A | 6/2007 |
| JP | 3972053 | B2 | 9/2007 |
| WO | 2005/078021 | A1 | 8/2005 |
| WO | 2005/116140 | A1 | 12/2005 |
| WO | 2006/011512 | A1 | 2/2006 |

OTHER PUBLICATIONS

Japanese Office Action dated Apr. 30, 2009, issued in corresponding Japanese Patent Application No. 2007-334052.

Japanese Office Action dated Jan. 12, 2010, issued in corresponding Japanese Patent Application No. 2008-047671.

Jin, Ren-Hua; "Self-Assembly of Porphyrin-Centered Amphiphilic Star Block Copolymer into Polymeric Vesicular Aggregates"; Macromolecular Chemistry and Physics, vol. 204, pp. 403-409, (2003).

Jin, Ren-Hua; "Colloidal crystalline polymer generated in situ from growing star poly(oxazolines)"; Journal of Materials Communication Chemistry; vol. 13, pp. 672-675, (2003).

Jin, Ren-Hua et al.; "Porphyrin-centered Water-solube Star-shaped Polymers: Poly(N-acetylethylenimine) and Poly(ethylenimine) Arms"; Journal of Porphyrins and Phthalocyanines, vol. 3, pp. 60-64, (1999).

B.C. Bunker et al. "Ceramic Thin-Film Formation on Functionalized Interfaces Through Biomimetic Processing," Science, Apr. 1, 1994, pp. 48-55, vol. 264.

Jessica L. Defreese et al. "Synthesis of a Confined Class of Chiral Organic Catalysts via Bulk Imprinting of Silica," Chemistry of Materials, Dec. 27, 2005, pp. 6503-6506, vol. 17, No. 26.

Edimar Deoliveira et al. "Ethylenediamine Attached to Silica as an Efficient, Reusable Nanocatalyst for the Addition of Nitromethane to Cyclopentenone," Journal of Molecular Catalysis, 2007, pp. 63-69, A:Chemical 271.

Anke Dutschke et al. "Preparation of TiO2 Thin Films on Polystyrene by Liquid Phase Deposition," Journal of Materials Chemistry, 2003, pp. 1058-1063, No. 13.

Diana D. Glawe et al. "Polypeptide-Mediated Silica Growth on Indium Tin Oxide Surfaces," Langmuir, 2005, pp. 717-720, vol. 21, No. 2.

Japanese Office Action dated Apr. 24, 2007, issued in patent application No. 2007-227627.

Japanese Office Action dated Jul. 27, 2007, issued in patent application No. 2007-227627.

Dong J. Kim et al. "Biomimetic Formation of Silica Thin Films by Surface-Initiated Polymerization of 2-(Dimethylamino) ethyl Methacrylate and Silicic Acid," Langmuir, 2004, pp. 7904-7906, vol. 20, No. 19.

C. Paun et al. "Supported and Liquid Phase Task Specific Ionic Liquids for Base Catalysed Knoevenagel Reactions", Journal of Molecular Catalysis, 2007, pp. 64-71, A:Chemical 269.

International Search Report of PCT/JP2008/065646, mailing date of Nov. 18, 2008.

Sarah L. Poe et al, "Microcapsule Enabled Multicatalyst System," Journal of the American Chemical Society, 2006, pp. 15586-15587, vol. 128, No. 49.

Suvarchala D. Pogula et al. "Continuous Silica Coatings on Glass Fibers via Bioinspired Approaches," Langmuir, 2007, pp. 6677-6683, vol. 23, No. 12. Cited in ISR.

Takashi Sakai et al. "Processing and Functional Evaluation of Titanium Thin Films for Biomimetic Micro Actuator," JSME International Journal, 2005, pp. 451-457, vol. 48, No. 4.

* cited by examiner

PROCESS FOR PRODUCING NANOSTRUCTURE COMPOSITE-COVERED STRUCTURE, NANOSTRUCTURE COMPOSITE-COVERED STRUCTURE, AND REACTOR USING NANOSTRUCTURE COMPOSITE-COVERED STRUCTURE

TECHNICAL FIELD

The present invention relates to a nanostructure composite-covered structure, in which a surface of a solid substrate of any shape is closely covered with a nanostructure composite in which a polymer containing a polyethyleneimine skeleton and metal oxide are composited at nano-meter scale, a process for producing the nanostructure composite-covered structure, and a reactor which is the nanostructure composite-covered structure.

BACKGROUND ART

In the technical development of structures having a hierarchical structure, in which an organic compound and an inorganic compound are highly composited, a biomimetic approach has been particularly focused upon. In biological systems, a mineral compound (for example, metal oxide such as silica) is orientated along the organizational structure of a biological polymer (for example, protein, and polyamine) to form a sophisticated organization of an organic-inorganic composite. Therefore, a deposition method involving silica, titania, etc. using an organic polymer, in particular, basic polyamines, brings new possibilities for making the organic-inorganic composite having a hierarchical structure. Due to this, this method has received much attention from material science technical fields.

For example, the present inventors, etc. have found that a nanostructure containing metal oxide having various complex shapes, such as a nano-fiber is produced using a special molecular aggregate which is generated by a linear polyethyleneimine made of secondary amine in an aqueous solvent as a participation field of the metal oxide, and the process for producing the same (For example Patent Documents Nos. 1 to 4). After the polymers having the linear polyethyleneimine skeleton are spontaneously aggregated in water, and a source solution of the metal oxide is mixed into the solution containing the aggregates, the metal oxide is condensed selectively on the surface of the polymer aggregates hydrolytically. Due to this, the nanostructure, in which the polymer and the metal oxide are composited, is produced. The present inventors, etc have made the invention by finding these phenomena. This process is very effective for controlling the structure of the nanostructure in which an organic compound and an inorganic compound are highly composited. However, this process is only capable of depositing allowing the nanostructure composite to deposit in a solution.

On the other hand, as a method for producing a silica film on the surface of a solid material, a method for imitating biological silica, such as diatoms has been examined. Basically, this method is a method in which polyamines which work as a catalyst are fixed on the surface of a substrate by adsorption or chemical bonding, and silica is deposited generates thereon. For example, it has been reported that a molecular residue capable of starting a radical polymerization is fixed on the surface of gold, a radical polymerizable monomer having an amino group (for example, N,N-dimethylaminoethyl methacrylate) is radically polymerized with the molecular residue, the obtained plural poly(N,N-dimethylaminoethyl methacrylate) are formed on the surface of the gold such that they stand like bristles on a brush, and alkoxysilane is hydrolyzed and condensed on the amine polymer brush to form a film made of a composite of silica and a polymer (for example, Non-Patent Document No. 1). The surface of the obtained composite film is not flat. The surface is uneven and is made by arranging randomly silica particles, and is not made of dedicated patterns.

In addition, for example, it has also been reported that when poly(L-lysine) is used as polyamine, a copper plate is used as an anode, indium tin oxide (ITO) in a plate shape is used as a cathode, an aqueous poly(L-lysine) solution is added between the anode and the cathode, and an electrical field is applied, the poly(L-lysine) is adsorbed onto the ITO, and the ITO is immersed into a silicic acid solution, and silica generates on the surface of the ITO (for example, Non-Patent Document No. 2). The silica on the surface of the ITO which is produced by this method has basically a flake shape. However, a uniform film cannot be obtained. In other words, only a specific portion has a dense flake structure, and there are partial flakes of silica on the surface of the ITO in total. Furthermore, it has been reported that a glass stick is immersed into a basic polymer solution, such as poly(L-lysine), poly(L-lysine-tyrosine), and poly(arylamine), the basic polymer is adsorbed onto the surface of the glass stick, the glass stick is immersed into an aqueous silicic acid solution, and thereby silica can deposited on the surface of the glass stick (for example, Non-Patent Document No. 3). There is a grainy silica film on the surface of the glass stick. However, there are no characteristics for showing an existence of a nanostructure composite, and the glass stick looks like it is coated with silica.

A technique for easily producing a titanium oxide film, in which titania is focused as metal oxide, a titanium oxide source in a solution is deposited on the surface of a solid, has been developed (for example, Non-Patent Documents Nos. 4 to 6). This method is a method in which a so-called self-assembled monolayer (SAMs) is generally produced on the surface of a solid substrate, and the substrate is dipped into a titanium source solution, thereby a titanium oxide film is produced through a process of adsorbing titanium oxide crystals onto the SAMs. In this method, a plastic substrate or a silicone wafer can be used as the solid substrate. However, in both substrates, it is necessary to plant closely chemical function groups, such as —$SO_3H$, —COOH, —OH, and —NH, on the surface of the solid substrates. These functional groups promote the crystal growth of the titanium oxide at nano-meter scale as a crystal core, and result in forming a continuous film made of titanium oxide crystals in nano-meter scale.

The titanium oxide film produced by these methods is absolutely a continuous film made of titanium oxide crystals themselves, and is not a film in which titanium oxide is highly combined with an organic compound. In addition, these methods cannot form a film of which the complex hierarchical structure is controlled programmatically. The SAMs on the surface of the solid substrate only work to fix the inorganic crystals, and do not exert other additional functions.

As explained above, although it is possible to fix polyamines on the surface of the substrate, and deposite silica or titania, it has not been possible to cover uniformly the substrate with a nanostructure composite having a controlled structure.

Since polyamines have basic properties, polyamines works as a catalyst in various reactions. When polyamines are used as a catalyst, polyamines have been used as a solid catalyst in view of separation from products and reuse thereof. For example, various solid catalysts, such as a catalyst in which polyamine or an organic basic compound is fixed on the surface of silica with a chemical bond (for example, Non-Patent Documents, Nos. 7 and 8), a solid catalyst in which an amine residue is fixed into mesoporous silica (for example, Non-Patent Document, No. 9), have been suggested.

The solid catalyst in Non-Patent Documents, Nos. 7 to 9 is characterized by chemically bonding a part of the compound having catalytic functions with the surface of the solid. Therefore, when the solid catalyst is reused, the compound having catalytic functions fixed on the surface of the solid easily changes its structure. Therefore, the catalytic activity is always decreased, and it is necessary to increase the amount of the solid catalyst used. Due to this, in general, it is difficult to use the basic solid catalyst disclosed in Non-Patent Documents, Nos. 7 to 9, etc, in industrial production.

In contrast to fixing a catalyst on the surface of a solid, a method in which molecules of the compound having catalytic functions are put in a polymer capsule has been suggested (for example, Non-Patent Document, No. 10). The catalyst produced by this method does not decrease its catalytic activity when it is reused. However, when it is used repeatedly, it is not simple to recover, compared with the solid catalyst.

When basic polyamines are used as a catalyst, if the catalyst works as a molecular catalyst, and is kept as a solid, it can be anticipated that the catalyst provides various benefits, such as improvement of catalytic activity, simplicity of separation and recovery, improvement of reuse efficiency, etc. These benefits bring advantages such as a decrease of environmental load, cost of production, etc. The most ideal catalyst is an immobilized catalyst type reactor in which a composition having catalytic functions is fixed to a reaction vessel or a reaction tube in nano-meter scale, which is expected to have superior catalytic efficiency because of having large specific surface area, and after reaction, the reaction solution is removed, and new reaction material can be put into the reaction vessel or the reaction tube. However, such reactors have not been found yet.

Patent Document No. 1: Japanese Unexamined Patent Application, First Publication No. 2005-264421

Patent Document No. 2: Japanese Unexamined Patent Application, First Publication No. 2005-336440

Patent Document No. 3: Japanese Unexamined Patent Application, First Publication No. 2006-063097

Patent Document No. 4: Japanese Unexamined Patent Application, First Publication No. 2007-051056

Non-Patent Document No. 1: Don Jin Kim et al., Langmure, 2004, the 20th volume, pages 7904 to 7906

Non-Patent Document No. 2: D. D. Glawe et al., Langmure, 2005, the 21st volume, page 717720

Non-Patent Document No. 3: S. D. Pogula et al., Langmure, 2007, the 23rd volume, page 66776683

Non-Patent Document No. 4: Anke Dutschke et al., J. Master. Chem., 2003, 13, pages 1058 to 1063

Non-Patent Document No. 5: Takahashi Sakai et al., JSME International Journal Series A., 2005, 48, pages 451-457

Non-Patent Document No. 6: B. C. Bunker et al., Science, 1994, 264, pages 48-55

Non-Patent Document No. 7: J. L. Defreese et al., Chem. Mater., 2005, the 17th, page 6503

Non-Patent Document No. 8: C. Paun et al., J. Mol. Cat. A: Chem., 2007, 269th, page 6

Non-Patent Document No. 9: E. DeOliveira et al., J. Mol. Cat. A: Chem., 2007, the 271st, page 63

Non-Patent Document No. 10: Sarah L. Poe et al., J AM. CHEM. SOC., 2006, the 128th, page 15586

DISCLOSURE OF THE INVENTION

Problems to be Solved by the Present Invention

The problems to be solved by the present invention are to provide a structure in which the surface of a solid substrate of any shape is covered with metal oxide, in particular, a nanostructure composite in which polyethyleneimine, which is an organic substance, and metal oxide, which is an inorganic substance, are combined in nano-meter scale, spreads over the entire surface of a substrate, and the nanostructure composite forms a nano-boundary of complex shapes so as to thoroughly cover the entire surface of the substrate; a structure in which metal ions, metal nano-particles, organic pigment molecules are contained in the nanostructure composite; a process for producing these structures which can produce these structures with ease and efficiently; and an application method for the structures as an immobilized catalyst type reactor.

Means for Solving the Problem

The inventors, etc. of the present invention have already suggested that metal oxides is deposited spontaneously by growing crystalline aggregates of a polymer having a polyethyleneimine skeleton in a solution, after obtaining the crystalline aggregates, adding and mixing a source solution of the metal oxide into a dispersing solution containing the resulting crystalline aggregates to perform a sol-gel reaction only the surface of the crystalline aggregates. It is believed that when the growth of the crystalline aggregates of the polymer having a polyethyleneimine skeleton in a solution can proceed on the surface of a solid substrate of any shape, and a layer of the polymer crystalline aggregates can be formed on the substrate, it is possible to provide a structure having a new boundary, in which metal oxide and a polymer are composited, on the solid substrate. By further expanding this working model, when the layer formed on the solid substrate is a stable layer made of non-crystalline molecule aggregates of a polymer having a polyethyleneimine skeleton, not made of polymer crystalline aggregates, it would be possible to form a new nano-boundary in which the objective metal oxide and a polymer are composited.

That is, basic problems to achieve the object are how to form a stable layer (a film) made of the self-organized aggregates of the polymer having a polyethyleneimine skeleton on the surface of the solid substrate. Great characteristics of the polymer having a polyethyleneimine skeleton are basic, and having an extremely high polarity. Therefore, the polymer having a polyethyleneimine skeleton has strong interaction force (adhesion) between the surface of substrates made of electron acceptors, such as metal substrates, glass substrates, inorganic metal oxide substrates, plastic substrates having a polar surface, and cellulose substrates; Lewis acidic substrates; acidic substrates: polar substrates: substrates having hydrogen bonding, etc. The inventors of the present invention found that by taking these advantages of the polymer, when the surface of the solid substrate of any shape is contacted with (immersed into) a molecular solution of a polymer having a polyethyleneimine skeleton with a specific concentration at a specific temperature, the polymer in the solution is adsorbed to the surface of the substrate, and thereby, a layer made of the molecular aggregates of the polymer can be formed at the entire surface of the solid substrate where the molecular solution is contacted. In addition, they have also found that a solid substrate could be covered with a complex nanostructure composite by immersing the solid substrate into the metal oxide source solution.

Furthermore, the inventors have also found that since the polymer having a polyethyleneimine skeleton in the obtained nanostructure composite-covered structure is caged into a cage made of metal oxide, the polymer never leaks into a reaction solution while having similar functions as a molecular catalyst, and thereby it is possible to preferably use it as an immobilized catalyst type reactor.

In other words, the present invention provides a nanostructure composite-covered structure in which the solid substrate of any shape is covered with the nanostructure composite, wherein the nanostructure composite is a composite in which a polymer having a polyethyleneimine skeleton and metal oxide are composited in nano-meter scale, and a process for producing the same.

In addition, the present invention provides an application method for the nanostructure composite-covered structure as an immobilized catalyst type reactor.

EFFECTS OF THE PRESENT INVENTION

In the nanostructure composite-covered structure of the present invention, a composite containing a polymer and metal oxide such as silica, and titania, is formed on the surface of the solid substrate of any shape made of metal, glass, inorganic metal oxide, plastics, cellulose, etc. The structure itself may be a structure having complex flat surfaces, curved surfaces, a stick, or a tube, etc. In addition, the composite can be covered partially or entirely with the inner or outer surface of a tube, a container, etc. The nanostructure composite uses the polymer layer as a template, which is formed on the substrate by contacting a solution of the polymer having a polyethyeleneimine skeleton and the solid substrate. Therefore, it is easy to select and cover partially the surface of the solid substrate. In spite of the size of the structure, it is possible to form the nanostructure composite on the surface of the structure. Therefore, a surface area per area unit (specific surface area) is extremely large. Since the nanostructure composite on the surface of the solid substrate has basically the outermost made of metal oxide, the nanostructure composite-covered structure of the present invention can be preferably used in applied technology fields relating to metal oxide. In addition, since it is easy to incorporate various functional parts, such as metal ions, metal nano-particles, and organic pigment molecules, into the nanostructure composite, the resulting nanostructure composite can be used in various devices utilizing these functions. Specifically, the nanostructure composite-covered structure of the present invention can be used as micro reactors having a catalyst, enzyme fixing devices, separation and refinement devices, chips, sensors, devices for producing photonic devices, devices for producing insulators or semiconductors, devices for producing sterilization/sterilization devices, devices for producing various micro cells, devices for producing super-hydrophilic/super-hydrophobic boundaries, liquid crystal display devices, etc. In addition, it is also possible to apply it in various industrial fields, for example, to improve heat resistance, fire resistance, abrasion resistance, solvent resistance of plastics, to adjust refraction index at the surface of the substrate. Additionally, the production process uses basically a simple method, such as dipping, and no composite post-handlings are necessary. Therefore, the production process of the present invention is very useful.

In particular, since the structure which is produced by the present invention has a composite having an extremely high specific surface area on the inner wall of a container or a tube, and the polymer having a polyethyleneimine skeleton, which works as a catalyst, is caged in the composite, it is possible to preferably use the structure as an immobilized catalyst type reactor, for example, in carbon-carbon bond reactions, which proceed in the presence of a basic catalyst. Such immobilized catalyst type reactors can refresh manufacturing processes for useful compounds in the chemical industry, intermediates for medical purposes, etc. In particular, it can be thought that such reactors can make the total synthesis process simple, and remarkably improve catalyst efficiency, and thereby greatly contribute to decreasing environmental load.

In addition, when the nanostructure composite-covered structure of the present invention is burned, it is possible to produce a film which contains metal oxide and has a complex structure on the surface of the solid substrate. It is also possible to contain plural metals in such a film containing metal oxide. The film has superior durability. In particular, when titanium is contained as the metal source, since it has a large specific surface area, it is possible to effectively exert photo-catalytic functions, which titanium oxide generally has. Such films have a high degree of availability.

BRIEF DESCRIPTION OF THE DRAWINGS

FIG. 1*a* is a photograph of a broken piece of a glass tube having the composite. FIG. 1*b* is a photograph of the glass piece and the composite from the cross-sectional direction (a boundary between the glass and the composite). FIG. 1*c* is an enlarged photograph of FIG. 1*b* (observation of nano-fiber).

FIG. 2*a* is a photograph of a broken piece of the glass tube having the composite. FIG. 2*b* is an enlarged photograph of a portion surrounded by a circle in FIG. 2*a*. FIG. 2*c* is an enlarged photograph of a portion surrounded by a square in FIG. 2*b*.

FIG. 3*a* is a photograph of a broken piece of the glass tube having the composite. FIG. 3*b* is a photograph of the glass piece and the composite from the cross-sectional direction (a boundary between the glass and the composite). FIG. 3*c* is an enlarged photograph of the composite (the composite from just below, the surface of the composite). FIG. 3*d* is an enlarged photograph of FIG. 3*c*.

FIG. 4*a* is a photograph of a broken piece of the glass tube having the composite. FIG. 4*b* is a photograph of the glass piece and the composite from the cross-sectional direction (a boundary between the glass and the composite). FIG. 4*c* is an enlarged photograph of FIG. 4*b* (observation of nano-fiber).

FIG. 5*a* is a photograph of a broken piece of the glass tube having the composite. FIG. 5*b* is an enlarged photograph of FIG. 5*a*. FIG. 5*c* is an enlarged photograph of FIG. 5*b*. FIG. 5*d* is an enlarged photograph showing the surface of the composite.

FIG. 6*a* is a photograph of a broken piece of the glass tube having the composite. FIG. 6*b* is a photograph of the glass piece and the composite from the cross-sectional direction (a boundary between the glass and the composite). FIG. 6*c* is an enlarged photograph of FIG. 6*b* from the cross-sectional direction. FIG. 6*d* is an enlarged photograph of FIG. 6*c*.

FIG. 7a is a photograph of a broken piece of the glass tube having the composite. FIG. 7b is an enlarged photograph of FIG. 7a. FIG. 7c is an enlarged photograph of the composite from the cross-sectional direction. FIG. 7d is an enlarged photograph of a part of FIG. 7c.

FIG. 8a is a photograph of a broken piece of the glass tube having the composite. FIG. 8b is an enlarged photograph of FIG. 8a. FIG. 8c is an enlarged photograph of FIG. 8b. FIG. 8d is an enlarged photograph of a part of FIG. 8c.

FIG. 9a is a photograph of a broken piece of the glass tube having the composite. FIG. 9b is an enlarged photograph of FIG. 9a. FIG. 9c is an enlarged photograph of FIG. 9b. FIG. 9d is an enlarged photograph of the composite from the cross-sectional direction.

FIG. 10a is a photograph of a broken piece of the glass tube having the composite. FIG. 10b is an enlarged photograph of FIG. 10a. FIG. 10c is an enlarged photograph of FIG. 10b. FIG. 10d is an enlarged photograph of the composite from the cross-sectional direction.

FIG. 11a is a photograph of a broken piece of the glass tube having the composite. FIG. 11b is an enlarged photograph of FIG. 11a. FIG. 11c is an enlarged photograph of FIG. 11b. FIG. 11d is an enlarged photograph of the composite from the cross-sectional direction.

FIG. 12a is a photograph of a broken piece of the glass tube having the composite. FIG. 12b is an enlarged photograph of FIG. 12a. FIG. 12c is an enlarged photograph of FIG. 12b. FIG. 12d is an enlarged photograph of the composite from the cross-sectional direction.

FIGS. 13a to 13d show the composite when $(CH_2CH_2NH)/Cu=50/1$, $100/1$, $200/1$, and $600/1$, respectively.

FIG. 14a is a photograph of a broken piece of the glass tube having the composite. FIG. 14b is an enlarged photograph of FIG. 14a.

FIG. 15a is a photograph of a broken piece of the glass tube having the composite. FIG. 15b is an enlarged photograph of FIG. 15a. FIG. 15c is an enlarged photograph of FIG. 15b. FIG. 15d is an enlarged photograph of the composite from the cross-sectional direction.

FIG. 16a is a photograph of the stick having the composite. FIG. 16b is an enlarged photograph of FIG. 16a. FIG. 16c is an enlarged photograph of FIG. 16b. FIG. 16d is an enlarged photograph of FIG. 16c.

FIG. 17a is a photograph of the plate having the composite. FIG. 17b is an enlarged photograph of FIG. 17a. FIG. 17c is an enlarged photograph of FIG. 17b.

FIG. 18a is a photograph of the plate having the composite. FIG. 18b is an enlarged photograph of a portion surrounded by a circle in FIG. 18a. FIG. 18c is an enlarged photograph of FIG. 18b.

FIG. 19a is a photograph of the surface of the structure. FIG. 19b is an enlarged photograph of FIG. 19a. FIG. 19c is an enlarged photograph of the structure from the cross-sectional direction. FIG. 19d is an enlarged photograph of FIG. 19c.

FIG. 20a is a photograph of the surface of the structure. FIG. 20b is an enlarged photograph of FIG. 20a. FIG. 20c is an enlarged photograph of FIG. 20c.

FIG. 21a is a photograph of the surface of the structure. FIG. 21b is an enlarged photograph of FIG. 21a. FIG. 21c is an enlarged photograph of FIG. 21b. FIG. 21d is an enlarged photograph of FIG. 21c.

FIG. 22a is a photograph of the surface of the structure. FIG. 22b is an enlarged photograph of FIG. 22a. FIG. 22c is an enlarged photograph of FIG. 22b.

FIG. 23a is a photograph with a low magnification of the surface of the structure. FIG. 23b is an enlarged photograph of a portion surrounded by a circle in FIG. 23a. FIG. 23c is an enlarged photograph of a portion surrounded by a circle in FIG. 23b. FIG. 23d is an enlarged photograph of the composite from the cross-sectional direction (a boundary between the glass and the composite).

FIG. 24a is a photograph with a low magnification of the surface of the structure. FIG. 24b is an enlarged photograph of a portion surrounded by a circle in FIG. 24a. FIG. 24c is an enlarged photograph of a portion surrounded by a circle in FIG. 24b. FIG. 24d is an enlarged photograph of the composite from the cross-sectional direction (a boundary between the glass and the composite).

FIG. 25a is a photograph with a low magnification of the surface of the structure. FIG. 25b is an enlarged photograph of a portion surrounded by a circle in FIG. 25a. FIG. 25c is an enlarged photograph of a portion surrounded by a circle in FIG. 25b. FIG. 25d is an enlarged photograph of the composite from the cross-sectional direction (a boundary between the glass and the composite).

FIG. 26a is a photograph with a low magnification of the surface of the structure. FIG. 26b is an enlarged photograph of a portion surrounded by a circle in FIG. 26a. FIG. 26c is an enlarged photograph of a portion surrounded by a circle in FIG. 26b. FIG. 26d is an enlarged photograph of the composite from the cross-sectional direction (a boundary between the glass and the composite).

FIG. 27a is a photograph with a low magnification of the surface of the structure. FIG. 27b is an enlarged photograph of a portion surrounded by a circle in FIG. 27a. FIG. 27c is an enlarged photograph of a portion surrounded by a circle in FIG. 27b. FIG. 27d is an enlarged photograph of the composite from the cross-sectional direction (a boundary between the glass and the composite).

FIG. 28a is a photograph with a low magnification of the surface of the structure. FIG. 28b is an enlarged photograph of a portion surrounded by a circle in FIG. 28a. FIG. 28c is an enlarged photograph of a portion surrounded by a circle in FIG. 28b. FIG. 28d is an enlarged photograph of a portion surrounded by a circle in FIG. 28c.

FIG. 29a is a photograph with a low magnification of the surface of the structure. FIG. 29b is an enlarged photograph of a portion surrounded by a circle in FIG. 29a. FIG. 29c is an enlarged photograph of a portion surrounded by a circle in FIG. 29b.

FIG. 30a is a photograph with a low magnification of the surface of the structure. FIG. 30b is an enlarged photograph of a portion surrounded by a circle in FIG. 30a. FIG. 30c is an enlarged photograph of a portion surrounded by a circle in FIG. 30b.

FIG. 31a is a photograph with a low magnification of the surface of the structure. FIG. 31b is an enlarged photograph of a portion surrounded by a circle in FIG. 31a. FIG. 31c is an enlarged photograph of a portion surrounded by a circle in FIG. 31b.

FIG. 32a is a photograph with a low magnification of the surface of the structure. FIG. 32b is an enlarged photograph of a portion surrounded by a circle in FIG. 32a. FIG. 32c is an enlarged photograph of a portion surrounded by a circle in FIG. 32b. FIG. 32d is a TEM picture of the solid component after dissolving the PET sheet (titanium oxide crystalline lattice can be observed).

FIG. 33a is a photograph with a low magnification of the surface of the structure. FIG. 33b is an enlarged photograph of a portion surrounded by a circle in FIG. 33a. FIG. 33c is an enlarged photograph of a portion surrounded by a circle in FIG. 33b. FIG. 33d is an enlarged photograph of a portion surrounded by a circle in FIG. 33c.

FIG. 34a is a photograph with a low magnification of the surface of the structure. FIG. 34b is an enlarged photograph of a portion surrounded by a circle in FIG. 34a.

In FIG. 35, FIGS. a1 and a2 show the glass test tube before and after covering, respectively. In FIG. 35, FIGS. b to d is a SEM picture showing the surface of the inner wall of the glass tube piece with a low magnification, 5,000 times, and 25,000 times, and FIG. e shows the cross-sectional view of the reactor A (nano-grass having a thickness of about 2 μm on the glass can be observed).

In FIG. 36, FIGS. b and c is a SEM picture showing the surface of the inner wall of the broken reactor B piece, with a low magnification, and 25,000 times, and FIG. d shows the cross-sectional view of the reactor B (nano-grass on the surface of plastic can be observed).

FIGS. 34a and 34b are photographs showing the structure before and after burning, respectively.

FIG. 37 is a scanning electron microscope photograph of the structure obtained in Example 35.

BEST MODE FOR CARRYING OUT THE INVENTION

Figure 1:
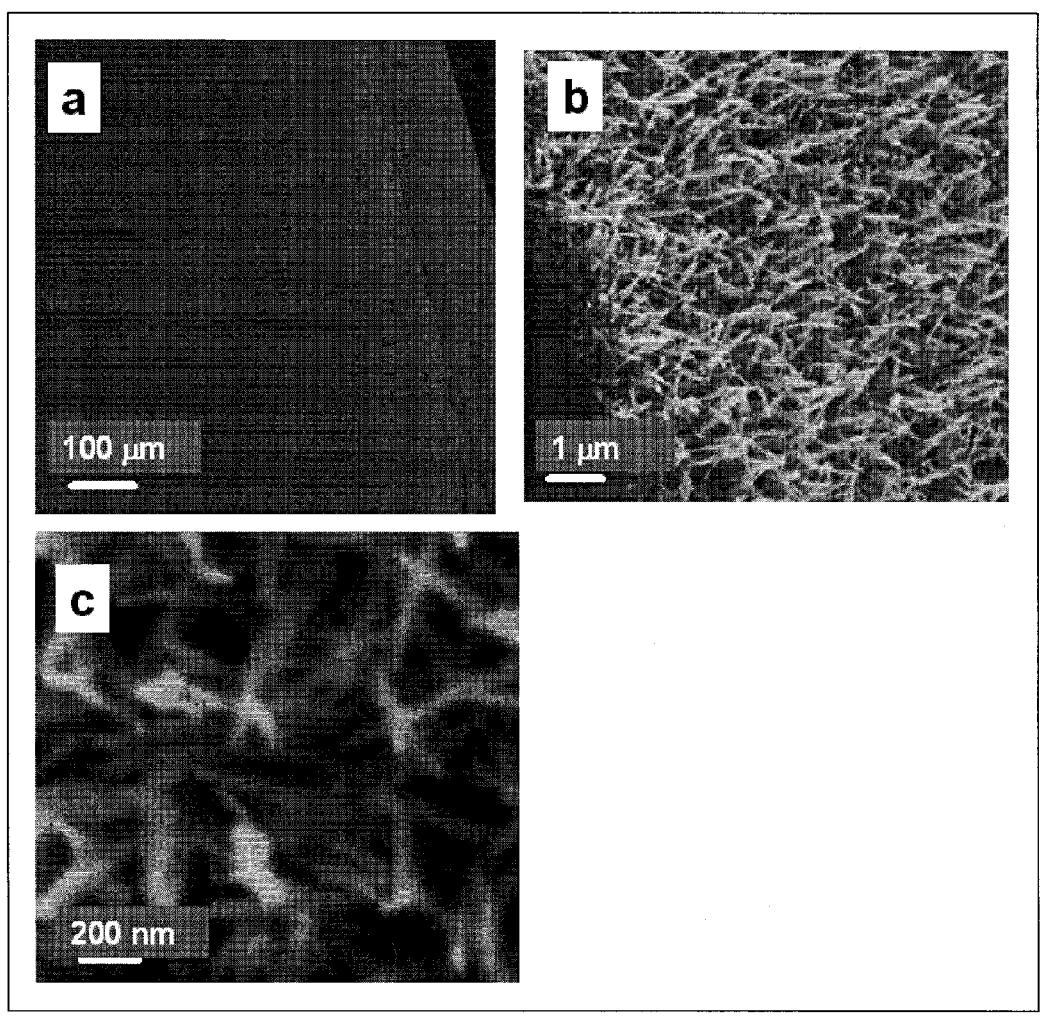
FIG. 1 is a scanning electron microscope photograph of the structure obtained in Example 1-1.
Figure 2:
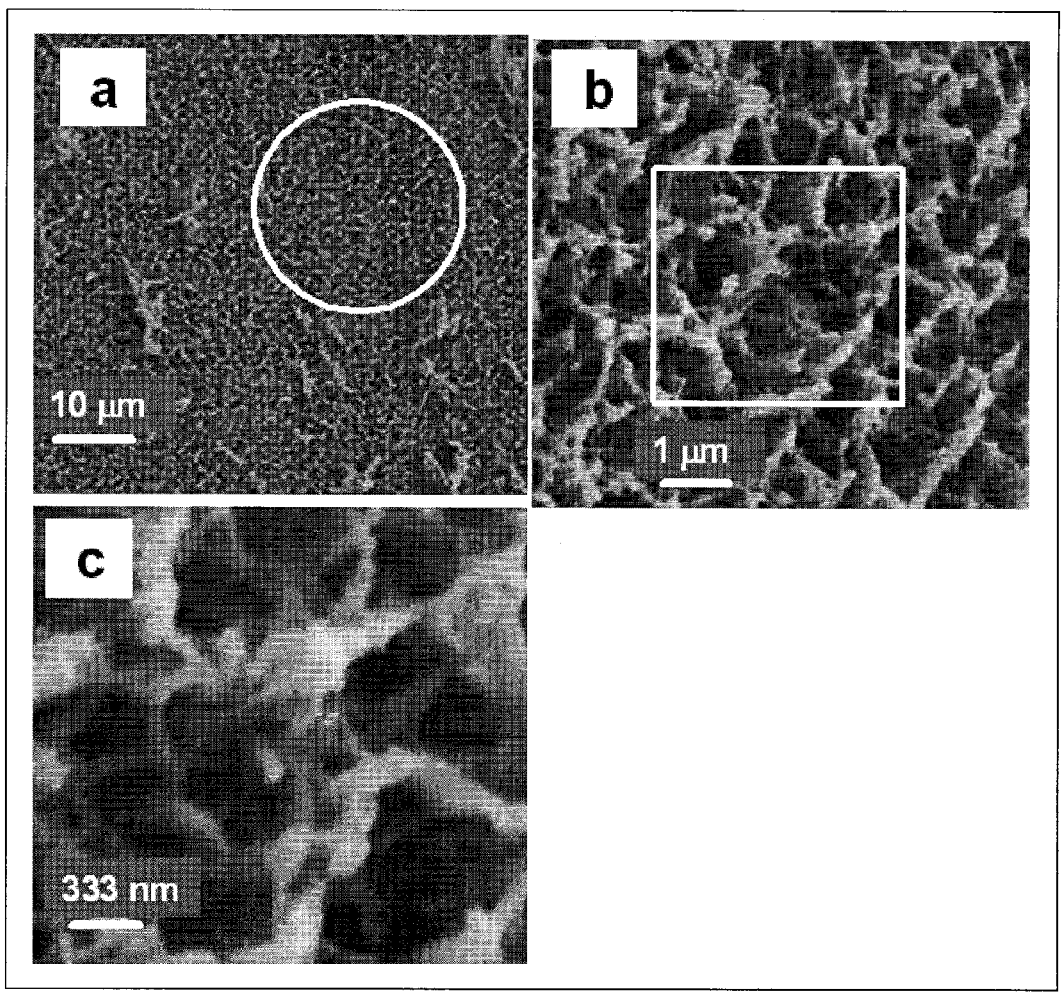
FIG. 2 is a scanning electron microscope photograph of the structure obtained in Example 1-2.
Figure 3:
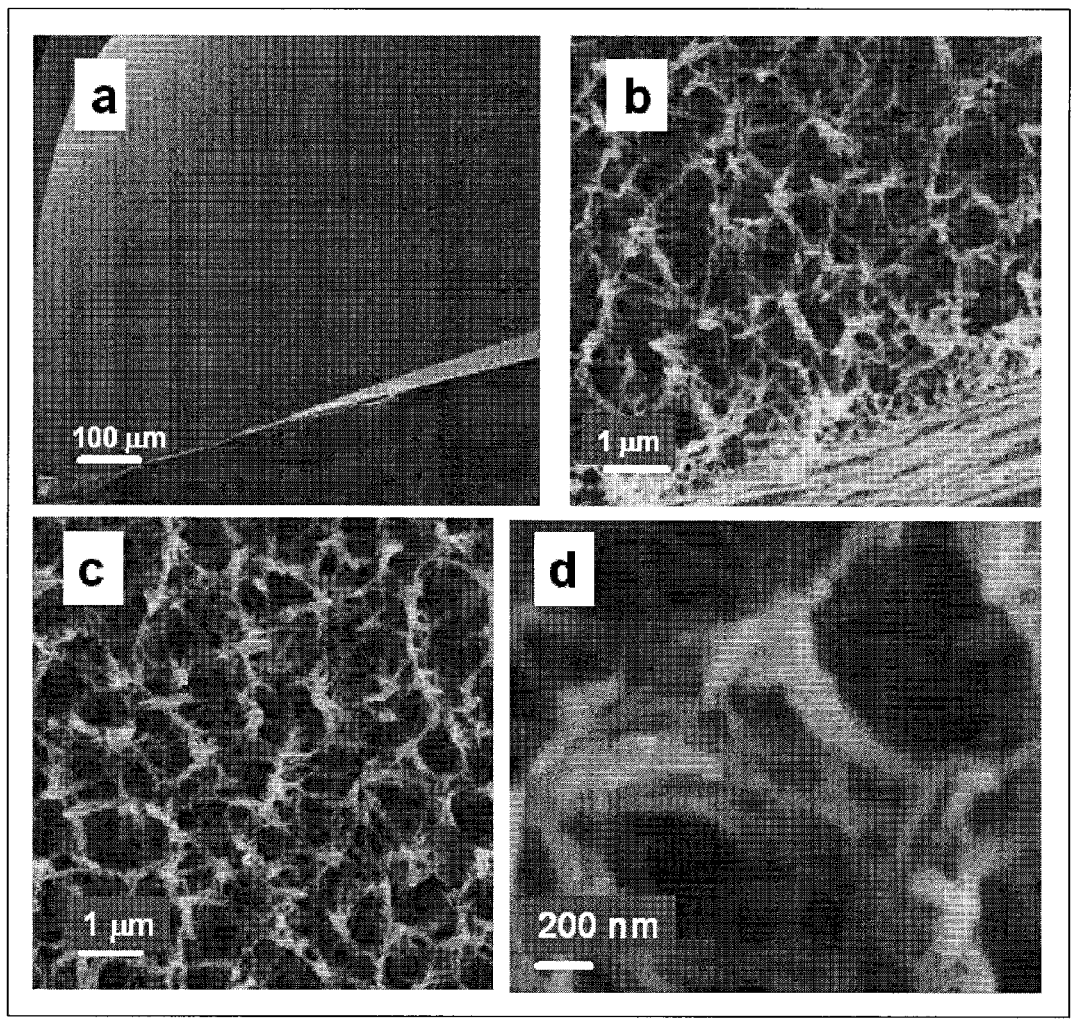
FIG. 3 is a scanning electron microscope photograph of the structure obtained in Example 1-3.
Figure 4:
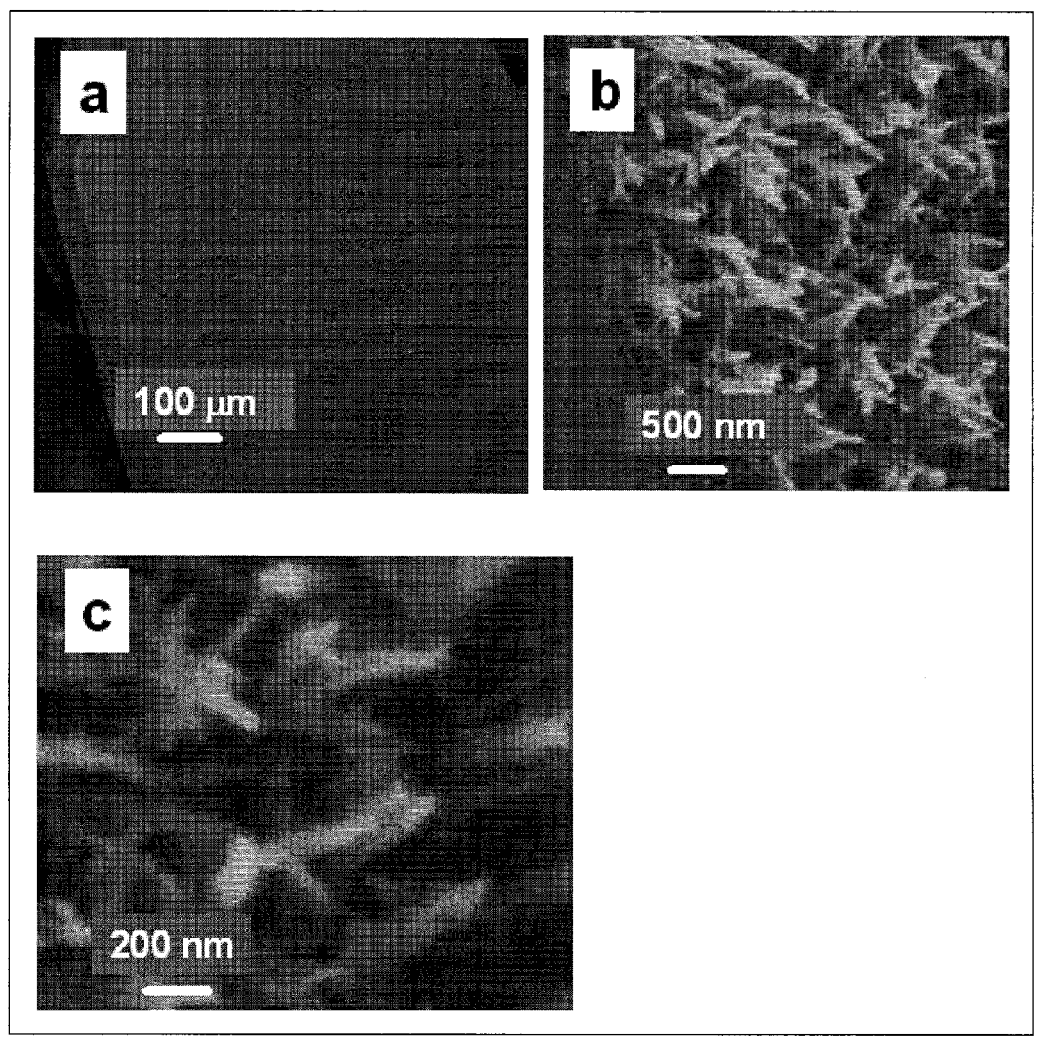
FIG. 4 is a scanning electron microscope photograph of the structure obtained in Example 1-4.

The composite of the present invention is a composite in which a surface of a solid substrate (X) is covered with a nanostructure composite (Y) containing a polymer (A) having a polyethyleneimine skeleton (a) and metal oxide (B).

In addition, the present invention provides a structure wherein the nanostructure composite contains a metal ion, a metal nano-particle, or an organic pigment molecule. That is, the structure of the present invention contains a solid substrate, a polymer, metal oxide, a metal ion, a metal nano-particle, an organic pigment molecule, etc.

Moreover, in the present invention, "nanostructure composite (Y)" means an organic-inorganic composite which contains the polymer (A) and the metal oxide (B), if necessary, further a metal ion, a metal nano-particle, an organic pigment molecule, etc. which are composited in nano-meter order, and has a specific shape, such as a fiber shape, a particle shape, and a film shape. In addition, "nano-particle" means metal fine particles having a size in nano-meter order, as explained below. It is not always necessary to have a perfect spherical shape. For convenience, the word "particle" is used in the present invention.

Below, the present invention will be explained in detail.

[Solid Substrate (X)]

As the solid substrate (X) used in the present invention, any solid substrate can be used as long as it can adsorb the polymer (A) having a polyethyleneimine skeleton (a). Examples of the solid substrate (X) can include inorganic substrates, such as glass substrates, metal substrates and metal oxide substrates, organic substrates, such as resin (plastic) substrates, cellulose substrates, substrates having an etched surface which are made of glass, metal or metal oxide, resin substrates having a surface treated by plasma, or ozone.

Any inorganic glass substrates can be used. Examples of preferred inorganic glass substrate can include heat-resistant glass (borosilicate glass), soda lime glass, crystal glass, and optical glass which contains neither lead nor arsenic. When the glass substrate is used, it is possible to etch the surface with alkali solutions, such as sodium hydroxide, if necessary.

Any inorganic metal substrates can also be used. Examples of preferred inorganic metal substrates can include substrates made of iron, copper, aluminum, stainless steel, zinc, silver, gold, platinum, or an alloy thereof.

Any inorganic metal oxide substrates can also be used. Examples of preferred inorganic metal oxide substrates can include ITO (indium tin oxide), tin oxide, copper oxide, titanium oxide, zinc oxide, and alumina.

Examples of the resin substrate can include substrates made of various polymers, such as polyethylene, polypropylene, polycarbonate, polyester, polystyrene, polymethacrylate, polyvinyl chloride, polyethylene alcohol, polyimide, polyamide, polyurethane, epoxy resin, and celluloses. In addition, resin substrates having a surface, which is treated with plasma, ozone, sulfuric acid, or alkali, can also be used.

The solid substrate (X) may have any shapes. Examples of the shape can include a plane plate, a curved plate, and a film. In particular, the solid substrates, which have a shape of a tube having a complex shape, a spiral tubular tube, and a micro tube; containers of any shape (such as, a globular, quadrangle, triangle, etc.), and cylindrical shapes; sticks of any shape (such as, a cylindrical, quadrangle, and triangle shapes) or fibrous, may also be preferably used.

[Polymer (A) Having a Polyethyleneimine Skeleton (A)]

In the present invention, it is essential that a polymer layer formed on the solid substrate (X) be a polymer (A) having a polyethyleneimine skeleton (a). The polymer (A) having a polyethyleneimine skeleton (a) may be a homopolymer in linear-shaped, star-shaped, or comb-shaped monomer. Of course, it may be a copolymer containing other repeating units. When the polymer (A) having a polyethyleneimine skeleton (a) is a copolymer, the molar ratio of the polyethyleneimine skeleton (a) in the polymer (A) is preferably 20% by mol or more, because a stable polymer layer can be produced. In addition, it is more preferable that the polymer (A) having a polyethyleneimine skeleton (a) be a block copolymer having the number of repeating units of the polyethyleneimine skeleton (a) of 10 or more. Examples of the block copolymer having the number of repeating units of the polyethyleneimine skeleton (a) of 10 or more can include block copolymers containing polyethylene glycol, polypropionylethyleneimine, polyacrylamide, polystyrene, polyphenyloxazoline, polyoctyloxazoline, polydodetyloxazoline, polymethylmethacrylate, and polybutylmethacrylate.

The polyethyleneimine skeleton (a) may be branched or linear. However, a linear polyethyleneimine skeleton, which has high ability for forming a crystalline aggregate, is preferable. In addition, the polymer (A) may be a homopolymer or a copolymer, but it is preferable that the molecular weight of a part having the polyethyleneimine skeleton (a) be in a range from 500 to 1,000,000, because a stable polymer layer can be formed on the solid substrate (X). The polymer (A) having a polyethyleneimine skeleton (a) can be obtained by a synthesis method (refer to Patent Documents Nos. 1 to 4) which the inventors of the present invention have already suggested. In addition, it may be commercial items.

As explained below, the polymer (A) can be used by dissolving in various solutions. When the polymer (A) is used as a solution, polymers which are compatible with the polymer (A) can be used, in addition to the polymer (A) having a polyethyleneimine skeleton (a). Examples of the polymer other than the polymer (A) can include polyethylene glycol, polyvinyl alcohol, polyvinyl pyrrolidone, polyacrylamide, poly (N-isopropylacrylamide), polyhydroxyethyl acrylate, polymethyloxazoline, polyethyloxazoline, and polypropyleneimine. When the polymer is used together with the polymer (A), it is possible to adjust easily the thickness etc. of the nanostructure composite layer on the surface of the structure obtained.

[Metal Oxide (B)]

It is a great characteristic that the surface of the structure obtained in the present invention is a nanostructure composite containing the polymer (A) and metal oxide. Any metal oxide can be used as long to stand produced by a so-called sol-gel reaction. Examples of the metal source can include silicon, titanium, zirconium, and aluminum. When accessible and there is a wide applicable field of the resulting structure, silicon or titanium is preferable.

When the metal oxide (B) is silica, examples of the silica source can include alkoxysilanes, water glass, and hexafluorosilicon ammonium.

Examples of alkoxysilane can include tetramethoxysilane, an oligomer of methoxysilane condensate, tetraethoxysilane, and an oligomer of ethoxysilane condensate. In addition, alkyl substituted alkoxysilanes, such as methyl trimetoxysilane, methyl triethoxysilane, ethyl trimethoxysilane, ethyl triethoxysilane, n-propyl trimethoxysilane, n-propyl triethoxysilane, iso-propyl trimethoxysilane, and iso-propyl triethoxysilane, 3-chloropropyl trimetoxysilane, 3-chloropropyl triethoxysilane, vinyl trimethoxysilane, vinyl triethoxysilane, 3-glycidoxypropyl trimethoxysilane, 3-glycidoxypropyl triethoxysilane, 3-aminopropyl trimethoxysilane, 3-aminopropyl triethoxysilane, 3-mercaptopropyl trimethoxysilane, 3-mercaptotriethoxysilane, 3,3,3-trifluoropropyl trimethoxysilane, 3,3,3-trifluoropropyl triethoxysilane, 3-methacryloxypropyl trimethoxysilane, 3-methacryloxypropyl triethoxysilane, phenyl trimethoxysilane, phenyl triethoxysilane, p-chloromethylphenyl trimethoxysilane, p-chloromethylphenyl triethoxysilane, dimethyl dimethoxysilane, dimethyl diethoxysilane, diethyl dimethoxysilane, diethyl diethoxysilane, etc. can be used. These alkoxysilanes can be used alone or in combination.

When the metal oxide (B) is titania, a water-soluble titanium compound, in which titanium compound is stable in water, is preferably used as a titanium source.

Examples of the water-soluble titanium compound can include an aqueous solution of titanium bis(ammonium lactate)dihydroxide, an aqueous solution of titanium bis(lactate), a propanol/water mixed solution containing titanium bis(lactate), titanium (ethylacetoacetate)diisopropoxide, and titanium sulfate.

When the metal oxide (B) is zirconia, examples of the zirconia source can include zirconium tetraalkoxides such as zirconium tetraethoxide, zirconium tetra-n-propoxide, zirconium tetra-iso-propoxide, zirconium tetra-n-buthoxide, zirconium tetra-sec-bothoxide, and zirconium tetra-tert-buthoxide.

When the metal oxide (B) is alumina, examples of the alumina source can include aluminum trialkoxides such as aluminum triethoxide, aluminum tri-n-propoxide, aluminum tri-iso-propoxide, aluminum tri-n-buthoxide, aluminum tri-sec-buthoxide, and aluminum tri-tert-buthoxide.

When the metal oxide (B) is zinc oxide, examples of the zinc oxide source can include zinc acetate, zinc chloride, zinc nitrate, and zinc sulfate.

When the metal oxide (B) is tungsten oxide, examples of the preferable tungsten oxide source can include tungsten chloride, and aluminum tungstate.

The compound contained in the source solutions (B') of the metal oxide (B) can be used alone or in combination. In addition, it is also possible to use one compound at first, and the other compound can be added in stages. Furthermore, it is also possible to use a partial condensate of the compound or a partial condensate of one compound and at least one compound other than the compound.

[Metal Ion (C)]

The surface of the substrate in the structure of the present invention is covered with the nanostructure composite (Y) containing the polymer (A) having a polyethyleneimine skeleton (a), and the metal oxide (B). It is possible to incorporate stably a metal ion (C) into the nanostructure composite (Y), due to the functions of the polyethyleneimine skeleton (a). Therefore, it is possible to produce the nanostructure composite-covered structure containing the metal ion (C).

Since the polyethyleneimine skeleton (a) in the polymer (A) has strong coordination capability to the metal ion (C), the metal ion (C) is coordinated with the ethylenemine unit in the skeleton (a), and forms a metal ion composite. This metal ion composite is obtained by coordinating the metal ion (C) into the ethyleneimine unit. Dissimilar to the process in ion bonding, etc., it is possible to form the composite by coordinating the metal ion (C) in the ethyleneimine unit when the metal ion (C) is a cation, or an anion. That is, any metal can be used as the metal ion (C) as long as it can coordinate with the ethyleneimine unit in the polymer (A). Examples of the metal source in the metal ion (C) can include alkali metals, alkali earth metals, transition elements, metalloids, metals in lanthanum series, and metal compounds such as polyoxometalate. These can be used alone or in combination.

Examples of the alkali metal include Li, Na, K, and Cs. Examples of an opposite anion of the alkaline metal ion can include Cl, Br, I, $NO_3$, $SO_4$, $PO_4$, $ClO_4$, $PF_6$, $BF_4$, and $F_3CSO_3$.

Examples of the alkali earth metal can include Mg, Ba, and Ca.

Examples of the metal ion of transition elements can include transition metal cations ($M^{n+}$), acid radical anions ($MO_x^{n-}$) which bond with oxygen, and anions ($ML_x^{n-}$) which bond with a halogen. Moreover, in this description, "transition metal" refers to Sc and Y in the 3rd group of the periodic table, and the transition metal elements in the 4-12th group and the 4-6th periods.

Examples of the transition metal cation can include various transition metal cations $M^{n+}$), such as mono-, di-, tri-, or tetra-valent cation of Ti, V, Cr, Mn, Fe, Co, Ni, Cu, Zn, Y, Zr, Mo, Ru, Rh, Pd, Ag, Cd, W, Os, Ir, Pt, Au, and Hg. The opposite anions of these metal cations may be Cl, $NO_3$, $SO_4$, polyoxometalate anions, or organic anions of carboxylic acid, etc. However, when the transition metal is easily reduced with the ethyleneimine skeleton (a), such as Ag, Au, or Pt, it is preferable to make an ion composite by inhibiting a reduction reaction, for example, by making pH acidic conditions.

Examples of the transition metal anion ($MO_x^{n-}$) can include $MnO_4$, $MoO_4$, $ReO_4$, $WO_3$, $RuO_4$, $CoO_4$, $CrO_4$, $VO_3$, $NiO_4$, and $UO_2$.

The metal ion (C) in the present invention may be a metal compound of polyoxometalates in which the transition metal anion is fixed in the silica (B) via the metal cation coordinated in the ethyleneimine unit in the polymer (A). Examples of the polyoxometalates can include molybdates, tungstates, and vanadates which are combined with a transition metal cation.

Anions ($ML_x^{n-}$), in which various metals are contained, for example, anions, in which metal is coordinated with halogen, such as $AuCl_4$, $PtCl_6$, $RhCl_4$, $ReF_6$, $NiF_6$, $CuF_6$, $RuCl_6$, $In_2Cl_6$, etc. can be used to form an ion composite.

Examples of the metalloid ion can include 1 ions of Al, Ga, In, Tl, Ge, Sn, Pb, Sb, and Bi. In particular, the ion of Al, Ga, In, Sn, Pb, and Ti is preferable.

Examples of the lanthanum metal ion can include trivalent cations of La, Eu, Gd, Yb, and Eu.

[Metal Nano-particle (D)]

As explained above, the metal ion (C) can be incorporated into the nanostructure composite (Y) in the structure in the present invention. That is, among these metal ions (C), when the metal ion which is easily reduced by a reduction reaction is converted into metal nano-particle (D), the metal nano-particle (D) can be included in the composite (Y).

Examples of the metal nano-particle (D) can include copper, silver, gold, platinum, palladium, manganese, nickel, rhodium, cobalt, ruthenium, rhenium, molybdenum, and iron. The metal nano-particle in the composite (Y) may be alone or in combination thereof. Among these metals, silver, gold, and platinum are preferable, because after the metal ion is coordinated in the ethyleneimine unit, it is spontaneously reduced at room temperature or under heated conditions.

The size of the metal nano-particle (D) in the composite (Y) can be adjusted in a range of from 1 to 20 nm. The size of the metal nano-particle (D) can be measured as a diameter of the metal nano-particle (D) which is calculated by picking up a part of the structure of the present invention, and observing a photograph of the nanostructure composite (Y) on the surface of the structure taken by a transmission electron microscope. The metal nano-particle (D) can be fixed inside or on the outer surface of the nanostructure composite (Y) containing the polymer (A) and the silica (B).

[Organic Pigment Molecule (E)]

In the present invention, the polyethyleneimine skeleton (a) in the nanostructure composite (Y) can physically bond with a compound having an amino group, a hydroxy group, a carboxylic acid group, a sulfonic group, and a phosphate group, by a hydrogen bond and/or electrostatic attraction. Therefore, it is possible to make the organic pigment molecule (E) which has these functional groups be contained in the composite (Y).

Examples of the organic pigment molecule (E) can include monofunctional acidic compounds and polyfunctional acidic compounds.

Specifically, examples of the organic pigment molecule (E) can include aromatic acids, such as tetraphenyl porphyrin tetracarboxylic acid, and pyrene dicarboxylic acid, aromatic or aliphatic sulfonates, such as naphthalene disulfonic acid, pyrene disulfonic acid, pyrene tetrasulfonic acid, anthraquinone disulfonic acid, tetraphenyl porphyrin tetrasulfonic acid, phthalocyanine tetrasulfonic acid, and PIPES, and azo dyes such as acid yellow, acid blue, acid red, direct blue, direct yellow, and a direct red. In addition, pigments having a xanthene skeleton, such as rhodamines, erythrosines, and eosins can also be used.

[Nanostructure Composite (Y) Containing the Polymer (A) and the Metal Oxide (B)]

The nanostructure composite (Y) containing the polymer (A) and the metal oxide (B) is generally an aggregate containing a composite nano-fiber (y1), a composite nano-particle (y2), or a composite nano-film (y3), which contains the polymer (A), and the metal oxide (B). While covering the entire surface of the solid substrate, the aggregates form various patterns or morphology.

For example, when the metal oxide (B) is silica, the nanostructure composite (Y) is a nano-grass in which the composite nano-fibers (y1) are arranged on the entire surface of the solid substrate such that the longitudinal direction of the fibers is substantially the perpendicular direction to the surface of the solid substrate, a nano-rice field in which the length of the composite nano-fibers (Y) is relatively long, therefore the nano-fibers are slightly inclined relative to the perpendicular direction, or a nano-straw-mat in which the composite nano-fibers (y1) is side toppled on the entire surface of the solid substrate.

When the metal oxide (B) is silica or titania, the nanostructure composite (Y) is a nano-sponge in which the composite nano-fiber (y1) or the composite nano-particle (y2) forms networks on the entire surface of the solid substrate similar to a sponge.

When the metal oxide (B) is titania, the nanostructure composite (Y) is a nano-maze in which the composite nano-film (y3) forms a nano-film on the surface of the solid substrate, and the film forms a maze containing plural boundaries over the entire surface of the solid substrate.

That is, the nanostructure composite (Y) has various hierarchical structures.

The thickness of the composite nano-fiber (y1), which is a basic unit, in high level hierarchical structures, such as the nano-grass, the nano-rice-field, the nano-straw-mate, the nano-sponge, etc. is in a range of from 10 to 100 nm. The length of the composite nano-fiber (y1) in the nano-grass, and the nano-rice-field can be adjusted in a range of from 50 nm to 10 µm.

In addition, when the network is formed on the surface of the solid substrate, that is, when a three-dimensional net structure is formed in the entire covering layer, the nanostructure composite (Y) may be made of only the composite nano-fiber (y1), the composite nano-particle (y2), or the combination thereof. In this case, the average particle diameter of the composite nano-particle (y2) is preferable 20 nm or less.

When the nanostructure composite (Y) is the nano-maze, the thickness of the composite nano-film (y3), which is a basic unit, is in a range of from 30 to 500 nm. The height of the wall can be adjusted in a range of from 100 to 2,000 nm. The interval between the walls can be adjusted in a range of from 200 nm to 5 µm.

The thickness of the nanostructure composite (Y) when covering the surface of the solid substrate varies depending on the aggregate structure of the composite nano-fiber (y1), the composite nano-particle (y2), and the composite nano-film (y3), however it can be varied in a range of from 50 nm to 20 µm.

In the nano-grass, there is a strong tendency that the composite nano-fiber (y1) stands straight. Therefore, the nano-grass has a characteristic that the length of each composite nano-fiber (y1) corresponds basically to the thickness of the nanostructure composite (Y), and the length of each composite nano-fiber (y1) is substantially equal.

In the nano-rice-field, there is a strong tendency that the composite nano-fiber (y1) extends at a slant, and the thickness of the covering layer is smaller than the length of the composite nano-fiber (y1). In addition, the nano-rice-field has a characteristic that the thickness of the layer containing the nano-rice field can be determined depending on overlapping conditions of the toppled composite nano-fiber (y1).

When the nanostructure composite (Y) is nano-sponge, the nano-sponge has a characteristic that the thickness of the layer containing the nano-sponge is determined depending on rising conditions due to a complex regular entanglement of the composite nano-fiber (y1).

When the nanostructure composite (Y) has a network, the thickness of the layer made of the nanostructure composite (Y) is determined by the overlapping conditions of the composite nano-fiber (y1), an existent ratio between the composite nano-fiber (y1) and the composite nano-particle (y2), etc.

In the nanostructure composite (Y), the percentage of the polymer (A) can be adjusted in a range of from 5 to 30% by mass. By changing the content of the polymer (A), the structure of the aggregate (higher order structure) is also changeable.

When the metal ion (C), the metal nano-particle (D), or the organic pigment molecule (E) is added in the nanostructure composite (Y), it is possible to control higher order structure by the kind thereof. In this case, the basic unit is the composite nano-fiber (Y1), the composite nano-particle (y2), and/or the composite nano-film (y3). These basic units are combined to produce complex shapes.

When the metal ion (C) is added in the nanostructure composite (Y), the content of the metal ion (C) is preferably in a range of from ¼ to ¹/₂₀₀ equivalent relative to one equivalent of the ethyleneimine unit in the polymer (A). When this ratio is changed, it is possible to vary the thickness of the covering layer made of the nanostructure composite (Y). In addition, in this case, the covering layer may be colored depending on the metal source used.

When the metal-nano-particle (D) is added in the nanostructure composite (Y), the content of the metal nano-particle (D) is preferably in a range of from ¼ to ¹/₂₀₀ equivalent relative to one equivalent of the ethyleneimine unit in the polymer (A). When this ratio is changed, it is possible to vary the thickness of the covering layer made of the nanostructure composite (Y). In addition, in this case, the covering layer may be colored depending on the metal source used.

When the organic pigment molecule (E) is added in the nanostructure composite (Y), the content of the organic pigment molecule (E) is preferably in a range of from ½ to ¹/₁,₂₀₀ equivalent relative to one equivalent of the ethyleneimine unit in the polymer (A). When the ratio is changed, it is possible to vary the thickness, or the shape pattern of the covering layer made of the nanostructure composite (Y).

In addition, two or more of the metal ion (C), the metal nano-particle (D), and the organic pigment molecule (E) can also be incorporated into a nanostructure composite (Y) simultaneously.

[Process for Producing Nanostructure Composite-covered Structure]

The process for producing a nanostructure composite-covered structure according to the present invention includes:

a step in which a solution of the polymer (A) having a polyethyleneimine skeleton (a), a mixed solution of the polymer (A) having a polyethyleneimine skeleton (a) and the metal ion (C), a mixed solution of the polymer (A) having a polyethyleneimine skeleton (a) and the organic pigment molecule (E), or a mixed solution of the polymer (A) having a polyethyleneimine skeleton (a), the metal ion (C) and the organic pigment molecule (E) are contacted to the surface of the solid substrate (X), then the solid substrate (X) is taken out of the solution, and the solid substrate (X) is produced, which has the surface adsorbing a polymer layer containing the polymer (A) having a polyethyleneimine skeleton (a), and the metal ion (C), and/or the organic pigment molecule (E) which are used together, and a step in which the solid substrate (X), to which the polymer layer is adsorbed, is contacted with a source solution (B') of the metal oxide, and the metal oxide (B) is deposited on the surface of the solid substrate (X) by functions of the polyethyleneimine skeleton (a) in the polymer layer adsorbed to the surface of the solid substrate (X), to form the nanostructure composite (Y) while covering the surface of the solid substrate (X) with the nanostructure composite (Y).

According to this method, it is possible to easily form a covering layer, which is a nano-boundary containing the polymer (A) and the metal oxide (B), a nano-boundary containing the polymer (A)/the metal ion (C)/the metal oxide (B), or a nano-boundary containing the polymer (A)/the organic pigment molecule (E)/the metal oxide (B), on the surface of the solid substrate (X).

The polymer (A) explained above can be used as the polymer (A) having a polyethyleneimine skeleton (a) in this process. In addition, any solvents can be used to produce the solution containing the polymer (A). Examples of the solvent can include water, organic solvents, such as methanol, and ethanol, and mixed solvents thereof.

The concentration of the polymer (A) in the solution is not limited as long as the polymer layer can be formed on the solid substrate. When a desired pattern is formed, or an increase of the concentration of the polymer (A) adsorbed to the surface of the solid substrate (X) is necessary, the concentration is preferably in a range of from 0.5% by mass to 50% by mass, and more preferably in a range of from 5% by mass to 50% by mass.

The above-mentioned polymer other than the polymer (A), which is dissolved in the solvent and compatible with the polymer (A), can be added in the solution containing the polymer (A) having a polyethyleneimine skeleton (a). The content of the polymer other than the polymer (A) may be lower or higher than that of the polymer (A).

When the covering layer containing the nanostructure complex (Y) including the metal ion (C) is formed, the metal ion (C) is mixed in the solution containing the polymer (A) having a polyethyleneimine skeleton. The concentration of the metal ion (C) is preferably adjusted so as to be ¼ equivalent or less relative to the polyethyleneimine unit of the polyethyleneimine skeleton (a).

When the covering layer containing the nanostructure complex (Y) including the organic pigment molecule (E) is formed, the organic pigment molecule (E) is mixed in the solution of the polymer (A) having a polyethyleneimine skeleton (a). The concentration of the organic pigment molecule (E) is preferably adjusted so as to be ½ equivalent or less relative to the polyethyleneimine unit of the polyethyleneimine skeleton (a).

In order to produce the polymer layer on the solid substrate (X), the solid substrate (X) is contacted with the solution containing the polymer (A). In order to contact, it is preferable to immerse the solid substrate (X) in the solution containing the polymer (A).

In the dipping method, the solid substrate can be contacted with the solution by putting the solid substrate (when it does not have a container shape) into the solution, or pouring the solution into the solid substrate (when it has a container shape). When dipping, the solution containing the polymer (A) is preferably heated, and the temperature of the solution is preferably in a range of from 50 to 90° C. The period of time during contact between the solid substrate (X) and the solution containing the polymer (A), is not particularly limited. However, it is preferably in a range of from several seconds to one hour, depending on the kind of the material constituting the solid substrate (X).

When the material of the solid substrate (X) has strong bonding ability to polyethyleneimine, for example, the material is glass or metal, the contact for several seconds to several minutes may be sufficient. When the material of the solid substrate (X) has weak bonding ability, the contact for several dozen minutes to one hour may be sufficient.

When the solid substrate is contacted with the solution containing the polymer (A), then the solid substrate (X) is removed from the solution, and left to stand at room temperature (about 25° C.), a layer containing aggregates of the polymer (A) is spontaneously formed on the surface of the solid substrate (X). Otherwise, the layer containing aggregates of the polymer (A) can also be spontaneously formed by removing the solid substrate (X) from the solution, and putting immediately the solid substrate (X) into distilled water at 4 to 30° C., or an ammonia aqueous solution at room temperature to below-freezing temperature.

Examples of the contacting method between the surface of the solid substrate (X) and the solution containing the polymer (A) can include printing using a jet printer, in addition to a coating method such as methods using a spin-coater, a bar-coater, and an applicator. When they are contacted so as to form a fine pattern, the printing method using a jet printer is preferable.

Successively, the polymer layer formed on the solid substrate (X) and the source solution (B') of the metal oxide are contacted to deposit generate the metal oxide (B) on the surface of the polymer layer, and thereby the nanostructure composite (Y) of the polymer (A) and the metal oxide (B) is produced. When the polymer layer contains the metal ion (C) and/or the organic pigment molecule (E), the objective nanostructure composite (Y) can be produced by participating the metal oxide (B) in the same manner as explained above.

As the source solution (B') of the metal oxide used, an aqueous solution or water-soluble organic solvent solutions, for example, alcohol solvents, such as methanol, ethanol, and propanol, which contains the compound which produce the metal oxide explained above, can be used. In addition, mixed solvent solutions containing the water-soluble organic solvent and water can also be used. Furthermore, a water-glass solution having pH adjusted in a range of from 9 to 11 can also be used. The source solution (B') containing the metal oxide may contain two or more kinds of metals. In addition, the source solution (B') can also be obtained by adding gradually different kinds of the metals.

The alkoxysilane compounds, which can be used as the silica source, can be used as a bulk solution containing no solvent.

As the method for contacting the solid substrate to which the polymer layer is adsorbed and the source solution (B') of the metal oxide, a dipping method can be preferably used. The dipping time is sufficiently in a range of from 5 to 60 minutes, however, it may be longer, as necessary. The temperature of the source solution (B') of the metal oxide may be room temperature, or higher than room temperature. When it is higher than room temperature, the temperature is preferably 70° C. or less, in order to deposit the metal oxide (B) regularly on the surface of the solid substrate (X).

The structure of the nanostructure composite (Y) containing the deposited metal oxide (B) and the polymer (A) depends on the kind or the concentration of the metal contained in the source solution (B'). It is preferable to select the kind or the concentration of the metal contained in the source solution (B') as necessary.

Polyethyleneimine can reduce precious metal ions, such as gold ions, platinum ions, and silver ions to metal nano-particles. Therefore, when the structure covered with the nanostructure composite (Y) obtained at the above-mentioned process is contacted with an aqueous solution containing the precious metal ions, the precious metal ions can be converted into the metal nano-particles (D) in the nanostructure composite (Y). Thereby, it is possible to obtain the nanostructure composite-covered structure containing the metal nano-particles (D).

The method for contacting the aqueous solution containing the precious metal ions with the structure covered with the nanostructure composite (Y) is preferably a dipping method. Examples of the aqueous solution containing the precious metal ions can include aqueous solutions containing chloroauric acid, sodium gold chloride, chloroplatinic acid, sodium chloroplatinate, and silver nitrate. The concentration of the precious metal ions in the aqueous solution is preferably in a range of from 0.1 to 5% by mol.

Although the temperature of the aqueous solution of the precious metal ions is not limited, it is sufficiently in a range of from room temperature to 90° C. In order to promote the reduction reaction, it is preferably in a range of from 50 to 90° C. The time for dipping the structure in the aqueous solution of the metal ions is sufficiently in a range of from 0.5 to 3 hours. When the aqueous solution is heated, about 30 minutes is sufficient.

When the metal ions are hardly reduced with only polyethyleneimine, it is possible to contact the metal ion (C) in the structure with a reduction agent, in particular a solution containing a reduction agent having a low molecular weight, or hydrogen, while dipping, to reduce the metal ions. Thereby, it is possible to obtain the nanostructure composite-covered structure containing the metal nano-particles (D).

Example of the reduction agent used can include ascorbic acid, aldehyde, hydrazine, sodium borohydride, ammonium borohydride, and hydrogen. When the metal ions are reduced using the reduction agent, the reduction reaction can be performed in an aqueous solvent. A method, in which the structure containing the metal ion (C) is immersed into the reduction agent solution, or a method, in which the structure is left to stand in hydrogen gas atmosphere, can be used. In this case, the temperature of the reduction agent solution is sufficiently in a range of from room temperature to 90° C. The concentration of the reduction agent is preferably in a range of from 1 to 5% by mol.

The kind of the metal ion (C) which is preferably used in the reduction reaction is not particularly limited. However, since the reduction reaction is promptly performed, copper, manganese, chromium, nickel, tin, vanadium, and palladium are preferable.

When the covered structure is immersed into the reduction agent aqueous solution, the temperature of the reduction agent aqueous solution is preferably in a range of from room temperature to 90° C., and the concentration of the reduction agent is sufficiently in a range of from 1 to 5% by mol.

When the various structures obtained in the process are left at room temperature (25° C.) to 60° C., the solvents or water used can be removed. The resulting structure can be used in various applications.

In addition, it is also possible to incorporate the metal ion (C) or the organic pigment molecule (E) into the structure by producing the structure which does not contain the metal ion (C) or the organic pigment molecule (E), and contacting the structure with an aqueous solution containing the metal ion (C) or the organic pigment molecule (E).

Below, an immobilized catalyst type reactor for a carbon-carbon bonding formation, which is obtained by using the structure in a container or a tube shape, is explained as a representative applicable method.

[Carbon-carbon Bonding Formation Reaction Using a Glass Container or a Glass Tube as an Immobilized Catalyst Type Reactor]

The carbon-carbon bonding formation reaction means a reaction relating to a compound (x1) having a unsaturated bond and a compound (x2) having an active methylene or an active methine. Examples of the carbon-carbon bonding formation reaction can include a reaction of a compound having an active methylene or an active methine in which the methylene or the methine is bonded to a strong electron-withdrawing group to a compound having an unsaturated carbon atom such as aldehyde, and ketone, or a compound having a conjugated structure of a C=C bond into an aldehyde, ketone, ester, or amide group. This formation reaction is known as the Knoevenagel reaction or Michael reaction.

Any aromatic or aliphatic aldehyde can be used as long as it has an aldehyde group. Any aromatic or aliphatic ketone can be used as long as it has a ketone group.

It is required that the active methylene or the active methine of the compound (x2) having an active methylene or an active methine be bonded with a strong electron withdrawing group. For example, compounds in which one or two functional groups, such as —CN, —$NO_2$, —COOH, —CO(O)$CH_3$, —CO(O)$C_2H_5$, —C(O)$NH_2$, —C(O)NH$CH_3$, —C(O)N($CH_3$)$_2$, and —S($O_2$)OPh, are bonded to a methylene carbon can be preferably used as the compound (x2) having an active methylene or an active methine.

Below, the compound (x1) which has an unsaturated bond, such as the aldehyde compounds and the ketone compounds, is hereafter defined as an electron acceptor. The compound (x2) which has an active methylene or an active methine is defined as an electron donor.

Examples of the electron acceptor can include compounds in which a substituted or a non-substituted aliphatic group, a substituted or a non-substituted cyclic aliphatic group, a substituted or a non-substituted heteroaliphatic group, a substituted or a non-substituted hetroaliphatic group, a substituted or a non-substituted aromatic group, or a substituted or a non-substituted heteroaromatic group is bonded to aldehyde compounds or ketone compounds. Specifically, examples of the non-substituted aliphatic group can include alkyl groups, such as methyl, ethyl, i-propyl, n-propyl, n-butyl, i-butyl, t-butyl, pentyl, hexyl, heptyl, octyl, nonyl, and decyl groups. In addition, the aliphatic group may be alkenyl groups, such as propenyl, isopropenyl, isobutenyl, 2-butenyl, 3-butenyl, n-2-pentenyl, and n-2-octenyl groups. Examples of the substituted aliphatic group can include hydroxyalkyl groups having various isomers, such as hydroxymethyl, hydroxyethyl, 1-hydroxy-n-propyl, 1-hydroxy-i-propyl, 1-hydroxy-n-propyl, 1-hydroxy-n-butyl, 1-hydroxy-i-butyl, and 2-hydroxy-n-butyl. Furthermore, examples of the substituted aliphatic groups can include aliphatic groups having a halogen group, such as methyl fluoride, 2-ethyl fluoride, chloromethyl, 2-fluoroethyl, 2-chloroethyl, difluoromethyl, trifluoromethyl, dichloromethyl, trichloromethyl, and 2,2,2-trichloroethyl, and alkyl groups substituted with chloro, fluoro, or bromo, such as i-propyl, n-propyl, n-butyl, i-butyl, t-butyl, pentyl, hexyl, heptyl, octyl, nonyl, and decyl. Examples of the cyclic aliphatic group can include cyclobutyl, cyclopentyl, cyclohexyl, cycloheptyl, and cyclooctyl. Examples of the heteroaliphatic group can include aliphatic groups containing one or more heteroatoms, such as O, S, N, and P. Examples of the heterocyclic aliphatic group can include a heterocyclic group containing four or five carbon atoms, and one or more heteroatoms, such as O, S, and N, such as oxirane, azirine, 1,2-oxathiolane, pyrazoline, pyrrolidone, pipalysine, morpholine, tetrahydrofuran, and tetrahydrothiophene.

Examples of the aromatic group can include aromatic groups having six to ten carbon atoms, such as phenyl, pentalyn, indene, naphthalene, and anthracene. Examples of the heteroaromatic group can include heteroaromatic group having four or five carbon atoms and one of heteroatom such as O, S, and N, such as pyrrole, furan, thiophene, oxazol, thiazole, pyridine, pyrazine, indole, purine, and quinoline.

As the electrondonor, the following compound having the structural formula (1) to (4) can be used.

$$YCH_2Y \qquad (1)$$

[in the structural formula (1), Y is CN, COOR, COOH, $NO_2$, $CONH_2$, CONHR, COR, or —$SO_2$R(R is an alkyl group, phenyl group, or naphthyl group having $C_1$ to $C_{12}$)]

$$XCH_2Y \qquad (2)$$

[in the structural formula (2), Y is the same as that of the structural formula (1), X is an alkyl group having $C_1$ to $C_6$, or a phenyl group or a naphthyl group which may have a substituted group, the substituted group is Cl, Br, F, OH, CN, COOR', COOH, $CONH_2$, $NO_2$, $OCH_3$, $OC_2H_5$, $SO_2R'$, or $PO_3R'$ (R' is an alkyl group having $C_1$ to $C_6$)]

$$YCHZY \qquad (3)$$

[in the structure formula (3) Y is the same as that of the structural formula (1), and Z is an alkyl group having $C_1$ to $C_6$, a phenyl group, or a naphthyl group]

$$XCHZY \quad (4)$$

[in the structural formula (4), X, Y, and Z are the same as those of the structural formulae (1) to (3)]

The reaction between the electron acceptor and the electron donor is a reaction using the composite of the present invention as a catalyst. During the reaction, the reaction efficiency is influenced by the reaction temperature, the reaction solvent, the amount of the catalyst used, etc.

In the case that the donor is an active methylene compound, when two electron withdrawing groups (for example, two CN groups) are bonded with the methylene, the reaction activity increases. Therefore, when an acceptor reacts to such a donor, the reaction can proceed in a range of from ordinary temperature to 30° C. When the reaction activity of the donor is relatively low, it is preferable to raise slightly the reaction temperature, such as 50 to 150° C.

The catalyst, which is the structure of the present invention, can be used in the presence of no solvent or a solvent. When the material compound is liquid, it is possible to sufficiently exert the catalytic activity without any solvent.

When the material compound has crystallinity, or the product has crystallinity, it is preferable that the reaction using the structure of the present invention as a catalyst be performed in a polar solvent. The polar solvent preferably has compatibility with the polymer (A) having a polyethyleneimine skeleton contained in the nanostructure composite (Y). Examples of a preferable polar solvent can include alcohol solvents, such as methanol, ethanol, propanol, and ethylene dialcohol. In addition, other solvents can also be mixed in these alcohols solvents. Examples of the other solvents can include polar solvents, such as acetonitrile, dimethylformamide, acetamide, dimethylacetamide, and dimethyl sulfoneoxide.

Since the composite boundary at inner walls of the immobilized catalyst type reactor contains the polymer (A) having a polyethyleneimine skeleton (a), the catalytic activity is high, and quite a small amount of the catalyst can promote the reaction. In a general carbon-carbon bonding reaction relating aldehyde or ketone, a large amount of donor is used, and the amount of the catalyst is $5/100$ to $10/100$ equivalents to the acceptor. However, when the catalyst of the present invention is used, and one equivalent of the acceptor and the donor are used respectively, the amount of the catalyst (converted to an ethyleneimine unit in the polyethyleneimine) is in a range of from $1/1,000$ to $1/100$.

In the reaction using the structure as an immobilized catalyst type reactor, after the reaction, the reaction solution is removed, and then the next material to be reacted is added, and thereby the reaction can be carried out repeatedly one after another.

When the immobilized catalyst type reactor is used repeatedly, after the reaction, the reaction solution is removed, the inside of the reactor is cleaned with the solvent, and after drying or without drying, the reactor can be used in the next reaction.

When the structure of the present invention is used as the immobilized catalyst type reactor, the carbon-carbon bond reaction can be performed with high efficiency. The composite having a high specific surface area, such as the nano-grass, is formed at the inner boundary of the reactor. Each composite nano-fiber, composite nano-particle, or composite nano-film, which constitutes the composite, has a structure in which polyethyleneimine as a catalyst is locked inside. Therefore, the catalyst works a molecular catalyst in the reaction solution. Due to this, this catalyst can work as a molecular catalyst in a reaction solution. It can be thought that greatly dissimilar to conventional solid powder supported type catalyst with the surface of which amine residue is bonded, the structure can be used as a catalyst in organic reactions in which polyethyleneimine works as a catalyst, besides carbon-carbon bonding reactions.

Some kinds of the metal ion (C) or the metal nano-particle (D), which are incorporated in the structure of the present invention, work as a catalyst in chemical reactions. Therefore, it is preferable that the kind of the metal ion (C) or the metal nano-particle (D) be selected depending on the objective, for example, to control the reaction, in various chemical reactions using the structure of the present invention. When the structure incorporating the organic pigment molecule (E) is used as a reactor, the life length of the reactor, or the progress degree of the chemical reactions can be judged using the properties such as color development properties, and fluorescent properties of the organic pigment molecule (E).

[Burning of Nanostructure Composite-covered Structure]

When the nanostructure composite-covered structure of the present invention is burned, the polymer (A) having a polyethyleneimine skeleton (a) in the nanostructure composite (Y) covering the solid substrate (X) can be removed. Since the metal oxide (A) constituting the nanostructure composite (Y) maintains the shape thereof, the structure obtained by burning is covered with the nanostructure which contains the metal oxide (B) as a main component and has the above-mentioned shape. The metal oxide (B) may be one metal or contain two or more metals. That is, the structure after burning contains metal oxide contained in the nanostructure composite-covered structure and has the shape before burning.

When the structure is burned, it is necessary that the solid substrate (X) of the nanostructure composite-covered structure have heat resistance. Specifically, the solid substrate (X) having heat resistance may be selected from heat-resistant inorganic materials such as glass, metal oxide, and metal. The burning temperature may be adjusted in a range of from 300 to 700° C. When silicon is used as the metal source, the structure is burned at 650° C. or less, and preferably at 600° C. or less, because it is easy to maintain the shape of the nanostructure composite before burning.

The burning period of time is preferably in a range of from 1 to 7 hours. However, when the burning temperature is higher, the burning period of time is shorter. In contrast, when the burning temperature is lower, the burning period of time is longer. That is, it is preferable to adjust the burning temperature and the burning period of time depending on the situation. Moreover, it is preferable to burn in oxygen atmosphere, because the polymer (A) having a polyethylenemimine skeleton (a), which is an organic compound, can be easily removed.

The structure, which has any shape, and is covered with the nanostructure containing the metal oxide (B) as a main component, is obtained through the burning process. Therefore, durability (shape maintain properties) is particularly high. In addition, the specific surface area is remarkably high. Therefore, it is possible to exert effectively the original functions of the metal oxide, for example, photocatalytic functions.

EXAMPLES

Hereafter, the present invention is explained in detail referring to the following examples. Moreover, "%" means "% by mass" unless otherwise stated.

[Shape Analysis of Nanostructure by Scanning Electron Microscope]

The nanostructure, which was isolated and dried, was fixed to a sample mounting table with a double-sided adhesion tape, and it was observed by a surface observation device, VE-9800, marketed by KEYENCE corporation.

Synthesis Example 1

<Synthesis of Linear Polyethyleneimine (L-PEI)>

3 g of commercial polyethyloxazoline (number average molecular weight: 50,000, average degree of polymerization: 5,000, marketed by ALDRICH) was dissolved in 15 mL of 5 mol/L-hydrochloric acid. The solution was heated to 90° C. in an oil bath, and it was stirred for 10 hours. 50 mL of acetone was added to the reaction mixture to deposit completely a polymer. After filtration, the polymer was washed with methanol three times, and white polyethyleneimine powder was obtained. The obtained powder was identified by $^1$H-NMR (heavy water, marketed by JEOL Co., Ltd.: AL300, 300 MHz). It was confirmed that the peak at 1.2 ppm ($CH_3$) and 2.3 ppm ($CH_2$), which are derived from the ethyl group at the side chain of polyethyloxazoline, was completely disappeared. That is, the results show that polyethyloxazoline was completely hydrolyzed and changed to polyethyleneimine.

The obtained powder was dissolved in 5 mL of distilled water. While stirring, 50 mL of 15%-ammonia was added dropwise into the solution. After the reaction solution was left to stand for one night, the deposited aggregate powder is filtered, and washed with cooled water three times. After washing, the crystalline powder was dried in a desiccator at room temperature, and linear polyethyleneimine (L-PEI) was obtained. The yield was 2.2 g (crystal water content). In the polyethyleneimine obtained by hydrolysis of polyoxazoline, only the side chain reacts, and there is no change in the main chain. Therefore, the degree of polymerization of L-PEI is 5,000, which is the same as that before hydrolysis.

Synthesis Example 2

<Synthesis of Star-shaped Polyethyleneimine (B-PEI) Having a Benzene Ring at the Center≦

In accordance with Jin, J. Mater. Chem., 13, 672-675 (2003), star-shaped polymethyloxazoline, in which six arms of polymethyloxazoline bond a benzene ring, was synthesized as a precursor as follows.

0.021 g (0.033 mmol) of hexakis(bromomethyl)benzene as a polymerization initiator was put into a test tube having a grounded opening provided with a magnetic stirrer. After setting a three-way cock to the test tube, the inside of the test tube was vacuumed, and then purged with nitrogen. After that, 2.0 ml (24 mmol) of 2-methyl-2-oxazoline and 4.0 ml of N,N-dimethylacetamide were added in series using a syringe from the introduction opening of the three-way cock under a nitrogen gas stream. When the test tube was heated to 60° C. in the oil bath, and maintained for 30 minutes on the oil bath, the mixed solution became transparent. The transparent mixed solution was further heated to 100° C., then it was stirred at the same temperature for twenty hours, and a precursor polymer was obtained. From the results of the $^1$H-NMR measurement of this mixed solution, it was confirmed that the inversion percentage of the monomer was 98% by mol, and the yield was 1.8 g. When the average degree of polymerization of the polymer was estimated based on this inversion percentage, the average degree of polymerization of each arm was 115. When the molecular weight was measured by GPC, the average molecular weight of the polymer was 22,700 and the molecular weight distribution was 1.6.

When polymethyloxazoline was hydrolyzed by the same method as the above-mentioned Synthesis Example 1 using this precursor polymer, star-shaped polyethyleneimine B-PEI, in which six polyethyleneimines combined with a benzene ring core, was obtained. As a result of $^1$H-NMR (TMS external standard, heavy water), it was confirmed that the 1.98 ppm peak derived from the methyl group at the side chain of the precursor polymer before hydrolysis disappeared completely.

The obtained powder was dissolved in 5 mL of distilled water. While stirring, 50 mL of 15%-ammonium aqueous solution was added dropwise into the solution. After the reaction solution was left to stand for one night, the deposited aggregate powder is filtered, and washed with cooled water three times. After washing, the crystalline powder was dried in a desiccator at room temperature (25° C.), and polyethyleneimine (B-PEI), in which six polyethyleneimines bonded to a benzene ring core, was obtained. The yield was 1.3 g (including crystal water content).

Synthesis Example 3

<Synthesis of Star-shaped Polyethyleneimine (P-PEI) Having Porphyrine at the Center≦

In accordance with Jin et al., J. Porphyrin & Phthalocyanine, 3, 60-64 (1999) and J Marcomol. Chem. Phys. 204, 403-409 (2003), star-shaped polymethyloxazoline having porphyrin at the center, which is a precursor polymer, was synthesized as follows.

After the inside of a 50 ml-flask having two-neck fitted with a three-way cock was replaced with nitrogen, 0.0325 g of tetra(p-iodomethylphenyl)porphyrin (TIMPP) and 8.0 ml of N,N-dimethylacetamide were added, and stirred at room temperature to dissolve TIMPP completely. After adding 3.4 ml (3.27 g) of 2-methyl-2-oxazoline, which is 1280 times the molar number of porphyrin, the temperature of the mixture was 100° C., and it was stirred for twenty-four hours. After lowering the temperature of the reaction solution to room temperature, and adding 10 ml of methanol to the reaction solution, it was vacuumed and concentrated. The residue was dissolved in 15 ml of methanol, and the solution was added into 15 ml of methanol. The obtained solution was poured into 100 ml of tetrahydrofuran to deposit a polymer. By the same method, the polymer was precipitated again, and suction filtered, then the polymer was put into a desiccator containing $P_2O_5$, and suction desiccation was carried out using an aspirator for 1 hour. Further, it was decompressed using a vacuum pump, and dried under the vacuum for twenty-four hours to obtain a precursor polymer (TPMO-P). The yield was 3.05 g and the yield percentage was 92.3%.

The number average molecular weight of the obtained precursor polymer (TPMO-P) by GPC (HLC-8000, marketed by TOSOH CORPORATION) was 28,000, and the molecular weight distribution was 1.56. When the integration ratio between a proton in the ethylene arm in the polymer and a proton in a pyrrol ring of porphyrine in the center of the polymer was calculated by $^1$H-NMR, the average degree of polymerization of each arm was 290. Based on this result, the number average molecular weight by $^1$H-NMR was presumed to be 99,900. The fact that the number average molecular weight by $^1$H-NMR far exceeds the number average molecular weight value by GPC means a general feature of a star-shaped polymer.

When polymethyloxazoline was hydrolyzed by the same method as the above-mentioned Synthesis Example 1 using this precursor polymer, star-shaped polyethyleneimine (P-PEI), in which four polyethyleneimine combined with a center porphyrine, was obtained. As a result of $^1$H-NMR (TMS external standard, in heavy water), it was confirmed that the 1.98 ppm peak derived from the methyl group at the side chain of the precursor polymer before hydrolysis completely disappeared.

Examples 1-1 to 1-4

[Structure in which an Inner Wall of a Glass Tube is Covered with a Nanostructure Composite of a Polymer/Silica]

The polymer L-PEI obtained in Synthesis Example 1 was added into distilled water, and heated to 90° C. to prepare a 4%-solution. After connecting a glass tube (inside diameter: 1 mm; length: 5 cm) made of soda lime with a syringe using a rubber tube, a fixed amount of the heated polymer aqueous solution was sucked in the glass tube, and it was left to stand for 30 seconds. Then, the polymer aqueous solution was discharged by the pushing force of the syringe. An L-PEI polymer layer was formed on the inside of the glass tube by this operation. After leaving this glass tube to stand at room temperature for 5 minutes, the glass tube was immersed into various silica source solution in Table 1 for 30 minutes. After taking the glass tube out of the solution and washing the inner wall of the glass tube with ethanol, it was dried at room temperature. After that, a reflected light colored light blue was observed at the glass tube.

After that, the edge of the glass tube was crushed, and the piece of the glass tube was observed by SEM. The result of the SEM photograph of the inner wall surface of the glass tube produced with different silica source liquids is shown in FIGS. 1 to 4. In any case, the film in which nano-fibers were precisely arranged as a unit structure could be obtained. Moreover, the glass tube having no polymer layer was immersed into the silica source solution by comparison, but no change could be confirmed.

TABLE 1

Structure covered with Nanostructure composite of a polymer/Silica (inner diameter: 1 mm)

| | Example | | | |
|---|---|---|---|---|
| | 1-1 | 1-2 | 1-3 | 1-4 |
| Silica source solution | MS51/water (volume ratio: 1:1) | MS51 | MS51/ethanol (volume ratio: 1:1) | MS53/water (volume ratio: 1:1) |
| Immersion time in silica source solution | 30 minutes | 30 minutes | 30 minutes | 30 minutes |
| Structural feature of the surface | Nano-grass in which nano-fibers stand side by side | Nano-sponge having protrusions | Nano-sponge having holes | Nano-grass in which nano-fibers stand side by side |

Notes in Table 1
MS51: tetramer of tetramethoxysilane (marketed by Colcoat Co., Ltd.)
MS51: hexamer of tetramethoxysilane (marketed by Colcoat Co., Ltd.)

Examples 2-1 to 2-3

[Structure in which an Inner Wall of a Glass Tube is Covered with a Nanostructure Composite of a Polymer/Silica]

A structure in which the inside wall was covered with the nanostructure composite was obtained in a manner identical to that of Example 1, except that a glass tube (inner diameter: 6 mm, length: 5 mm) made of soda lime was used instead of the glass tube (inner diameter: 1 mm, length: 5 mm) made of soda lime.

Figure 5:
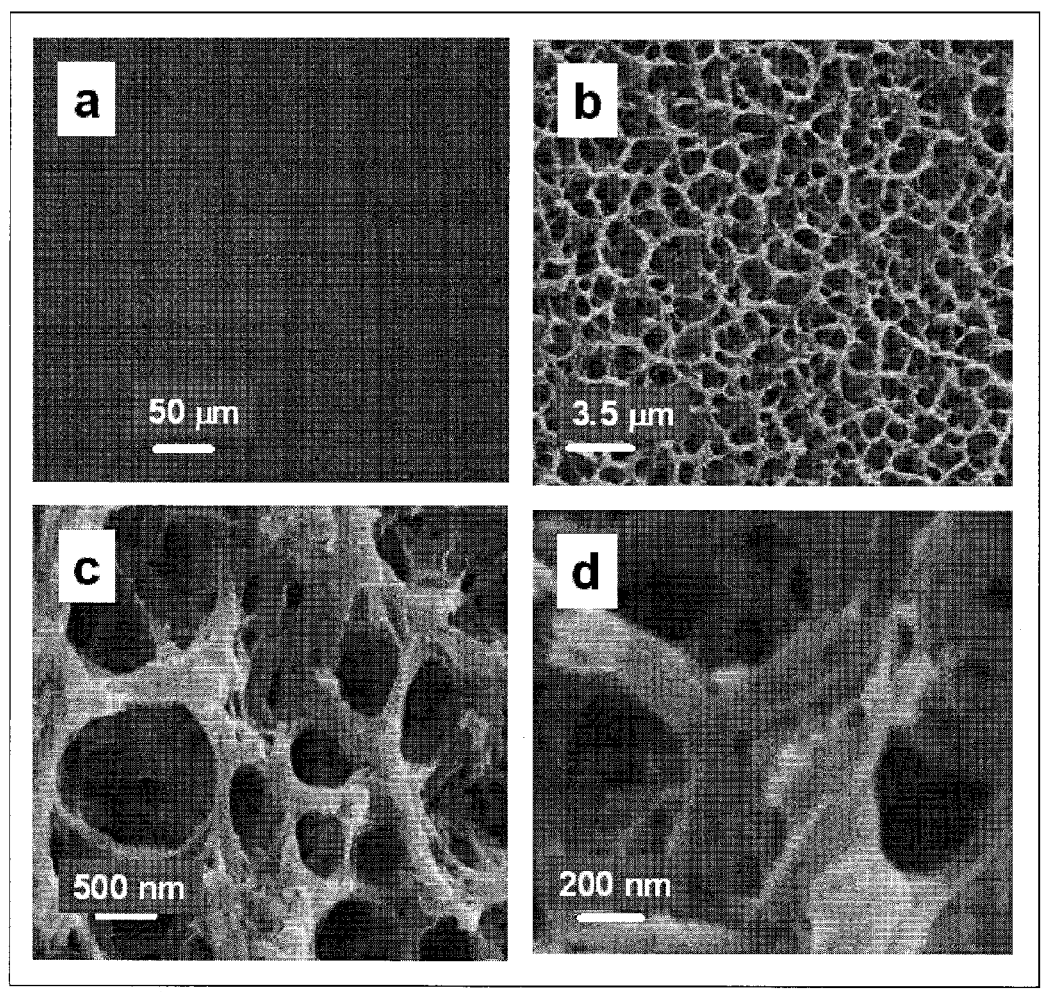
FIG. 5 is a scanning electron microscope photograph of the structure obtained in Example 2-1.
Figure 6:
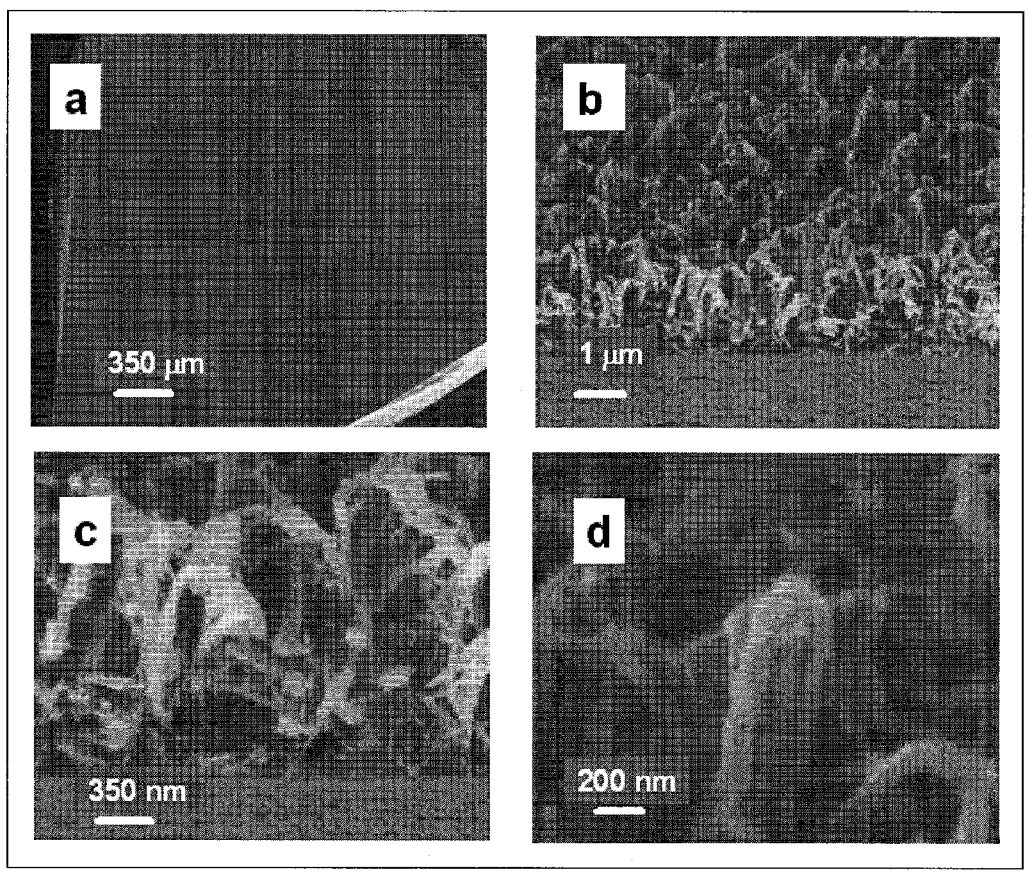
FIG. 6 is a scanning electron microscope photograph of the structure obtained in Example 2-2.
Figure 7:
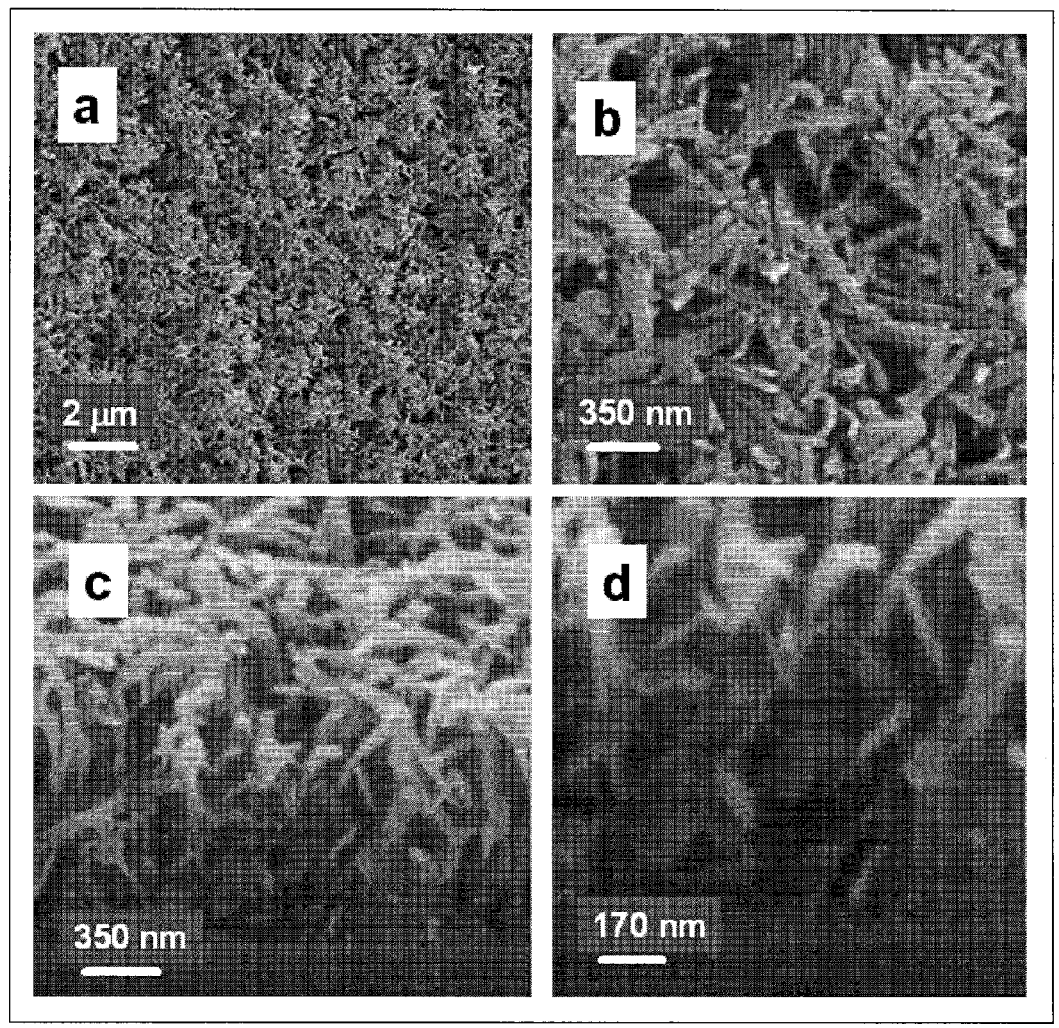
FIG. 7 is a scanning electron microscope photograph of the structure obtained in Example 2-3.

After that, the edge of the glass tube was crushed, and the piece of the glass tube was observed by SEM. The result of the SEM photograph of the inner wall surface of the glass tube produced with different silica source liquids is shown in FIGS. 5 to 7. In any case, the film in which nano-fibers were precisely arranged as a unit structure could be obtained.

TABLE 2

Structure covered with Nanostructure composite of a polymer/Silica (inner diameter: 6 mm)

| | Example | | |
|---|---|---|---|
| | 2-1 | 2-2 | 2-3 |
| Time in Polymer Solution | 2 minutes | 30 seconds | 30 seconds |
| Silica source solution | MS51 | MS51 | TMOS |
| Immersion time in silica source solution | 30 minutes | 30 minutes | 30 minutes |
| Structural feature of the surface | Nano-sponge having a network | Nano-fiber standing so as to make a loop | Nano-straw mat having an outermost made of nano-fibers |

Notes in Table 2
TMOS: tetramethoxysilane

Example 3

[Structure in which an Inner Wall of a Glass Tube is Covered with Nanostructure Composite of a Polymer/Porphyrin/Silica]

4.5 mg of tetra(sulfonate phenyl) porphyrin was dissolved into 2 g of distilled water, 60 mg of L-PEI was added into the solution, and the solution was heated to 90° C. to prepare a mixed solution. In the mixed solution, the molar ratio of ($CH_2CH_2$ NH) unit of the polymer and porphyrin was 300/1. Similar to Example 1, a fixed amount of the mixed solution was sucked in the glass tube (inner diameter: 6 mm, length: 5 cm), and it was left to stand for 30 seconds. Then, the mixed solution was extruded. After leaving the glass tube to stand at room temperature for 5 minutes, the glass tube was immersed into a mixed solution of MS51/water/isopropyl alcohol (0.2/3/3 in volume) for twenty minutes. After taking the glass tube out of the solution and washing the inner wall of the glass tube with ethanol, it was dried at room temperature. After that, it was confirmed that the glass tube was colored light violet which is derived from porphyin.

When the glass tube was observed using a fluorescent microscope (Olympus BX-60, marketed by Olympus, Inc.), strong red fluorescence appeared. This red fluorescence was derived from incorporation of porphyrin residue into the covering layer.

Figure 8:
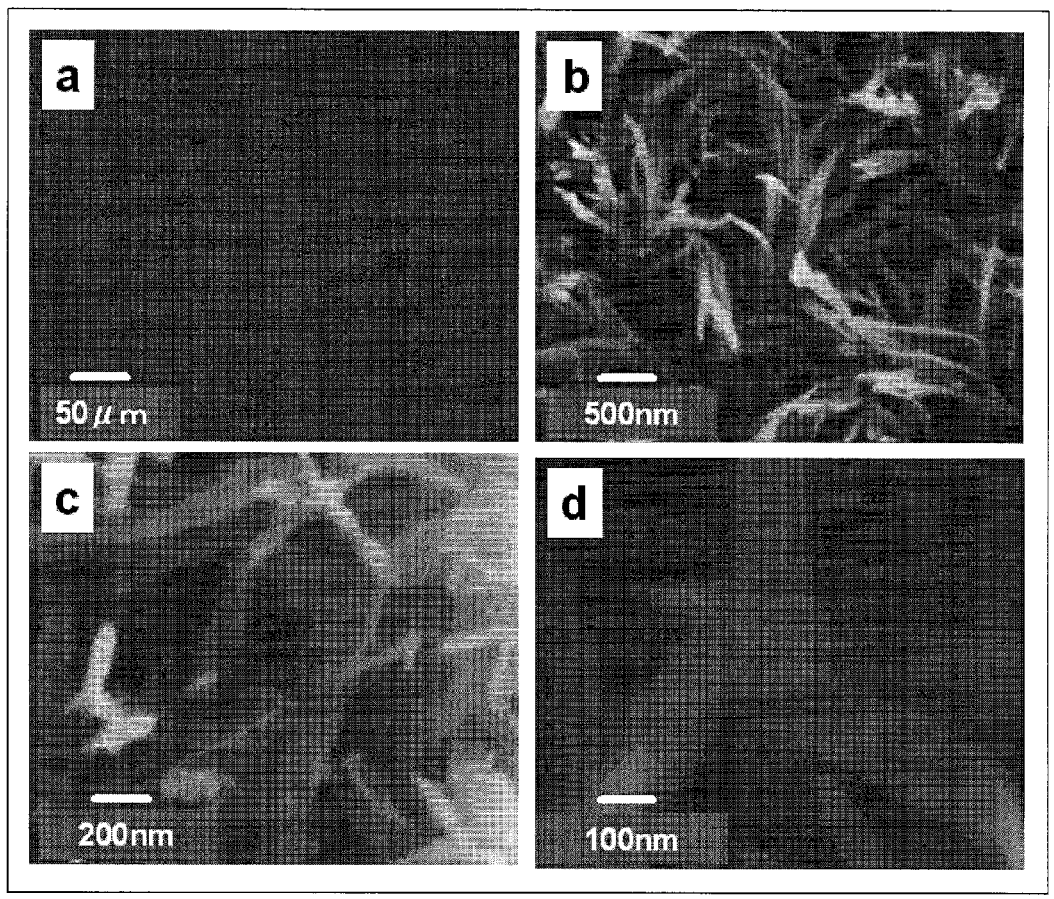
FIG. 8 is a scanning electron microscope photograph of the structure obtained in Example 3.
Figure 9:
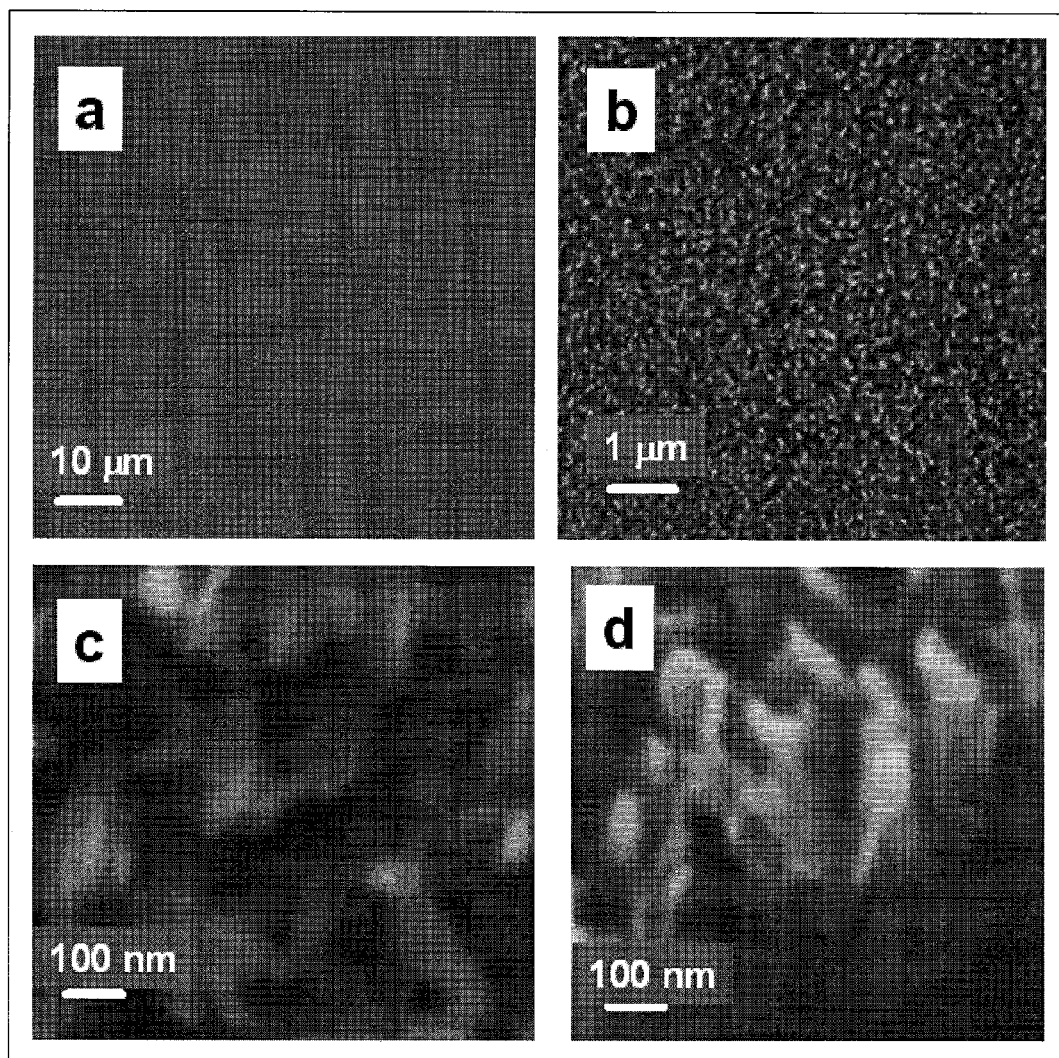
FIG. 9 is a scanning electron microscope photograph of the structure obtained in Example 4-1.
Figure 10:
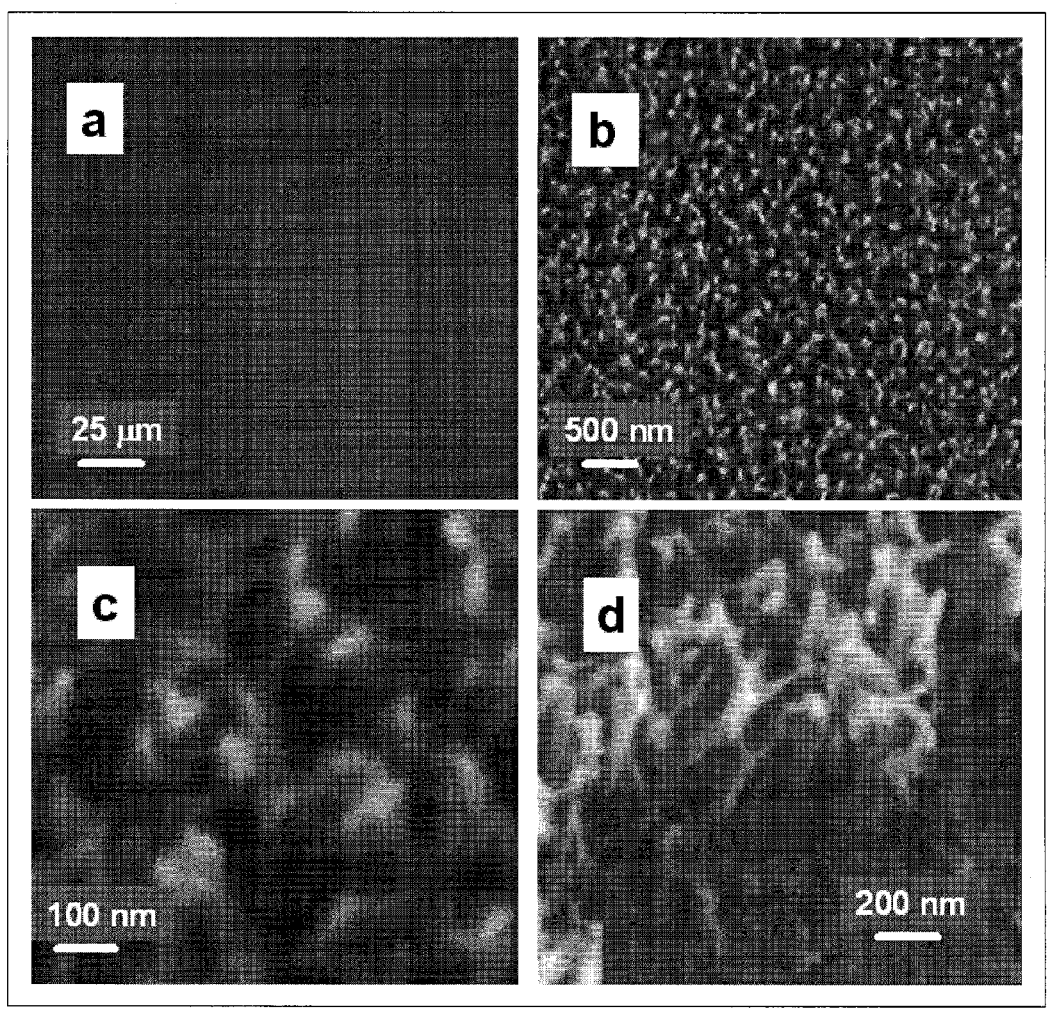
FIG. 10 is a scanning electron microscope photograph of the structure obtained in Example 4-2.
Figure 11:
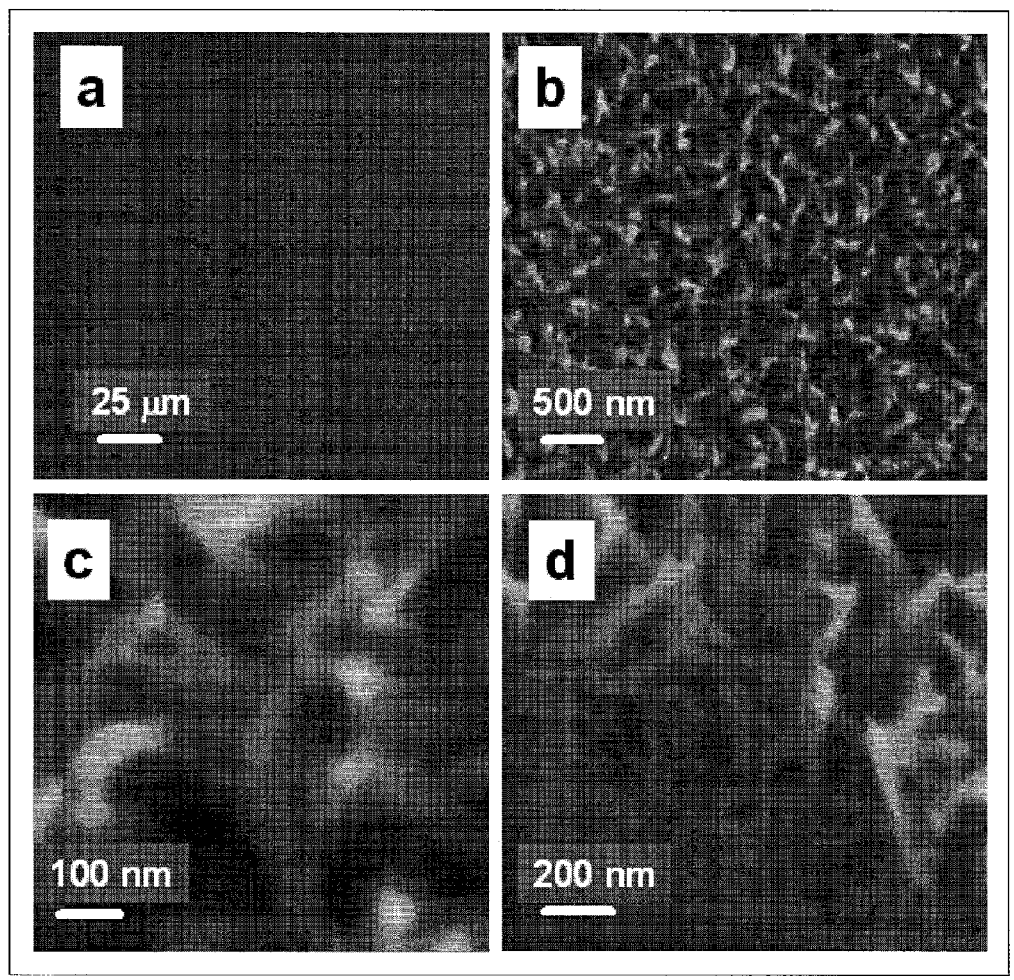
FIG. 11 is a scanning electron microscope photograph of the structure obtained in Example 4-3.
Figure 12:
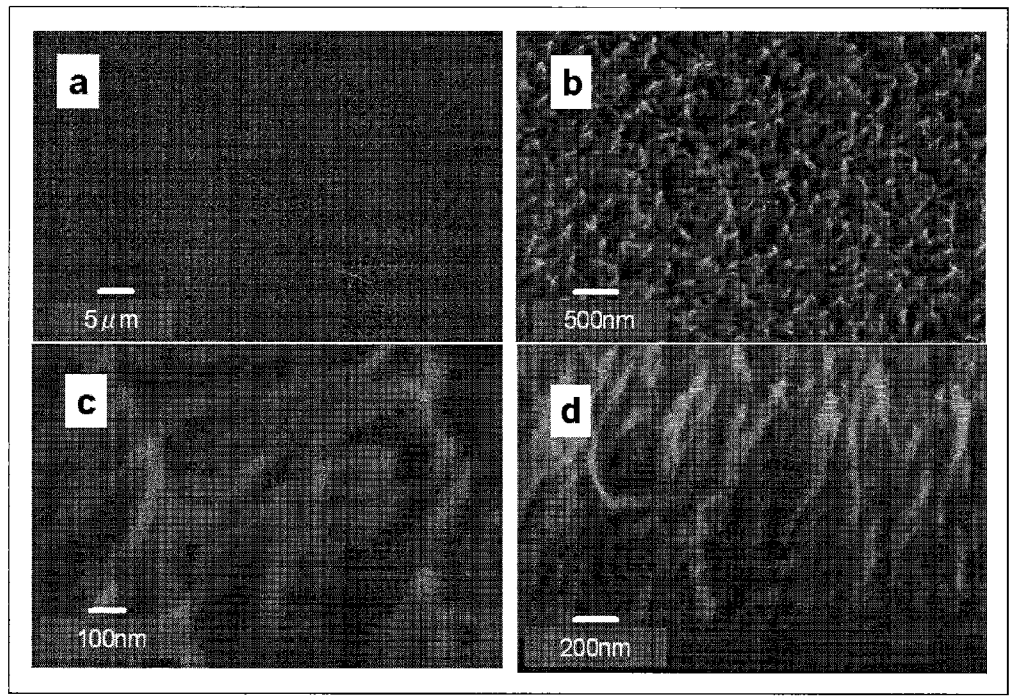
FIG. 12 is a scanning electron microscope photograph of the structure obtained in Example 4-4.

After that, the edge of the glass tube prepared was crushed, and the piece of the glass tube was observed by SEM. The result of the SEM photograph is shown in FIG. 8. It was confirmed from the SEM photograph that the glass tube was covered with belt-like nano-fibers having a width of about 100 nm.

Examples 4-1 to 4-4

[Structure in which an Inner Wall of a Glass Tube is Covered with a Nanostructure Composite of a Polymer/Copper Ion/Silica]

A fixed amount of copper nitrate was dissolved in distilled water to produce 0.014% by mol of $Cu(NO_3)_2$ aqueous solution. Then, 60 mg of the polymer (L-PEI) was added in the aqueous solution to prepare mixed solutions such that the molar ratio of $(CH_2CH_2 NH)$ unit/Cu be 50/1, 100/1, 200/1, or 600/1. These mixed solutions were heated to 90° C. Then, similar to Example 3, the inner surface of the glass tube was covered with the nanostructure composite.

Figure 13:
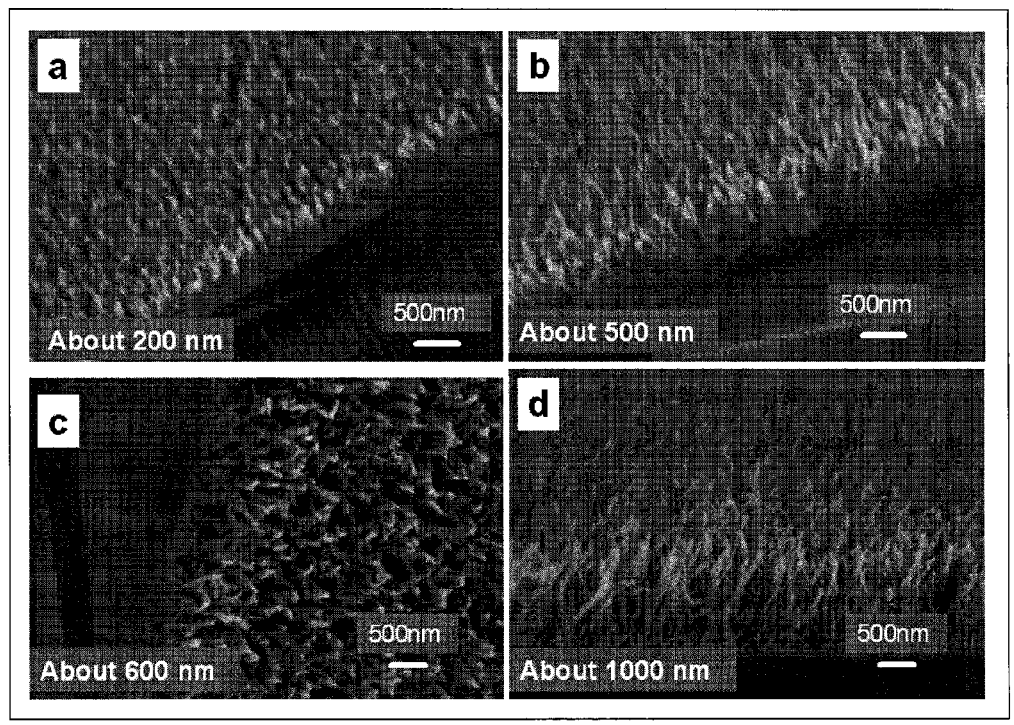
FIG. 13 is a scanning electron microscope photograph of the structure obtained in Example 4.

After that, the edge of the glass tube was crushed, and the piece of the glass tube was observed by SEM. The result of the SEM photograph is shown in FIGS. 9 to 12. FIG. 13 is photographs showing only the covering layer made of the nanostructure composite having the different molar ratio of $(CH_2CH_2 NH)$ unit/Cu. It was confirmed that the thickness of the covering layer increased from 200 nm to about 1,000 nm depending on an increase of the molar ratio of $(CH_2CH_2 NH)$ unit/Cu (an decrease of copper ion content).

TABLE 3

Structure covered with the nanostructure composite of polymer/copper ion/silica

| | Example | | | |
|---|---|---|---|---|
| | 4-1 | 4-2 | 4-3 | 4-4 |
| Silica source solution (volume ratio) | $H_2O$/IPA/MS51 3/3/0.2 | $H_2O$/IPA/MS51 3/3/0.2 | $H_2O$/IPA/MS51 3/3/0.2 | $H_2O$/IPA/MS51 3/3/0.2 |
| Amount of 0.014% by mol of $Cu(NO_3)_2$ aqueous solution | 2.0 mL | 1.0 mL | 0.5 mL | 0.17 mL |
| molar ratio of $(CH_2CH_2NH)$ unit/Cu | 50/1 | 100/1 | 200/1 | 600/1 |
| Immersion time in silica solution | 30 minutes | 30 minutes | 30 minutes | 30 minutes |
| Structural feature of the surface | Nano-grass in which nano-fibers stand side by side | Nano-grass in which nano-fibers stand side by side | Nano-grass in which nano-fibers stand side by side | Nano-grass in which nano-fibers stand side by side |

Notes in Table 3
IPA: isopropyl alcohol

Example 5

[Structure in which an Inner Wall of a Glass Tube is Covered with a Nanostructure Composite of a Polymer/Gold Nano-particle/Silica]

The structure, which is the glass tube produced in Example 1-1, was immersed into 2 mL of $NaAuCl_{4}.2H_2O$ (1%), and was heated at 80° C. for 1 hour. After taking the glass tube out of the solution and washing with distilled water and ethanol in this order, it was dried at room temperature. Light with wine red color could be observed in the obtained glass tube. This wine red color is derived from the plasmon absorption which shows the existence of golden nano-particle in the layer covering the inner wall of the glass tube. In addition, the plasmon absorption having a peak at 520 nm, which is derived from the golden nano-particle, could be observed by a reflection spectrum (marketed by Hitachi, Ltd., UV-3500). Based on these results, it was confirmed that golden nano-particles in several nanometer scale were formed in the covering layer.

Figure 14:
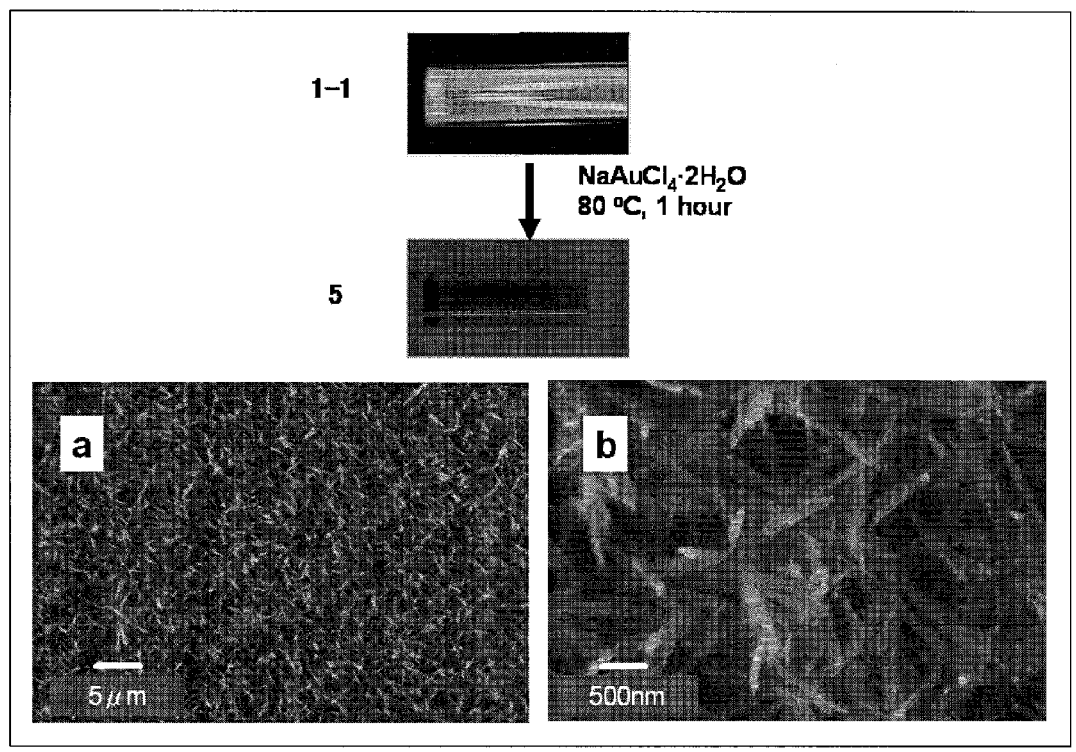
FIG. 14 is a scanning electron microscope photograph of the structure obtained in Example 5.

FIG. 14 is a SEM photograph showing the structure containing the golden nano-particles inside thereof. It was confirmed that even when the golden nano-particles were produced in the covering layer, the nano-fiber, which is a basic unit of the nanostructure composite, did not change the structure itself.

Example 6

[Structure in which an Inner Wall of a Polystyrene Tube is Covered with a Nanostructure Composite of a Polymer/Silica]

Figure 15:
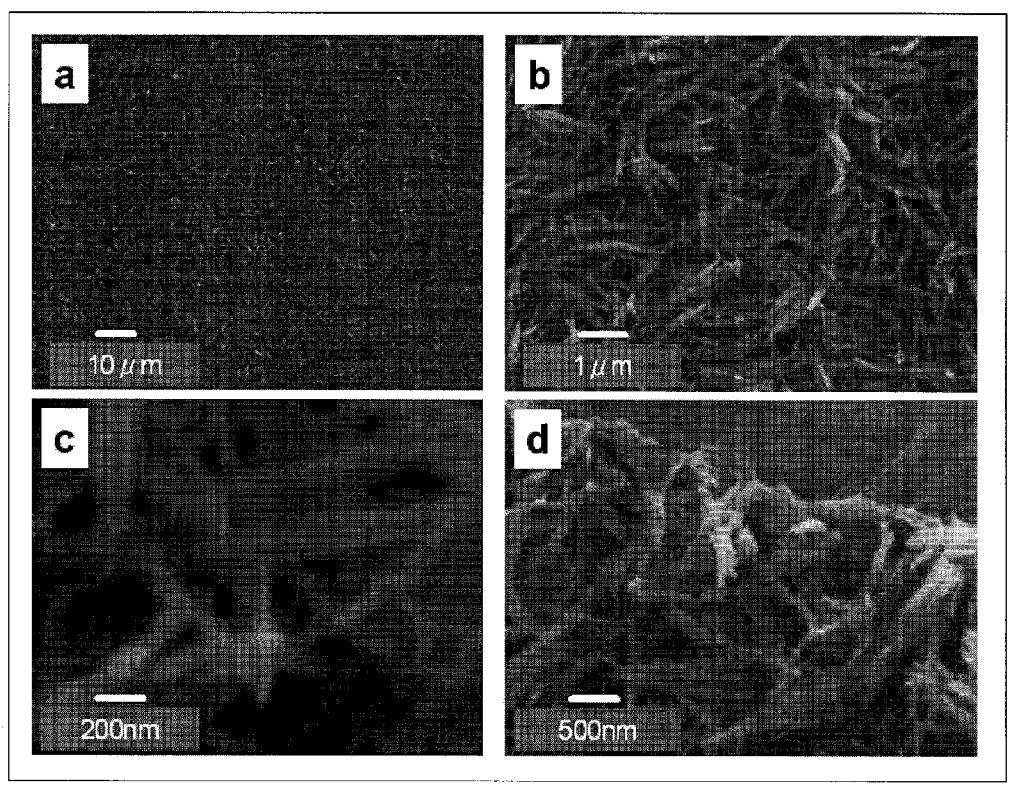
FIG. 15 is a scanning electron microscope photograph of the structure obtained in Example 6.

6 mL of concentrated sulfuric acid was added into the commercial polystyrene test tube (16×100 mm, 10 mL capacity), and it was stirred with a shaker at room temperature for 3 hours. After taking out the concentrated sulfuric acid liquid, the test tube was washed with distilled water and methanol, and dried. Then 6 mL of 3%-L-PEI aqueous solution (80° C.) was added into the dried test tube, all the solution was taken out after 30 seconds. The test tube was left to stand at room temperature for 5 minutes. Then, 6 mL of a mixed solution (MS51/distilled water/IPA=0.5/3/3 in volume) of the silica sauce was added into the test tube, and it was left to stand at room temperature for 20 minutes. After taking out the mixed solution, the inside of the test tube was washed with ethanol, and it was dried at room temperature to obtain a structure. Then, the test tube was broken to produce a piece. The inside wall of the piece was observed by SEM. FIG. 15 is a SEM photograph of the boundary (cross-sectional direction) showing the surface of the piece and polystyrene, and the covering layer.

Example 7

[Structure, in which a Polystyrene Stick is Covered with a Nanostructure Composite of a Polymer/Silica]

Figure 16:
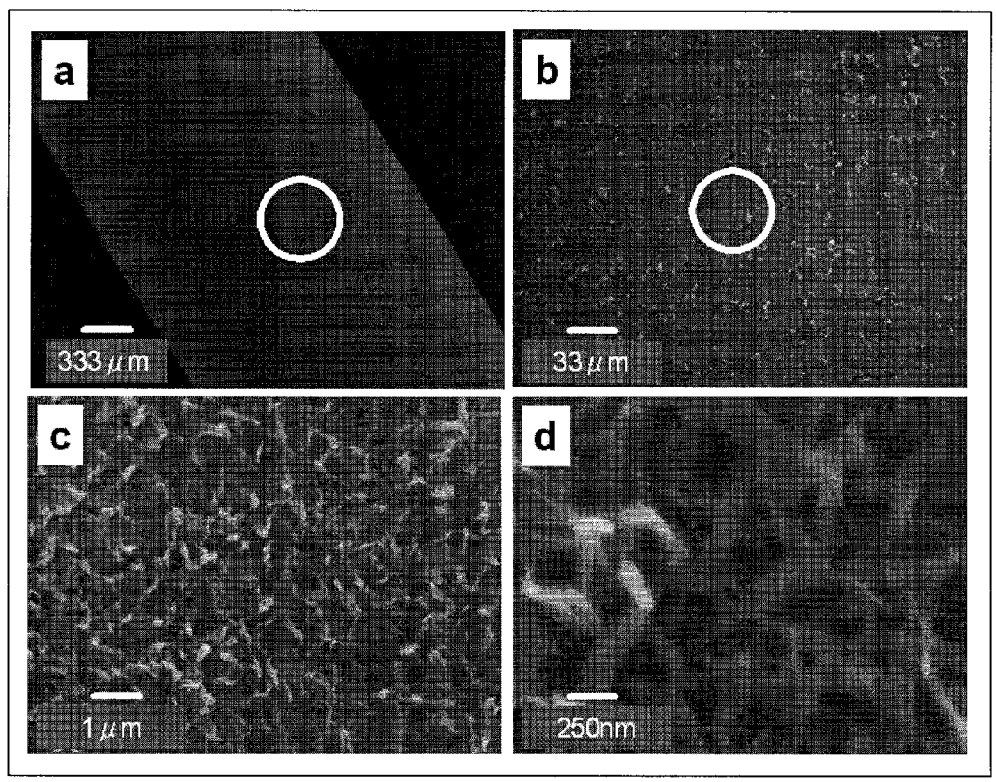
FIG. 16 is a scanning electron microscope photograph of the structure obtained in Example 7.

After immersing a polystyrene stick having a thickness of about 1.8 mm into a concentrated sulfuric acid solution for 3 hours, the surface of the polystyrene stick was washed with water and methanol, and it was dried at room temperature for 5 minutes. Then, the polystyrene stick was immersed into 4%-L-PEI aqueous solution (80° C.), and it was left to stand for 30 seconds. After taking out the stick, it was left to stand at room temperature for 5 minutes, the stick was immersed into a mixed solution (MS51/distilled water/IPA=0.5/3/3 in volume) of a silica source, and it was left to stand at room temperature for 20 minutes. After taking the stick out of the solution, the surface of the stick was washed with ethanol, it was dried at room temperature, and the cylindrical structure was obtained. The surface of the obtained stick was observed by SEM. FIG. 16 is a SEM photograph showing the nano-fibers covering the surface of the stick. It was confirmed from the SEM photograph that the entire surface of the stick was covered with the nanostructure composite containing nano-fibers as a basic unit.

Example 8

[Structure in which a Surface of a Polystyrene Plate is Covered with a Nanostructure Composite of a Polymer/Silica]

Figure 17:
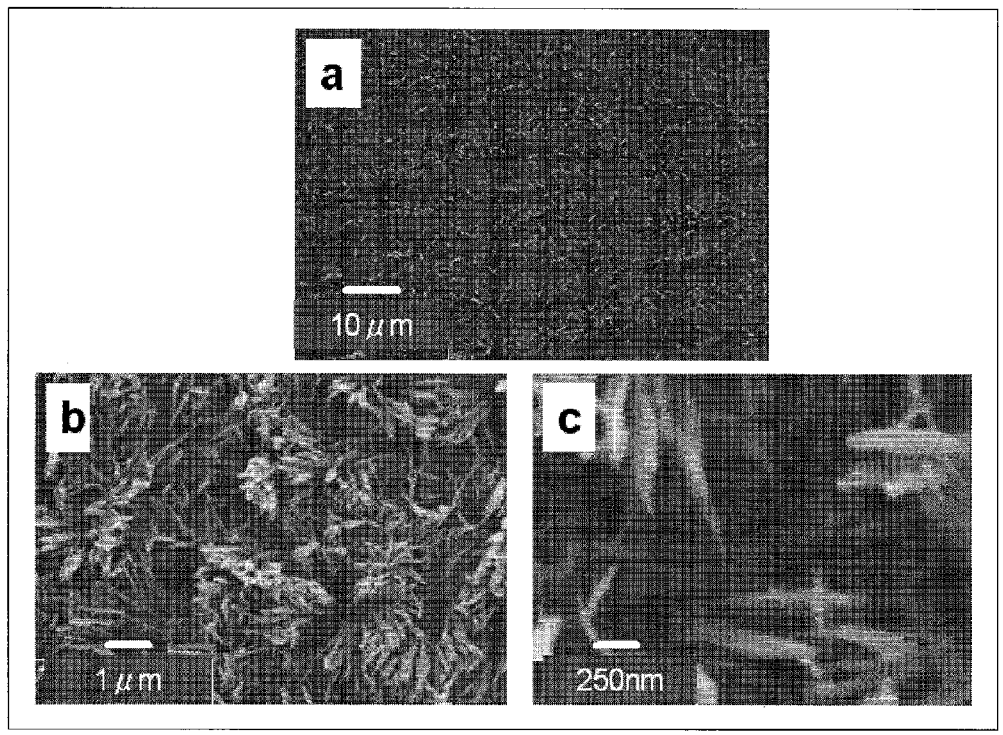
FIG. 17 is a scanning electron microscope photograph of the structure obtained in Example 8.

After immersing a polystyrene plate having a size of 2 cm×2 cm into a concentrated sulfuric acid liquid for 3 hours, the surface of the plate was washed with water and methanol, and it was dried at room temperature for 5 minutes. Then, the polystyrene plate was immersed into 4%-L-PEI solution (80° C.), and it was left to stand for 30 seconds. After taking the plate out of the solution, it was left to stand at room temperature for 5 minutes, and it was immersed into a mixed solution (MS51/water/IPA=0.5/3/3 in volume) of a silica source, it was left to stand at room temperature for 20 minutes. After taking the plate out of the solution, the surface of the plate was washed with ethanol, and it was left to stand at room temperature to obtain a plate-shaped structure. The surface of the obtained plate was observed by SEM. FIG. 17 shows the nano-fibers covering the surface of the plate. It was confirmed from the SEM photograph that the surface of the plate contains a nano-rice-field having a structure as if rice ears were blown by the wind.

Example 9

[Structure in which a Surface of Acopper Plate is Covered with a Nanostructure Composite of a Polymer/Silica]

Figure 18:
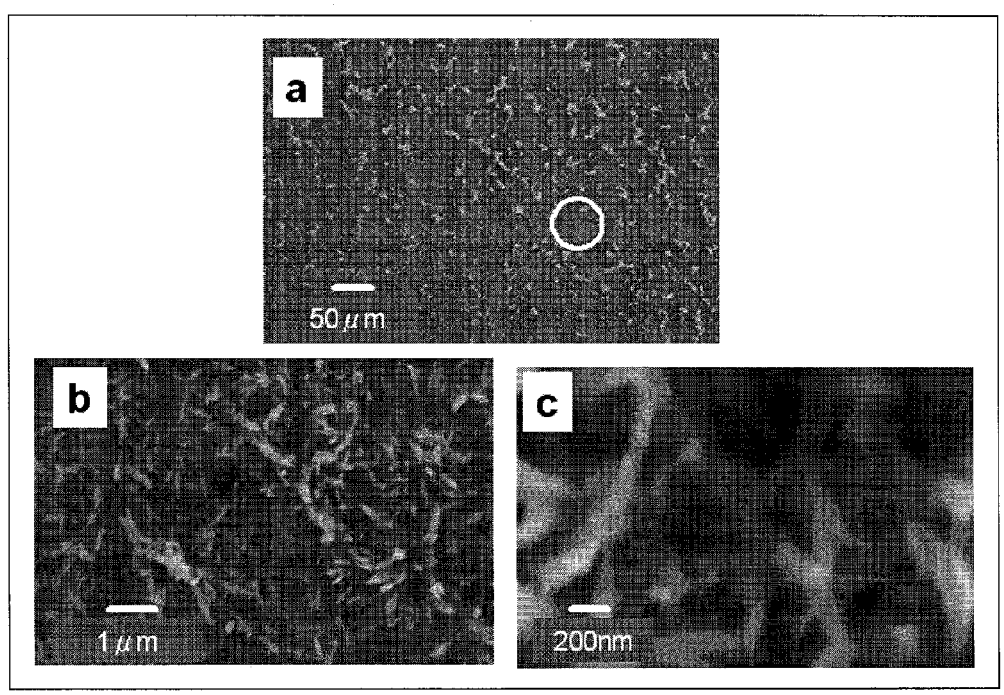
FIG. 18 is a scanning electron microscope photograph of the structure obtained in Example 9.

A copper plate having a size of 1 cm×1 cm was immersed into 4%-L-PEI solution (80° C.), and it was left to stand for 30 seconds. After taking the plate out of the solution, it was left to stand at room temperature for 5 minutes. After immersing the plate into a mixed solution (MS51/water/IPA=0.5/3/3) of a silica source, it was left to stand at room temperature for 20 minutes. After taking the plate out of the mixed solution, the surface of the plate was washed with ethanol, and it was dried at room temperature to produce a plate-shaped structure. The surface of the obtained plate was observed by SEM. FIG. 18 is the SEM photograph thereof. It was confirmed from FIG. 18 that the surface of the plate was covered with the nanostructure composite containing nano-fibers as a basic unit. It was also confirmed from a photograph with lower magnification that even though there are particles on the surface of the plate, the entire covering layer is covered with nano-fibers.

Example 10

[Structure in which an Inner Wall of a Glass Tube is Covered with a Nanostructure Composite of a Star-shaped Polymer/Silica]

Figure 19:
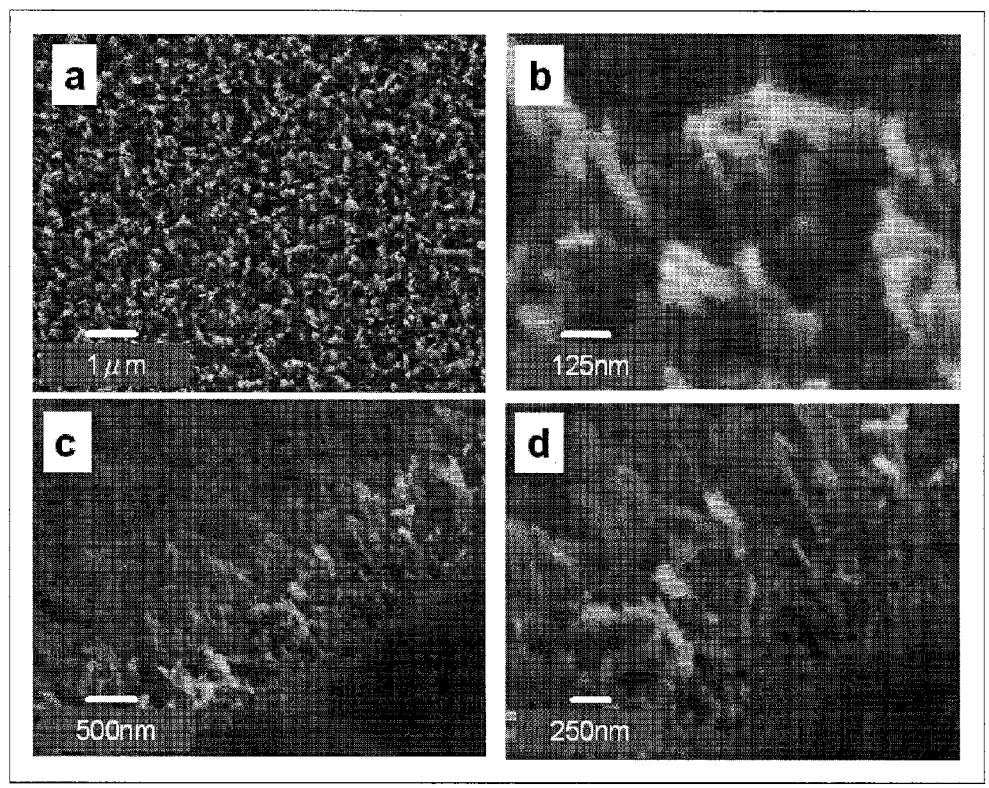
FIG. 19 is a scanning electron microscope photograph of the structure obtained in Example 10.

A structure was obtained in a manner identical to that of Example 1-1, except that a glass tube having an inner diameter of 6 mm was used, B-PEI produced in Synthesis Example 2 was used as the polymer, and a mixed solution (TMOS/distilled water=1/1 in volume) as a silica source was used. Then, the edge of the obtained glass tube was broken, and the surface of the piece was observed by SEM. FIG. 19 is a SEM photograph showing the surface of the inner wall of the glass tube. It was confirmed from the SEM photograph that the nano-fibers were arranged closely side by side on the inner wall of the glass tube.

Example 11

[Structure in which an Inner Wall of a Glass Tube is Covered with a Nanostructure Composite of a Porphyin Star-shaped Polymer/Silica]

Figure 20:
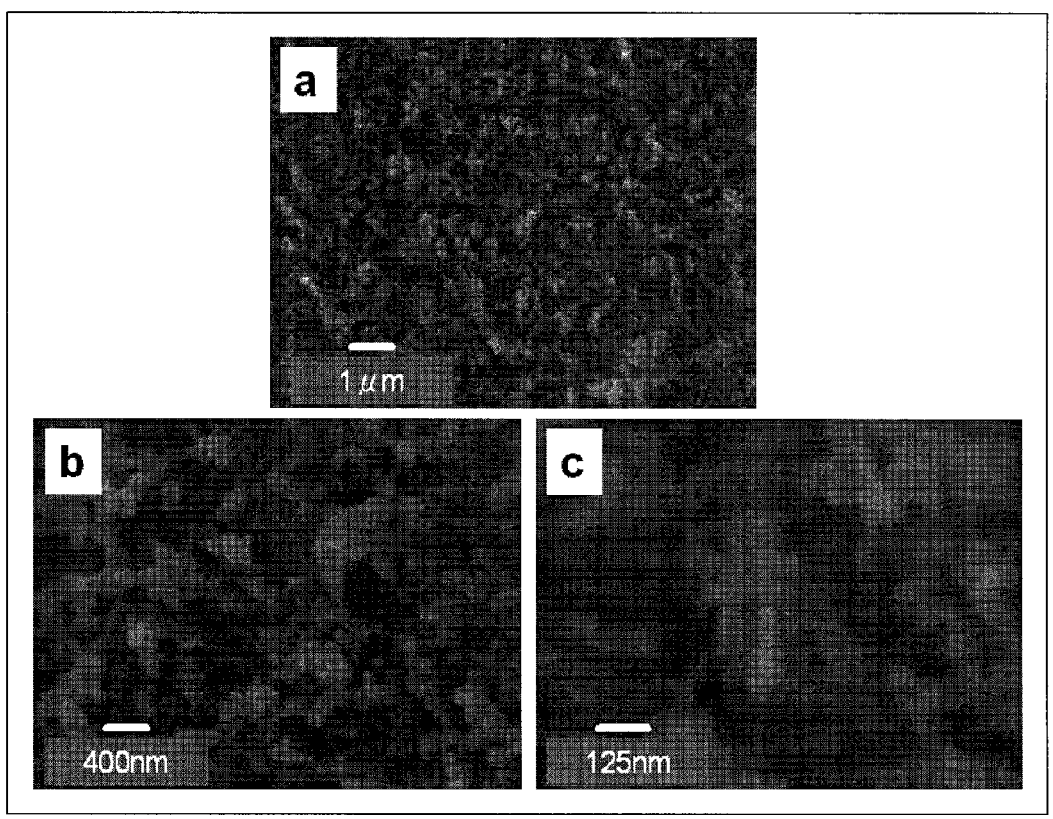
FIG. 20 is a scanning electron microscope photograph of the structure obtained in Example 11.

A structure was obtained in a manner identical to that of Example 10, except that P-PEI produced in Synthesis Example 3 was used as the polymer. Then the edge of the obtained glass tube was broken, and the surface of the piece was observed by SEM. FIG. 20 is a SEM photograph showing the surface of the inner wall of the glass tube. It was confirmed from the SEM photograph that the ends of the nano-fibers arranged closely side by side are rounded shaped.

Example 12

[Structure in which a Surface of a Glass Plate is Covered with a Nanostructure Composite of a Polymer/Silica]

Figure 21:
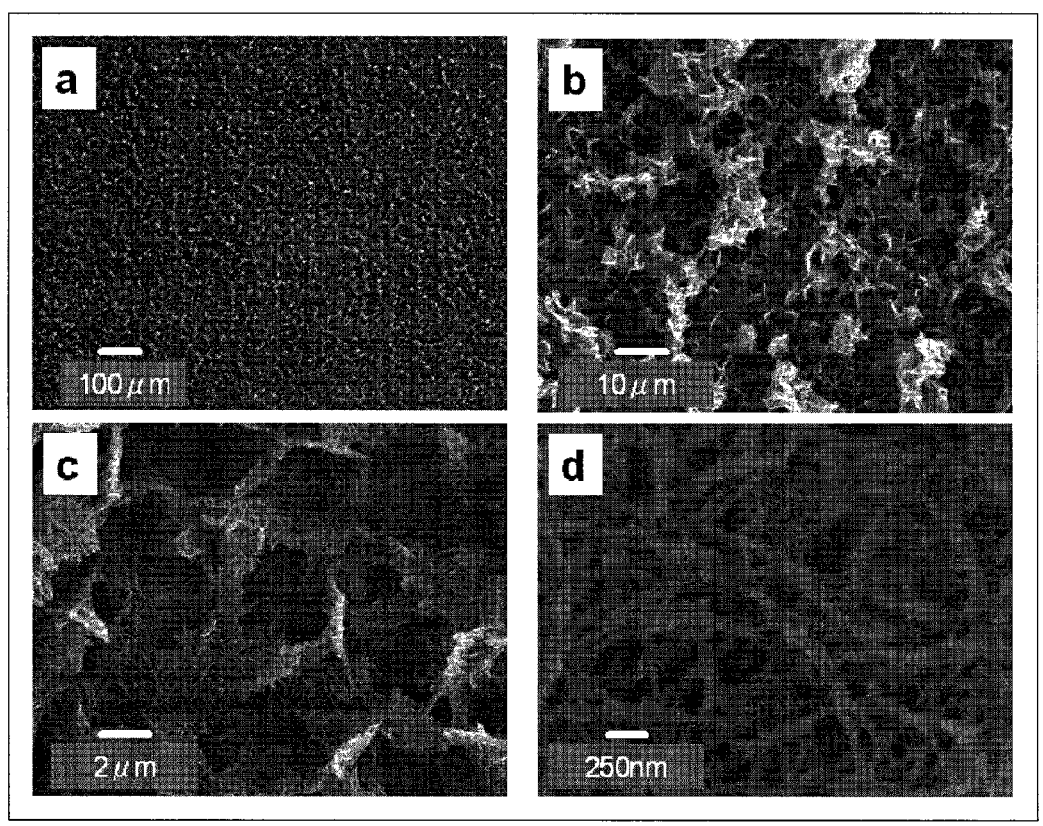
FIG. 21 is a scanning electron microscope photograph of the structure obtained in Example 12.

After immersing a glass plate, which is made of soda lime, and has a size of 2 cm×2 cm, into a 4%-L-PEI aqueous solution (80° C.), it was left to stand for 30 seconds. After taking the glass plate out of the solution, it was left to stand at room temperature for 5 minutes, and it was immersed into a mixed solution (MS51/water/IPA=0.5/3/3 in volume) of a silica source, it was left to stand at room temperature for 20 minutes. After taking the plate out of the mixed solution, the surface of the plate was washed with ethanol, and it was left to stand at room temperature to obtain a plate-shaped structure. The surface of the obtained plate was observed by SEM. FIG. 21 shows the basic unit of the nano-fibers covering the surface of the plate is nano-fibers. It was confirmed from the SEM photograph that the nanostructure composite on the surface of the plate forms a network spreading horizontally.

Example 13

[Structure in which an Inner Wall of a Glass Tube is Covered with a Nanostructure Composite of a Polymer/Silica]

Figure 22:
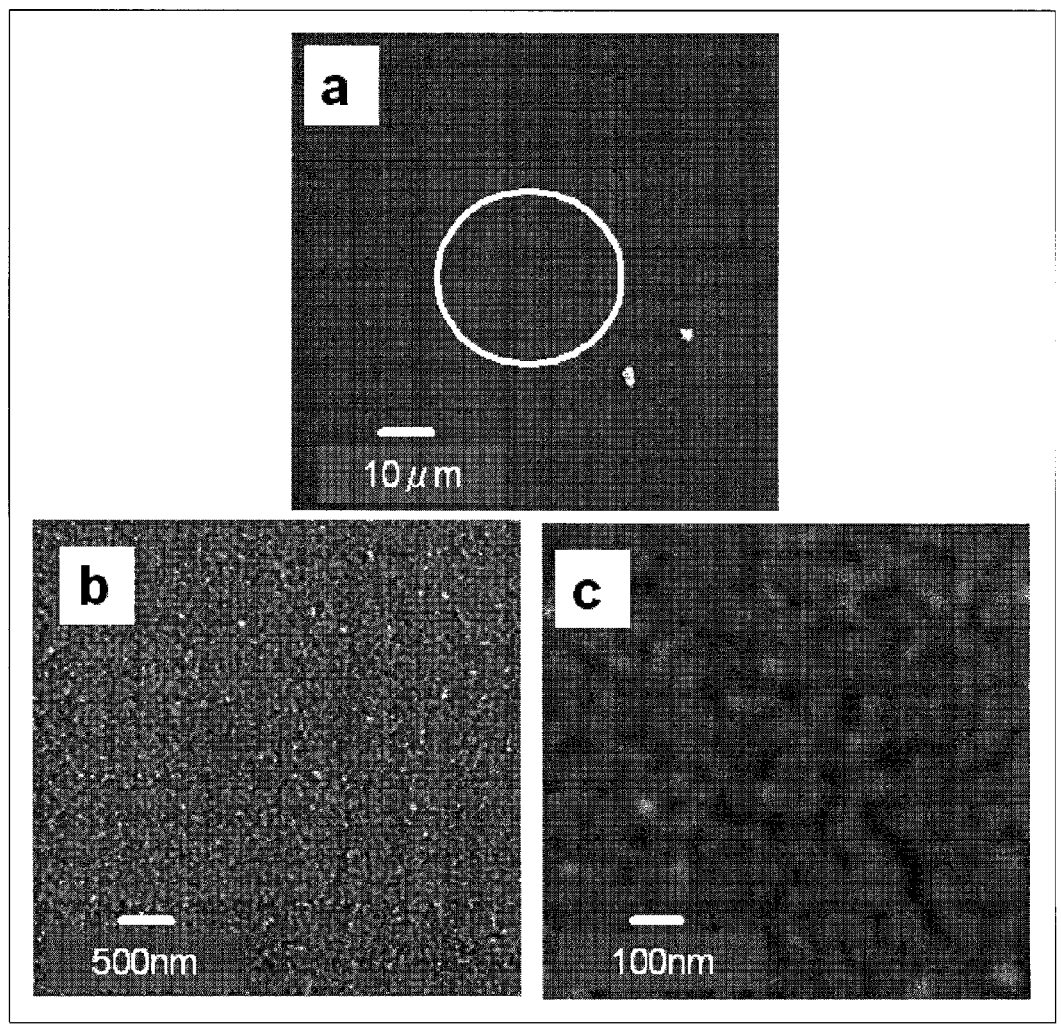
FIG. 22 is a scanning electron microscope photograph of the structure obtained in Example 13.

Commercial multibranched polyethyleneimine (SP200, marketed by NIPPON SHOKUBAI Co., Ltd.) was added into distilled water to prepare 4%-aqueous solution. After connecting a glass tube (inside diameter: 6 mm; length: 5 cm) made of soda lime with a syringe using a rubber tube, a fixed amount of the polymer solution was sucked in the glass tube, and it was left to stand for 30 seconds. Then, the polymer aqueous solution was discharged by the pushing force of the syringe. A polymer absorbing layer was formed on the inner wall of the glass tube. After leaving this glass tube to stand at room temperature for 5 minutes, the glass tube was immersed into a silica source solution (TMOS/distilled water=1/1 in volume) for 30 minutes. After taking the glass tube out of the solution, the inner wall of the glass tube was washed with ethanol, and it was dried at room temperature to produce a structure. After that, the edge of the glass tube was crushed, and the piece of the glass tube was observed by SEM. FIG. 22 is the SEM photograph showing the inner wall of the glass tube. It was confirmed from the SEM photograph that the nano-particles of about 20 nm spread closely on the entire inner wall of the glass tube to form a network.

Example 14

[Structure in which an Inner Wall of a Glass Tube is Covered with a Nanostructure Composite of a Polymer/Copper Nanoparticle/Silica]

The glass tube obtained in Example 4-1, of which the inner wall was covered with the nanostructure composite containing the copper ion, was immersed into 6 mL of 1%-boron hydride ammonium aqueous solution, and it was left to stand at room temperature for 3 hours to perform a reduction reaction of the copper ion. After washing the sample tube with distilled water and ethanol, absorption spectrum was measured by a diffusion reflection spectroscope. 630 nm absorption, which is derived from copper ions, was disappeared, and a plasmon absorption at 590 nm, which is derived from copper-nano-particles, was appeared. This shows that copper ions were changed into copper nano-particles and the copper nano-particles were contained in the nanostructure composite covering the inner wall of the glass tube.

Examples 15-1 to 15-3

[Structure in which an Inner Wall of a Glass Tube is Covered with a Nanostructure Composite of Titania/Polymer]

The polymer L-PEI obtained in Synthesis Example 1 was added into distilled water, and heated to 90° C. to prepare a 4%-solution. After connecting a glass tube (inside diameter: 4 mm; length: 5 cm) made of soda lime with a syringe using a rubber tube, a fixed amount of the heated polymer aqueous solution was sucked in the glass tube, and it was left to stand for 30 seconds. Then, the polymer aqueous solution was discharged by the pushing force of the syringe. An L-PEI polymer layer was formed on the inside of the glass tube by this operation. After leaving this glass tube to stand at room temperature for 5 minutes, the glass tube was immersed into various titanium source solutions in Table 4 for 30 minutes. After taking the glass tube out of the solution and washing the inner wall of the glass tube with ethanol, it was dried at room temperature. After that, a reflected color of light blue was observed at the glass tube.

Figure 23:
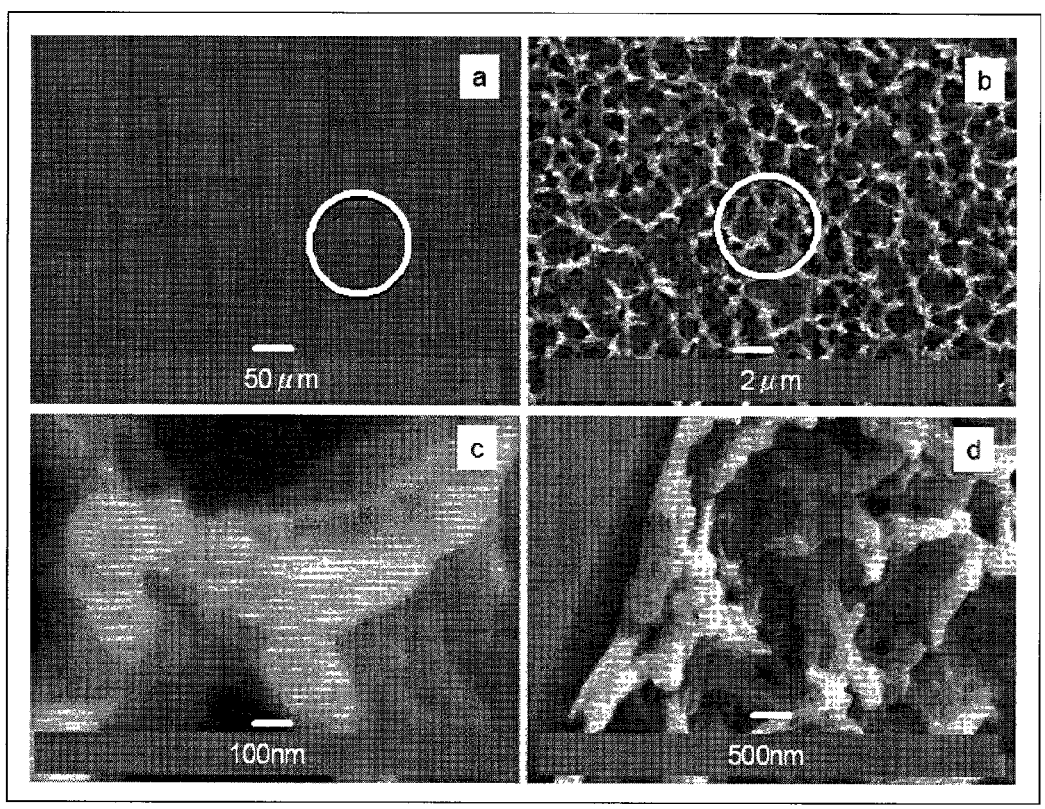
FIG. 23 is a scanning electron microscope photograph of the structure obtained in Example 15-1.
Figure 24:
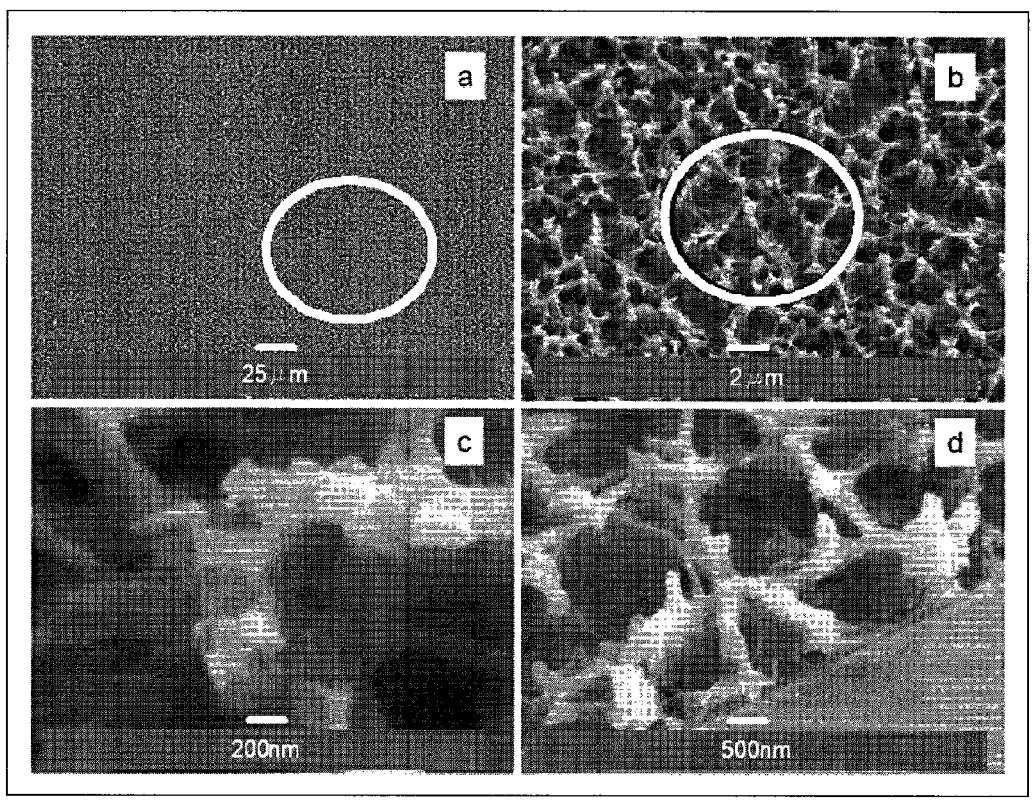
FIG. 24 is a scanning electron microscope photograph of the structure obtained in Example 15-2.
Figure 25:
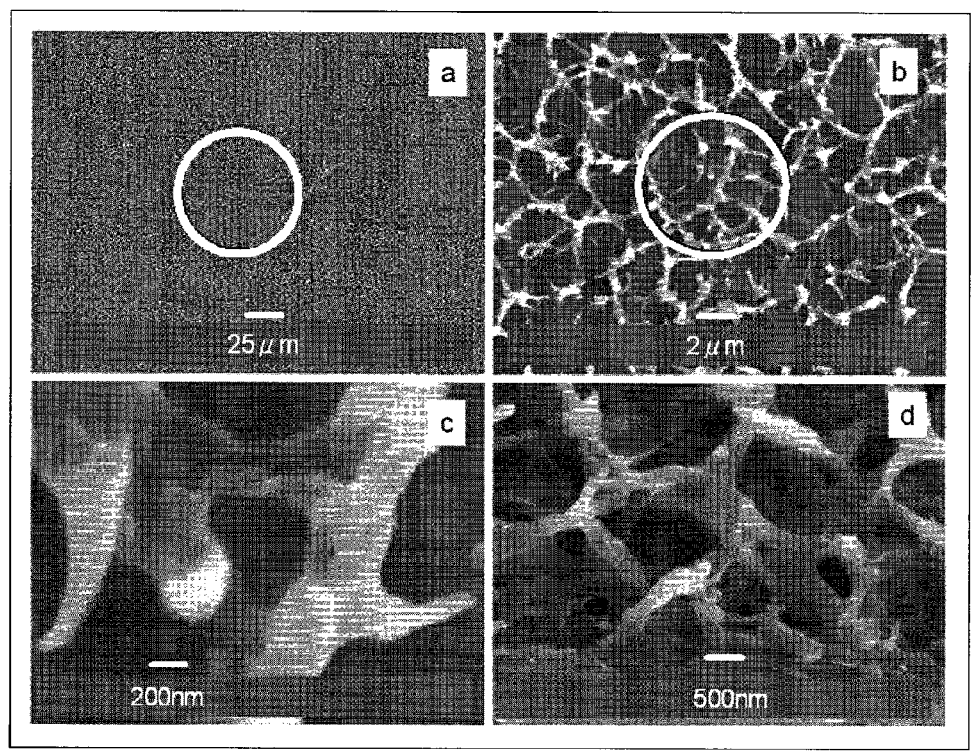
FIG. 25 is a scanning electron microscope photograph of the structure obtained in Example 15-3.

After that, the edge of the glass tube was crushed, and the piece of the glass tube was observed by SEM. The result of the SEM photograph of the inner wall surface of the glass tube wall produced with different silica source liquids is shown in FIGS. 23 to 25. In any case, the film, in which nano-fibers are precisely arranged as a unit structure, could be obtained.

TABLE 4

|  | Example | | |
| --- | --- | --- | --- |
|  | 15-1 | 15-2 | 15-3 |
| Titanium source solution | TC315/0.03 M NH$_4$OH (aq.) (volume ratio: 1/100) | TC315/0.04 M NH$_4$OH (aq.) (volume ratio: 1/100) | TC315/0.2 M NH$_4$OH (aq.) (volume ratio: 1/100) |
| Immersion time | 30 minutes | 30 minutes | 30 minutes |
| Structural feature of the surface | Nano-fibers having protrusions | Nano-sponge having protrusions | Nano-fibers having a network |

Notes in Table 4
TC315: 44%-titanium lactate aqueous solution (marketed by Matsumoto Fine Chemical Co. Ltd.)

The result of the SEM photograph of the inner wall surface of the glass tube wall produced with different silica source liquids is shown in FIGS. 23 to 25. In any case, the film, in which nano-fibers are precisely arranged as a unit structure, could be obtained.

Examples 16-1 to 16-3

[Structure in which an Inner Wall of a Glass Tube is Covered with a Nanostructure Composite of Titania/Polymer]

A structure in which the inner wall was covered with the nanostructure composite, was obtained in a manner identical to that, of Example 15, except that the concentration of ammonia in the ammonia aqueous solution was increased.

Figure 26:
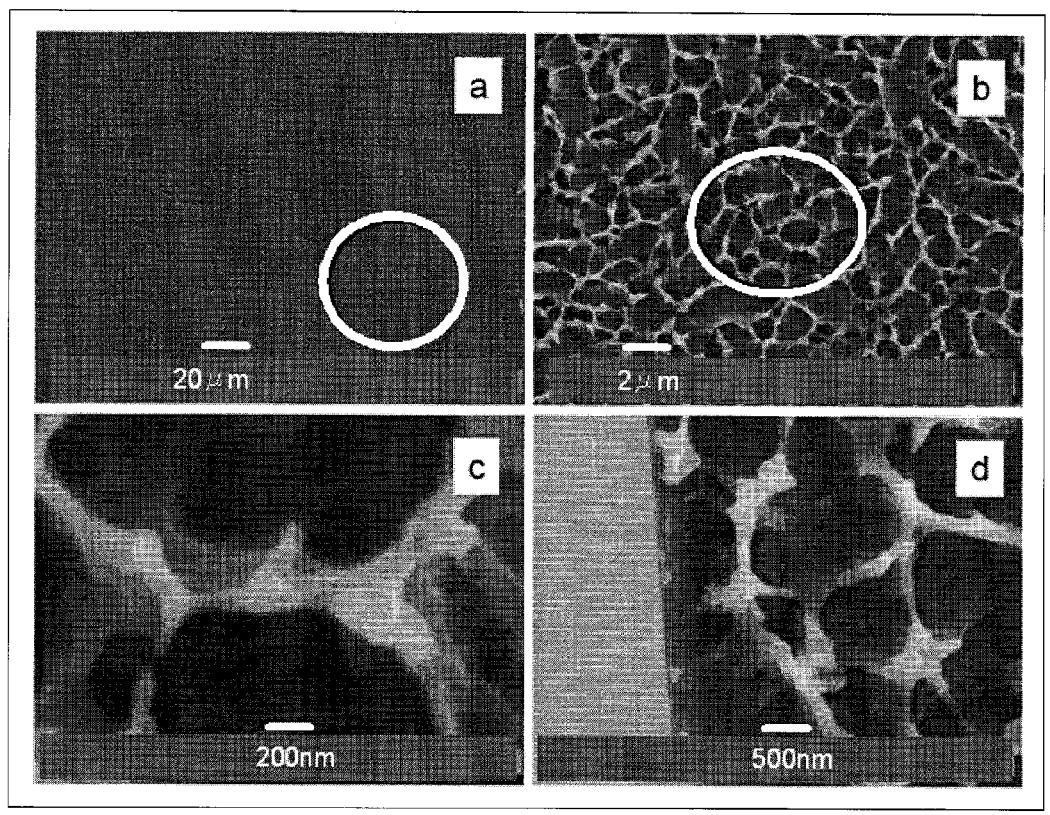
FIG. 26 is a scanning electron microscope photograph of the structure obtained in Example 16-1.
Figure 27:
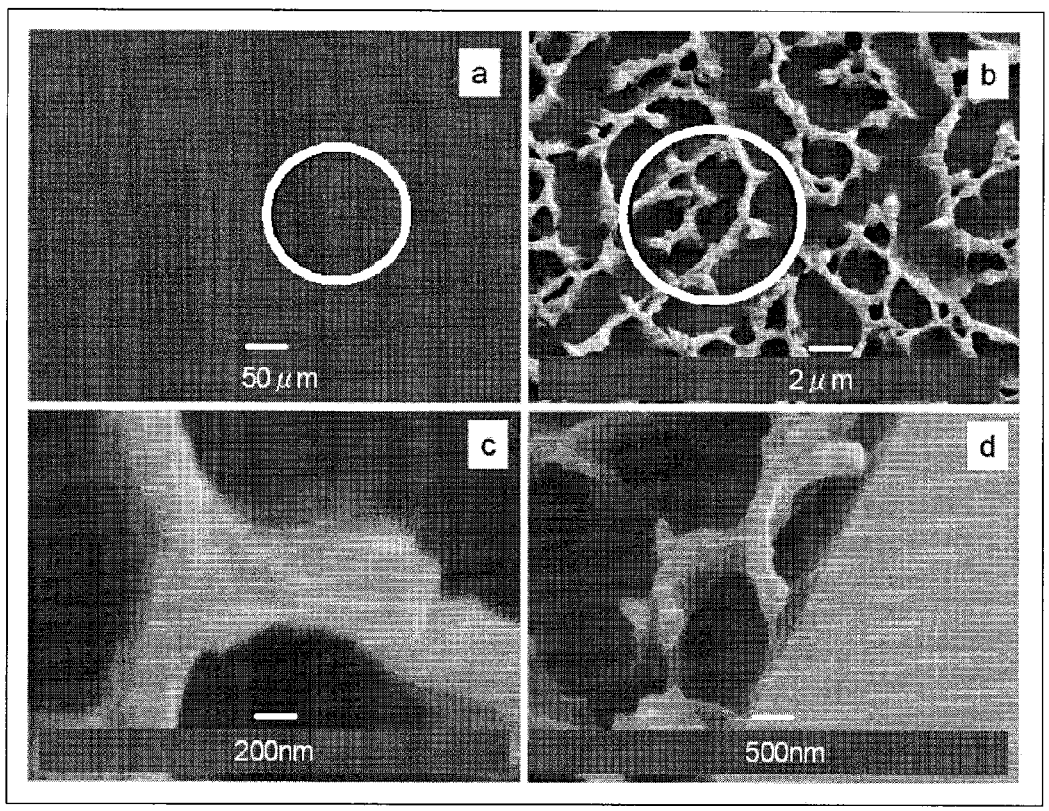
FIG. 27 is a scanning electron microscope photograph of the structure obtained in Example 16-2.
Figure 28:
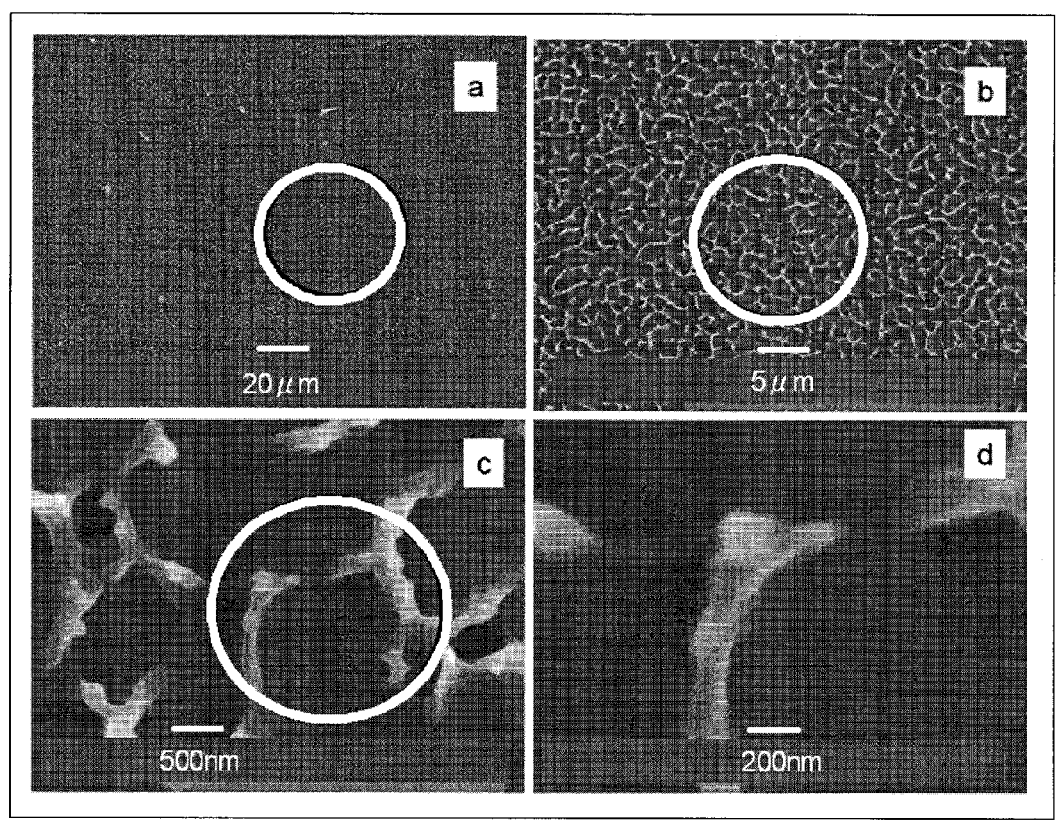
FIG. 28 is a scanning electron microscope photograph of the structure obtained in Example 16-3.

After that, the edge of the glass tube was crushed, and the piece of the glass tube was observed by SEM. The result of the SEM photograph of the inner wall surface of the glass tube wall produced with different titanium source liquids is shown in FIGS. 26 to 28. In any case, the film containing the nano-maze, in which nano-films were arranged like walls, could be obtained.

TABLE 5

|  | Example | | |
| --- | --- | --- | --- |
|  | 16-1 | 16-2 | 16-3 |
| Titanium source solution | TC315/0.5 M NH$_4$OH (aq.) (volume ratio: 1/100) | TC315/0.8 M NH$_4$OH (aq.) (volume ratio: 1/100) | TC315/1.0 M NH$_4$OH (aq.) (volume ratio: 1/100) |
| Immersion Time | 30 minutes | 30 minutes | 30 minutes |
| Structural feature of the surface | Nano-maze standing nano-films | Nano-maze standing nano-films | Nano-maze standing discontinuously nano-films |

Example 17

[Structure in which a Surface of a Glass Plate is Covered with a Nanostructure Composite of Titania/Polymer]

Figure 29:
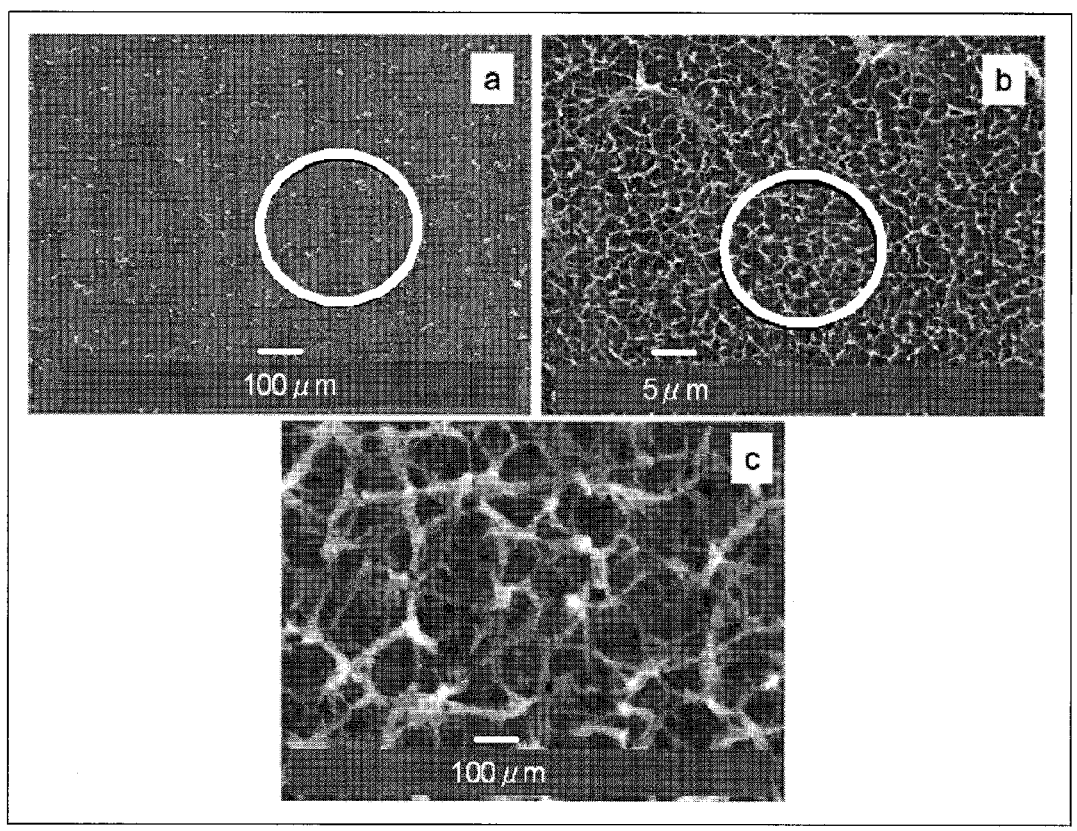
FIG. 29 is a scanning electron microscope photograph of the structure obtained in Example 17.

The polymer L-PEI obtained in Synthesis Example 1 was added into distilled water, and heated to 80° C. to prepare a 3%-aqueous solution. A glass slide (width: 3 cm, length: 5 cm) made of soda lime and a glass slide (width: 3 cm, length: 5 cm), which is made of soda lime and the surface was treated with amine, were immersed into the solution for 1 minute, and then they were left a it is for 1 minute at room temperature. Then, the glass slides were immersed into a titanium source solution (TC315/1.0 M ammonia solution=1/120 in volume) for 20 minutes to produce a layer made of polymer aggregates on the surface of the glass slides. After taking the glass slides out of the solution and washing the surface of the glass slides with ethanol, they were dried at room temperature to produce plate-shaped structures. After that, the surface of the slides was observed by SEM. FIG. 29 shows the nanostructure composite containing nano-fibers covering the surface of the slide.

Example 8

[Structure in which a Polystyrene Plate is Covered with a Nanostructure Composite of Titania/Polymer]

Figure 30:
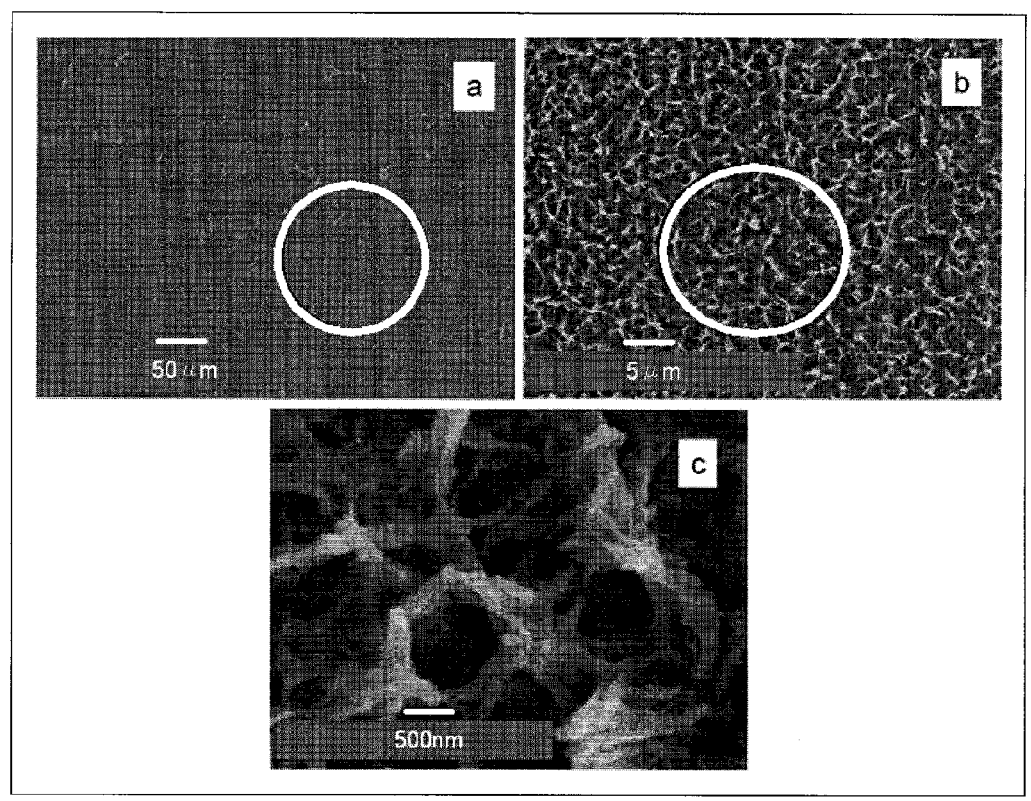
FIG. 30 is a scanning electron microscope photograph of the structure obtained in Example 18.

After immersing a polystyrene plate having a size of 2 cm×2 cm into a concentrated sulfuric acid liquid for 3 hours, the surface of the plate was washed with water and methanol, and it was dried at room temperature for 5 minutes. Then, the polystyrene plate was immersed into 3%-L-PEI solution (80° C.), and it was left to stand for 30 seconds. After taking the plate out of the solution, it was left to stand at room temperature for 5 minutes, and it was immersed into a mixed solution (TC315/1.0 M ammonium solution=0.5/120 in volume) of a titanium source, it was left to stand at room temperature for 20 minutes. After taking the plate out of the mixed solution, the surface of the plate was washed with ethanol, and it was left to stand at room temperature to obtain a plate-shaped structure. The surface of the obtained plate was observed by SEM. FIG. 30 shows the nano-maze covering the surface of the plate.

Example 19

[Structure in which a Steel Plate is Covered with a Nanostructure Composite of Titania/Polymer]

Figure 31:
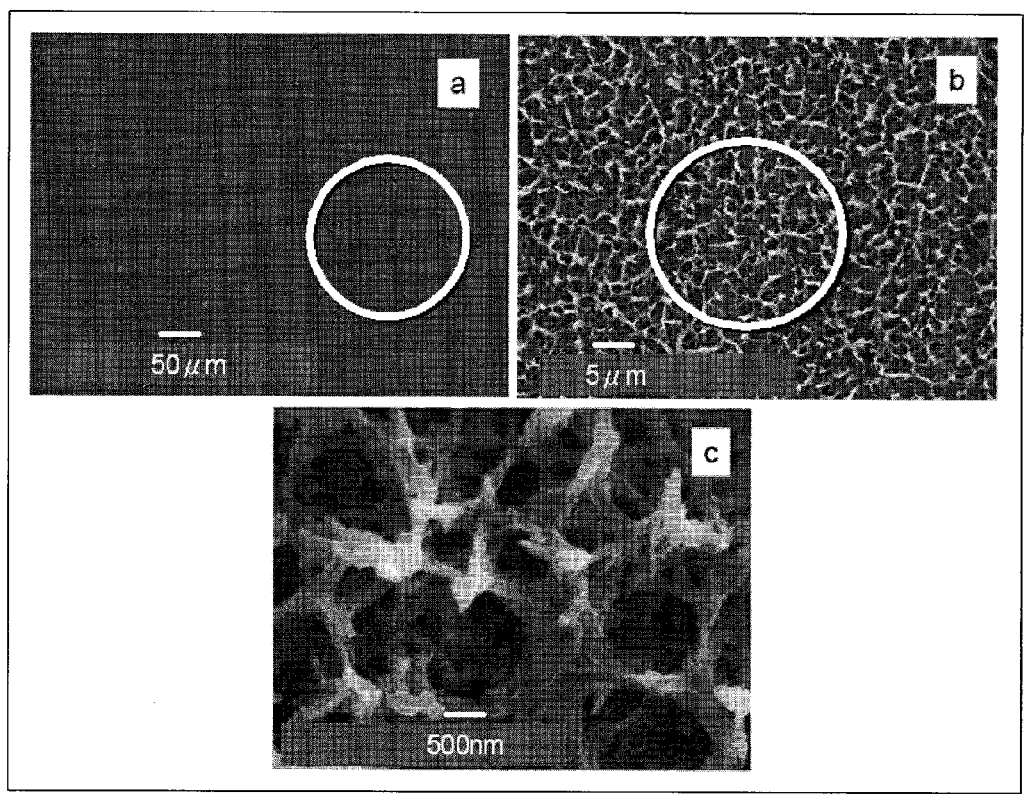
FIG. 31 is a scanning electron microscope photograph of the structure obtained in Example 19.

A structure, in which the surface of a steel plate was covered with the nanostructure composite, was obtained in a manner identical to that of Example 18. FIG. 31 is a SEM photograph showing the surface of the structure.

Example 20

[Structure in which a Surface of a Pet Sheet is Covered with a Nanostructure Composite of Titania/Polymer]

Figure 32:
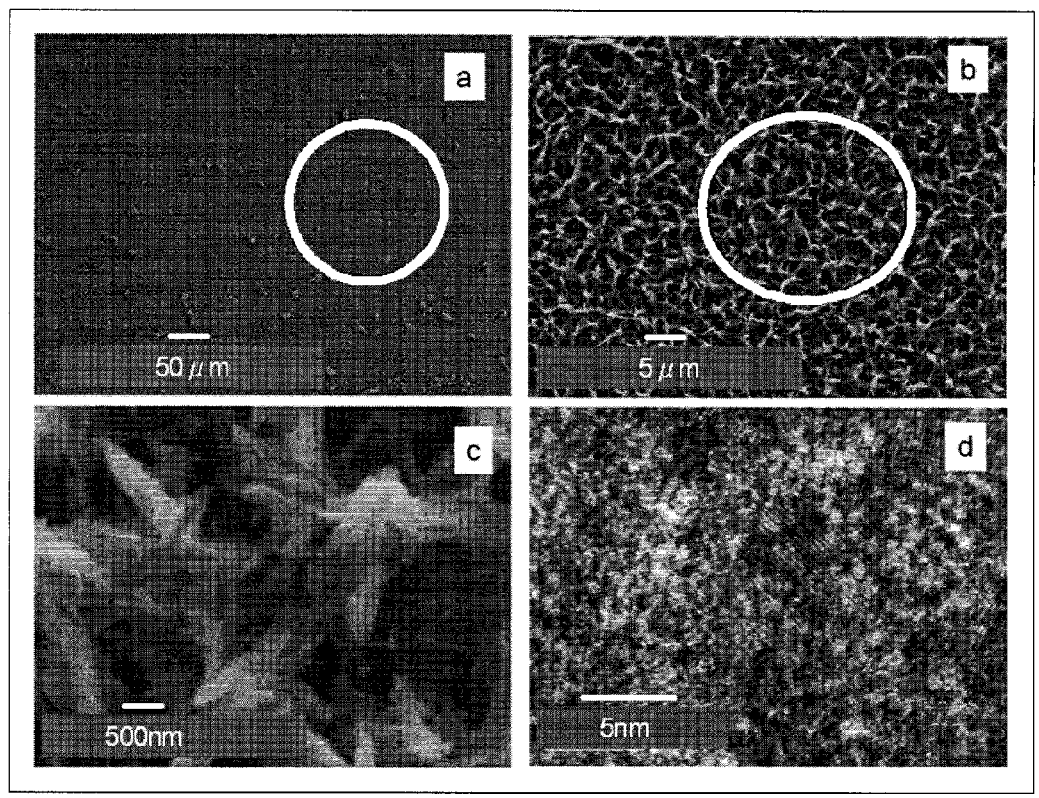
FIG. 32 is a scanning electron microscope/transmission electron microscope photograph of the structure obtained in Example 20.

A structure, in which the surface of a PET sheet was covered with the nanostructure composite, was obtained in a manner identical to that of Example 18. FIG. 32 is a SEM photograph showing the surface of the structure.

Example 21

[Structure in which a Surface of a Polyethylene-polyvinyl Alcohol Plate is Covered with a Nanostructure Composite of Titania/Polymer]

Figure 33:
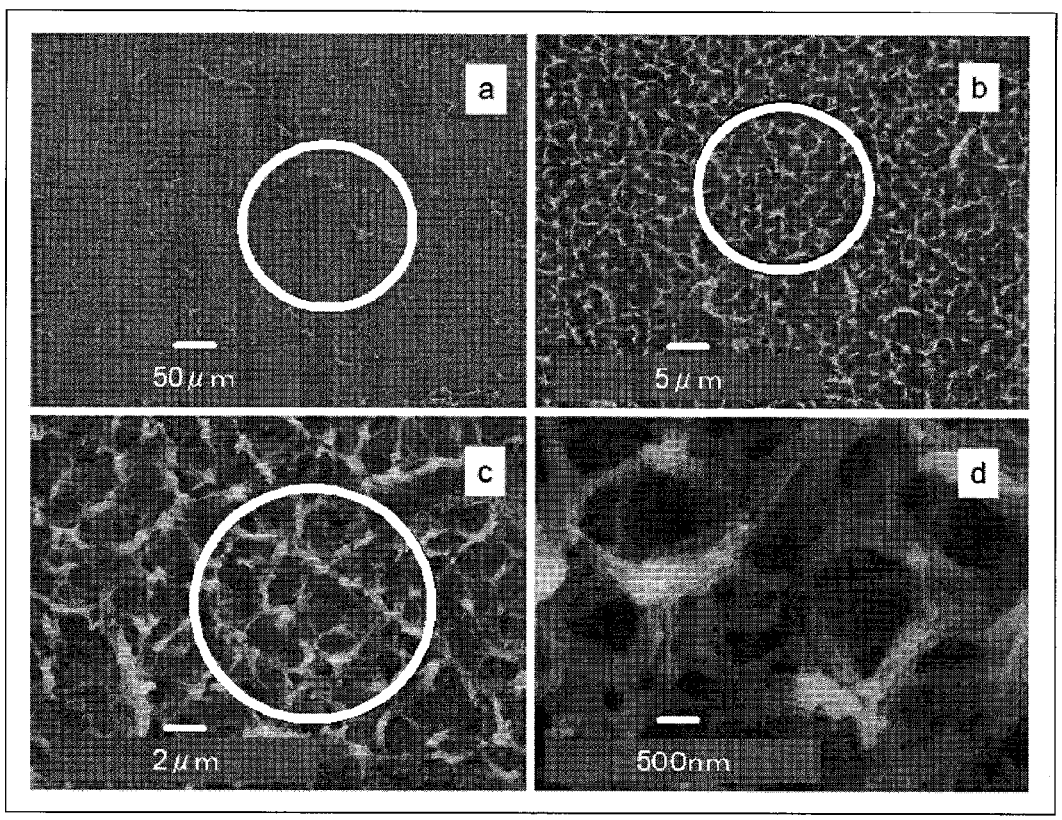
FIG. 33 is a scanning electron microscope photograph of the structure obtained in Example 21.

A structure, in which the surface of a polyethylene-polyvinyl alcohol plate was covered with the nanostructure composite, was obtained in a manner identical to that of Example 18. FIG. 33 is a SEM photograph showing the surface of the structure.

Example 22

[Structure in which a Surface of a Glass Plate is Covered with a Nanostructure Composite of Titania/Polymer]

Figure 34:
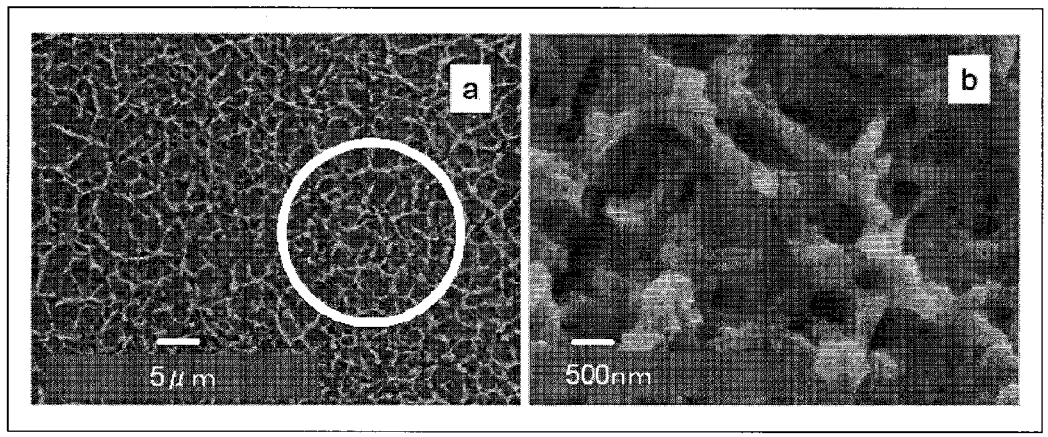
FIG. 34 is a scanning electron microscope photograph of the structure obtained in Example 22.

A structure, in which the surface of a glass plate was covered with the titania/polymer composite, was obtained in a manner identical to that of Example 17, except that the star-shaped polymer B-PEI, which was obtained in Synthesis Example 2, was used. FIG. 34 is a SEM photograph showing the surface of the structure.

Example 23

[Structure in which a Surface of a Glass Plate is Covered with a Nanostructure Composite of Titania/Gold Nano-particle/Polymer]

The glass tube having the structure, which was produced in Example 17, was immersed into 5 mL of $NaAuCl_4 \cdot 2H_2O$ (1%), and was heated at 80° C. for 1 hour. After taking out the glass plate and washing with distilled water and ethanol in this order, it was dried at room temperature. Light with wine red color could be observed in the obtained glass tube. This wine red color is derived from the plasmon absorption which shows an existence of golden nano-particle in the layer covering the inner wall of the glass tube. In addition, the plasmon absorption having a peak at 520 nm, which is derived from the golden nano-particle, could be observed by a reflection spectrum (marketed by Hitachi, Ltd., UV-3500). In addition, it was confirmed that when something, which was drop out of the covering layer, was observed, that was golden nano-particles in 3 to 4 nm scale.

Example 24

[Structure in which a Surface of a Glass Plate is Covered with a Nanostructure Composite of Titania/Copper Ion/Polymer]

The glass plate, which was obtained in Example 17 as the structure, was immersed into 5 mL of $Cu(NO_3)_2$ aqueous solution (concentration: 0.014 mol/L), and it was left to stand at room temperature for 3 hours. Then, the plate was taken out of the solution, and immersed into distilled water to wash. After drying, a layer covering the surface of the plate was blue. Based on the measurement result of reflected spectrum, absorption at around 630 nm, which is derived from copper ions, was observed.

Example 25

[Structure in which a Surface of a Glass Plate is Covered with a Nanostructure Composite of Titania/Pigment/Polymer]

The glass plate, which was obtained in Example 17 as the structure, was immersed into 5 mL of phenylporphyrin tetrasulfonate (TSPP) aqueous solution (concentration: 0.1% by weight), and it was left to stand at room temperature for 3 hours. Then, the plate was taken out of the solution, and immersed into distilled water to wash. After drying, it was confirmed that a layer covering the surface of the plate was strong red fluorescence color by a fluorescent microscope. A Soret band at around 420 nm, which is derived from porphyrin, was observed by reflection spectrum measurement. In addition, light emission at around 605 nm, which is derived from porphyrin, was observed fluorescent spectrum.

Example 26

[Structure in which a Surface of a Glass Plate is Covered with a Nanostructure Composite of Titania/Silver Nano-particle/Polymer]

The glass plate, which was obtained in Example 17 as the structure, was immersed into 5 mL of $AgNO_3$ aqueous solution at 0.1% by weight ($Ag/Na_4=1/6$ in molar ratio), and it was left to stand at room temperature for 3 hours. Then, the plate was taken out of the solution, and immersed into distilled water to wash. After immersing the plate into 5 mL of an ascorbic acid solution (1% by weight) for 2 hours, the plate was taken out from the solution. After that, when the reflection spectrum at the surface of the plate was measured, a Plasmon absorption at around 403 nm, which is derived from silver nano-particle, was observed.

Example 27

<Reaction Between Benzaldehyde and Malononitrile on an Immobilized Catalyst Type Glass Reactor>
[Preparation of a Reactor a in which an Inner Wall of a Glass Test Tube is Covered With a Solid Catalyst Containing Polymer/Silica Composite]

Figure 35:
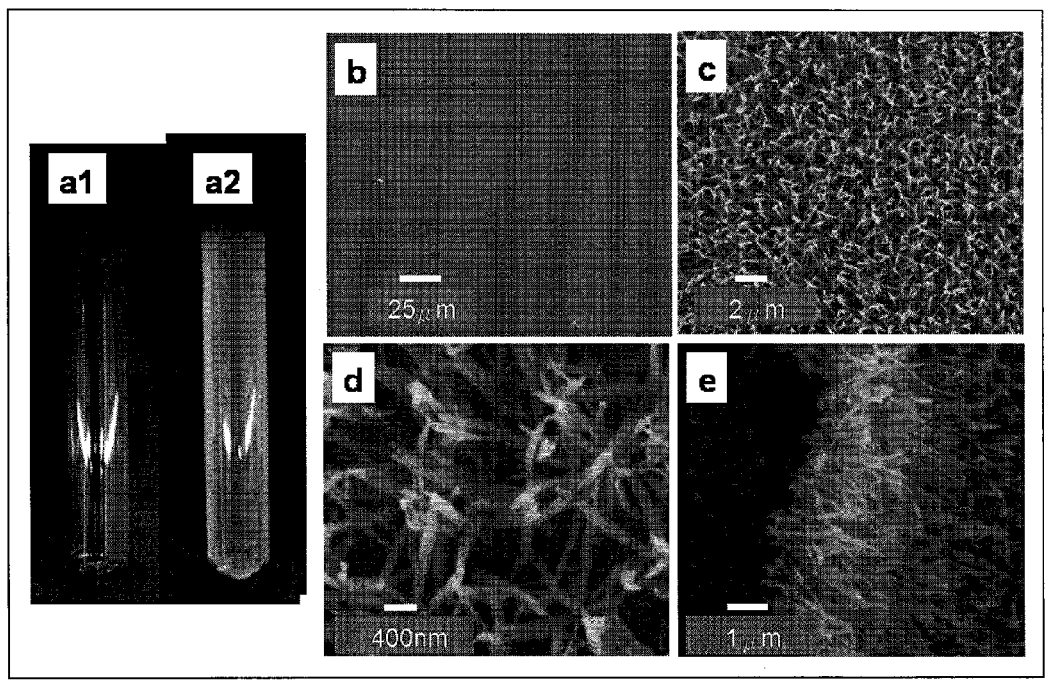
FIG. 35 is a picture of the reactor A in which the inner wall is covered with the composite obtained in Example 27.

The polymer L-PEI obtained in Synthesis Example 1 was added into distilled water, and it was heated to 90° C. to prepare 15 mL of a 4%-aqueous solution. The prepared heated polymer solution was poured into a glass test tube (trade name: AR-GLAS, marketed by DURAN, inside diameter: 2 cm, length: 15 cm) made of soda lime, and it was left to stand for 30 seconds. Then, the heated polymer solution was discharged by decantation. An L-PEI polymer layer was formed in the inner wall of the glass tube by this operation. After adding a silica source solution (ethanol solution of 0.5%-tetramethoxy silane) into the test tube, it was left to stand for 10 minutes. After discharging the solution from the glass tube, the inner wall of the glass tube was washed with ethanol, and it was dried at room temperature. The inner surface of the glass test tube was covered with about 5 mg of the nanostructure composite. Similar to this process, five reactors A were produced. FIG. 35 shows a SEM photograph showing a piece of the reactor A.

[Reaction Between Benzaldehyde and Malononitrile Using a Reactor A]

1.06 g (10 mmol) of benzaldehyde, 0.66 g (10 mmol) of malononitrile, and 10 mL of methanol were added in the reactor A substituted with nitrogen. The reaction solution was heated to 30° C., and it was left to stand for 4 hour while the temperature was maintained. A small amount of the reaction solution was subjected to $^1$H-NMR, and the inversion percentage of the product was measured. It was confirmed that the inversion percentage was 100% based on disappearance of an aldehyde peak of benzaldehyde per 10 ppm.

Example 28

<Repeated Use of the Immobilized Catalyst Type Reactor A>

After washing the reactor A used in Example 27 with methanol, it was dried at room temperature, and it was used in the same reaction as Example 1. After the reaction at 30° C. for 4 hours, the reaction solution was thoroughly discharged, and the inside of the reactor was washed with methanol two times. Then, the reaction solution was added again, and it was reacted at 30° C. for 4 hours. This process was repeated 9 times in all. The inversion percentage of the product was measured each time in the same manner as in Example 27 using $^1$H-NMR. The results are shown in Table 6.

TABLE 6

| | Reaction time | | | | | | | | |
|---|---|---|---|---|---|---|---|---|---|
| | 1 | 2 | 3 | 4 | 5 | 6 | 7 | 8 | 9 |
| Inversion percentage (%) | 100 | 99 | 100 | 100 | 99 | 100 | 100 | 100 | 100 |

Based on the results of Examples 27 and 28, it can be understood that catalytic activity was not decreased even if it was used repeatedly 10 times, and the reaction proceeded quantitatively.

Example 29

<Reaction Between Benzaldehyde Between Malononitrile Using an Immobilized Catalytic Type Plastic Reactor>
[Preparation of a Reactor B, in which the Inner Wall of a Plastic Test Tube is Covered with a Solid Catalyst Containing Polymer/Silica Composite]

Figure 36:
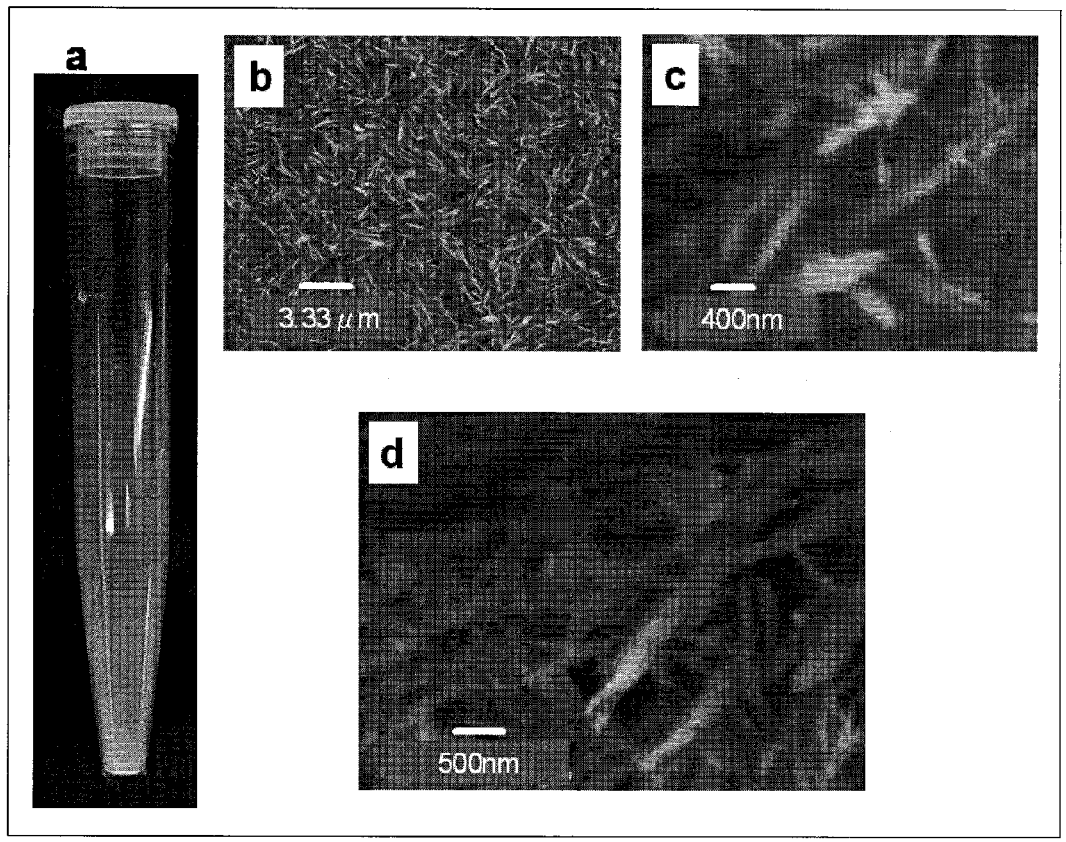
FIG. 36 is a picture of the reactor B in which the inner wall is covered with the composite obtained in Example 29.

The polymer L-PEI obtained in Synthesis Example 1 was added into distilled water, and it was heated to 90° C. to prepare a 4%-aqueous solution. The prepared heated polymer solution was poured into a polystyrene test tube (inside diameter: 2 cm, length: 10 cm, the inside surface thereof had been etched with 85%-sulfuric acid), and it was left to stand for 30 seconds. Then, the heated polymer solution was discharged by decantation. An L-PEI polymer layer was formed in the inner wall of the polystyrene tube by this operation. After the test tube was left to stand at room temperature for 5 minutes, a silica source solution (ethanol solution of 0.5%-tetramethoxy silane) was added into the test tube, and it was left to stand for 10 minutes. After discharging the solution from the test tube, the inner wall of the test tube was washed with ethanol, it was dried at room temperature. The inner surface of the glass test tube was covered with about 5 mg of the nanostructure composite. Similar to this process, five reactors B were produced. FIG. 36 shows a SEM photograph showing a piece of the reactor B.

[Reaction Between Benzaldehyde and Malononitrile Using the Reactor B]

0.63 g of benzaldehyde, 0.40 g of malononitrile, and 7 mL of methanol were added in the reactor B substituted with nitrogen. The reaction solution was heated to 30° C., and it was left to stand for 4 hour while the temperature was maintained. A small amount of the reaction solution was subjected to $^1$H-NMR, and the inversion percentage of the product was measured. It was confirmed that the inversion percentage was 100% based on disappearance of an aldehyde peak of benzaldehyde per 10 ppm.

Example 30

[Reaction Between Cyclohexenone and Nitroethane Using the Reactor A]

0.49 g (5 mmol) of cyclohexenone, 0.75 g (5 mmol) of nitroethane, and 3 mL of ethanol were added in the reactor A. The reaction solution was heated to 30° C. and the reaction proceeded at 30° C. for 2 hours. The reaction solution was taken out to be subjected to $^1$H-NMR to measure the inversion percentage of the product. It was confirmed that a peak derived from CH═CH of cyclohexenone was completely disappeared, and a target nitroethane adduct was produced. The reaction proceeded quantitatively with 100% by mol of an inversion percentage.

Example 31

[Reaction Between Cyclohexanone and Phenylacetonitrile Using the Reactor A]

0.98 g (10 mmol) of cyclohexenone, 1.17 g (10 mmol) of phenylacetonitrile, and 5 mL of ethanol were added in the reactor A. The reaction solution was heated to 30° C. and the reaction proceeded at 30° C. for 2 hours. The reaction solution was taken out to be subjected to $^1$H-NMR to measure the inversion percentage of the product. It was confirmed that a peak derived from CH═CH of cyclohexenone was completely disappeared, and a target nitroethane adduct was produced. The reaction proceeded quantitatively with 100% by mol of an inversion percentage.

Example 32

<Reaction Between Benzaldehyde and Malononitrile Using an Immobilized Catalytic Type Glass Reactor>
[Preparation of a Reactor C, in which the Inner Wall of a Glass Test Tube is Covered with a Solid Catalyst Containing Polymer/Silica Composite]

A reactor C was prepared in a manner identical to that of Example 27, except that the polymer B-PEI obtained in Synthesis Example 2 was used.

[Reaction Between Benzaldehyde and Malononitrile Using the Reactor C]

1.06 g (10 mmol) of benzaldehyde, 0.66 g (10 mmol) of malononitrile, and 10 mL of methanol were added in the reactor C substituted with nitrogen. The reaction solution was heated to 30° C., and it was left to stand for 4 hour while the temperature was maintained. A small amount of the reaction solution was subjected to $^1$H-NMR to measure the inversion percentage of the product. It was confirmed that the inversion percentage was 100% based on disappearance of an aldehyde peak of benzaldehyde per 10 ppm.

Example 33

<Reaction Between Cyclohexenone and Phenylacetonitrile Using the Reactor C>

After washing the reactor C used in Example 32 with methanol, 0.98 g (10 mmol) of cyclohexenone, 1.17 g (10 mmol) of phenylacetonitrile, and 5 mL of ethanol were added in the reactor C. After the solution was reacted at 30° C. for 2 hours, the reaction solution was subjected to $^1$H-NMR, and the inversion percentage of the product was measured. It was confirmed that a peak derived from CH=CH of cyclohexenone was completely disappeared, and a target phenylacetonitrile adduct was produced. The reaction proceeded quantitatively with 100% by mol of an inversion percentage.

Example 34

[Nano-grass Containing Silica Obtained by Removing Polymer Containing a Polyethyleneimine Skeleton]

Figure 37:
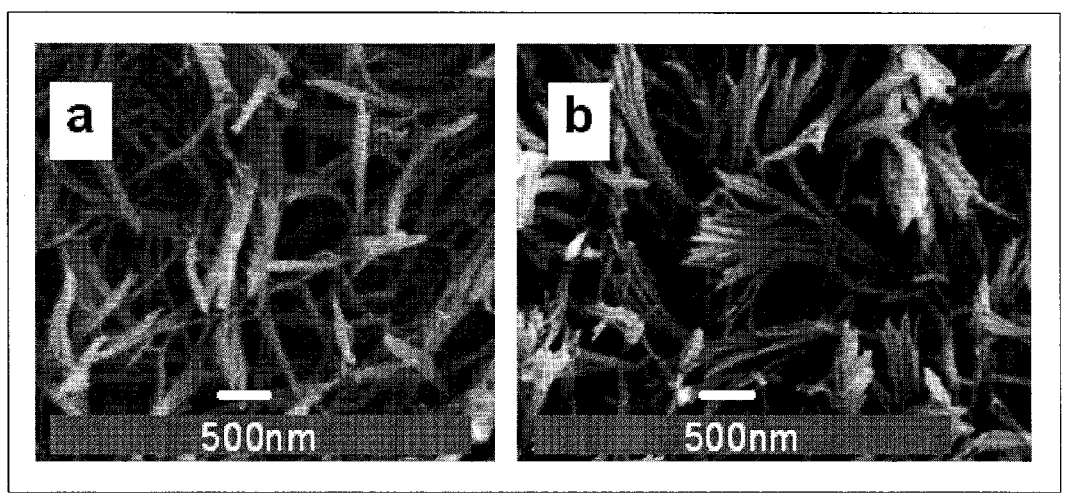
FIG. 37 is a scanning electron microscope photograph of the structure obtained in Example 34.

After immersing a soda lime glass having a size of 3 cm×2 cm into a 4%-L-PEI aqueous solution (80° C.), and it was left to stand for 30 seconds. After taking the glass plate out of the solution, it was left to stand at room temperature for 5 minutes. Then, it was immersed into a mixed solution (MS51/distilled water/IPA=0.5/3/3 in volume) of a silica source, and was left to stand at room temperature for 20 minutes. After taking the plate out of the mixed solution, the surface of the plate was washed with ethanol, it was left to stand at room temperature to dry, and a plate-shaped structure was obtained. The surface of the obtained plate was observed by SEM. It was confirmed that the entire surface of the glass plate was covered with nano-grass containing nano-fibers as a basic unit (FIG. 37a). Then, the glass plate was burned at 500° C. for 2 hours to remove the polymer inside. After that, the surface of the glass plate was observed similarly by SEM. It was confirmed that the nano-grass maintained the structure.

Example 35

[Nano-grass Containing Silica/Titania Composite in which Titania is Deposited on the Surface of Nano-grass Containing Silica]

Figure 38:
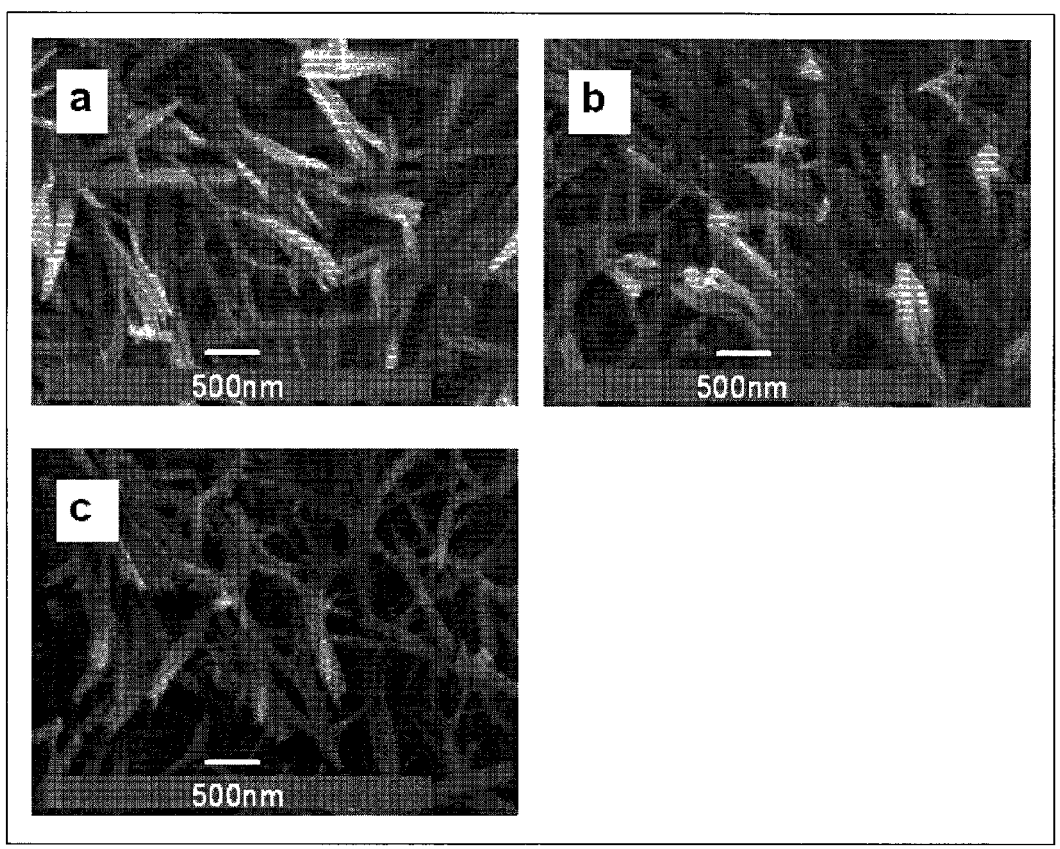
FIGS. 38a to 38b are photographs showing the structure after participating silica and titania, respectively.
FIG. 38c is a photograph showing the structure after burning.

After immersing a soda lime glass having a size of 3 cm×2 cm into a 4%-L-PEI aqueous solution (80° C.), it was left to stand for 30 seconds. After taking the glass plate out of the solution, it was left to stand at room temperature (25° C.) for 5 minutes. Then, it was immersed into a mixed solution (MS51/distilled water/IPA=0.5/3/3 in volume) of a silica source, and left to stand at room temperature for 20 minutes. After taking the plate out of the mixed solution, the surface of the plate was washed with ethanol, it was left to stand at room temperature to dry, and a plate-shaped structure was obtained. The surface of the obtained plate was observed by SEM. It was confirmed that the entire surface of the glass plate was covered with nano-grass containing nano-fibers as a basic unit (FIG. 38a).

Then, the nano-grass containing silica was immersed into 10 ml of a titanium source solution (TC315/1.0 M ammonia solution=1/120 in volume) for 60 minutes. When the surface of the obtained plate was observed by SEM, it was confirmed that the surface of the glass plate was, covered with nano-grass (FIG. 38b).

Figure 39:
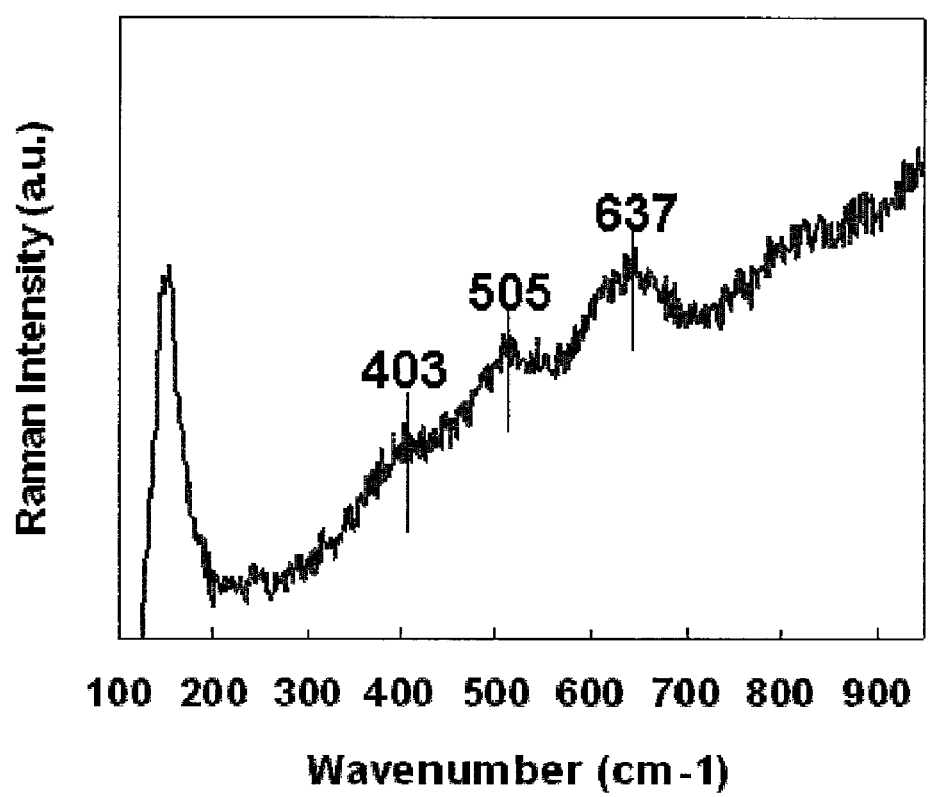
FIG. 39 is a raman spectrum of the structure after burning in Example 35.

Then, the glass plate covered with the composite containing silica and titania was burned at 500° C. for 3 hours to produce a structure. When the surface of the glass plate was observed, it was confirmed that the shape of the nanostructure was maintained (FIG. 38c). Based on the raman spectrum (marketed by Renishaw, in Via Reflex Ramascope), the presence of anatase type titanium oxide was confirmed (FIG. 39). As a result of the fluorescent X-ray analysis (marketed by Rigaku Corporation, ZSX100e), the composition ratio (mass ratio) between silica and titania in the structure was 95/5.

Example 36

[Nano-grass Containing Silica/Tungsten Oxide Composite in which Tungsten Oxide is Deposited on the Surface of the Nano-grass Containing Silica]

The structure containing the surface covered with the nano-grass containing silica, which was obtained in Example 35, was immersed into 10 mL of tungsten chloride ethanol solution (0.01 mol/L) for 60 minutes. After taking the glass plate out of the solution, the surface of the glass plate was washed with ethanol three times, and dried. Then, the glass plate covered with the composite was burned at 500° C. for 3 hours. As a result of the fluorescent X-ray analysis, the composition ratio (mass ratio) between silica and titania in the structure was 85/15.

INDUSTRIAL APPLICABILITY

In the nanostructure composite-covered structure of the present invention, a composite, which contains a polymer and metal oxide such as silica, and titania, is formed on the surface of the solid substrate, which has any shape and is made of metal, glass, inorganic metal oxide, plastics, cellulose, etc. The nanostructure composite uses the polymer layer as a template, which is formed on the substrate by contacting a solution of the polymer having a polyethyelenimine skeleton and the solid substrate. Therefore, it is easy to select and cover partially the surface of the solid substrate. In spite of the size of the structure, it is possible to form the nanostructure composite on the surface of the structure. Therefore, a surface area per area unit (specific surface area) is extremely large. Since the nanostructure composite on the surface of the solid substrate has basically the outermost made of metal oxide, the nanostructure composite-covered structure of the present invention can be preferably used in applied technology fields relating to metal oxide. In addition, since it is easy to incorporate various functional parts, such as metal ions, metal nano-particles, and organic pigment molecules, into the nanostructure composite, the resulting nanostructure composite can be used in various devices utilizing these functions. Specifically, the nanostructure composite-covered structure of the present invention can be used as micro reactors having a catalyst, enzyme fixing devices, separation and refinement devices, chips, sensors, devices for producing photonic devices, devices for producing insulators or semiconductors, devices for producing sterilization/sterilization devices, devices for producing various micro cells, devices for producing super-hydrophilic/super-hydrophobic boundaries, liquid crystal display devices, etc. In addition, it is also possible to apply it in various industrial fields, for example, to improve heat resistance, fire resistance, abrasion resistance, solvent resistance of plastics, to adjust refraction index at the surface of the substrate. Additionally, the production process uses basically simple manner, such as dipping, and any composite post handlings are not necessary. Therefore, the production process of the present invention is very useful.

In particular, since the structure which is produced by the present invention has a composite having an extremely high specific surface area on the inner wall of a container or a tube, and the polymer having a polyethyleneimine skeleton, which works as a catalyst, is caged in the composite, it is possible to preferably use the structure as an immobilized catalyst type reactor, for example, in carbon-carbon bond reactions, which proceed in the presence of a basic catalyst. Such immobilized catalyst type reactors can refresh manufacturing processes for useful compounds in the chemical industry, intermediates for medical purposes, etc. In particular, it can be thought that such reactors can make the total synthesis process simple, and improve remarkably catalyst efficiency, and thereby greatly contribute to decreasing environmental load.

In addition, when the nanostructure composite-covered structure of the present invention is burned, it is possible to produce a film, which contains metal oxide and has a complex structure, on the surface of the solid substrate. It is also possible to contain plural metals in such a film containing metal oxide. The film has superior durability. In particular, when titanium is contained as the metal source, since it has a large specific surface area, it is possible to effectively exert photocatalytic functions, which titanium oxide generally has.

The invention claimed is:

1. A process for producing a nanostructure composite-covered structure including:
    a step (I-1) in which a solid substrate (X), which is a substrate selected from the group consisting of glass substrates, metal substrates, metal oxide substrates, glass substrates having an etched surface, resin substrates, resin substrates having a surface treated by plasma, resin subtrates having a surface treated by ozone, and resin substrates having a surface treated by sulfuric acid, and resin substrates having a surface treated by alkali, is immersed into a solution containing a polymer (A) having a polyethyleneimine skeleton (a), the solid substrate (X) is taken out of the solution, and a polymer layer is formed on the surface of the solid substrate (X); and
    a step (I-2) in which the solid substrate (X) having the polymer layer obtained in the step (I-1) is contacted with a source solution (B') of metal oxide to deposit metal oxide (B) in the polymer layer on the surface of the solid substrate (X) and to form on the solid substrate a nanostructure composite (Y) containing the polymer (A) and the metal oxide (B),
    wherein the nanostructure composite (Y) is an aggregate containing a composite nano-fiber (y1), a composite nano-particle (y2), or a composite nano-film (y3) as a basic unit of the nanostructure composite (Y),
    wherein the composite nano-fiber (y1) has a thickness in a range of from 10 to 100 nm and a length in a range of from 50 nm to 10 μm, and
    wherein the composite nano-film (y3) forms a nano-film on the surface of the solid substrate (X), and the film forms a maze containing plural boundaries over the entire surface of the solid substrate (X), and a height of boundaries is in a range of from 100 nm to 2,000 nm, and an interval between the boundaries is in a range of from 200 nm to 5 μm.

2. A nanostructure composite-covered structure, comprising:
    a solid substrate (X); and
    a nanostructure composite (Y),
    wherein a surface of the solid substrate (X) is covered with the nanostructure composite (Y), and
    wherein the solid substrate (X) is a substrate selected from the group consisting of glass substrates, metal substrates, metal oxide substrates, glass substrates having an etched surface, resin substrates, resin substrates having a surface treated by plasma, resin substrates having a surface treated by ozone, and resin substrates having a surface treated by sulfuric acid, and resin substrates having a surface treated by alkali,
    wherein the nanostructure composite (Y) is an aggregate containing a polymer (A) having a polyethyleneimine skeleton (a) and metal oxide (B),
    wherein the aggregate contains a composite nano-fiber (y1), a composite nano-particle (y2), or a composite nano-film (y3), as a basic unit of the nanostructure composite (Y),
    wherein the composite nano-fiber (y1) has a thickness in a range of from 10 to 100 nm and a length in a range of from 50 nm to 10 μm, and
    wherein the composite nano-film (y3) forms a nano-film on the surface of the solid substrate (X), and the film forms a maze containing plural boundaries over the entire surface of the solid substrate (X), and a height of boundaries is in a range of from 100 nm to 2,000 nm, and an interval between the boundaries is in a range of from 200 nm to 5 μm.

3. A nanostructure composite-covered structure according to claim 2, wherein a number of kinds of a metal source in the metal oxide (B) is two or more.

4. A nanostructure composite-covered structure according to claim 2, wherein the nanostructure composite (Y) further contains a metal ion (C), metal nano-particles (D), or an organic pigment molecule (E).

5. A nanostructure composite-covered structure according to claim 2, wherein the metal oxide (B) contains silica or titania.

6. An immobilized catalyst reactor for an addition reaction or a condensation reaction to form a carbon-carbon bond using a compound (x1) having a unsaturated bond and a compound (x2) having an active methylene or an active methine, the reactor comprising:
    a solid substrate (X) which is at least part of the catalyst reactor; and
    a nanostructure composite (Y) which is an aggregate which contains a composite nano-fiber (y1), a composite nano-particle (y2), or a composite nano-film (y3) as a basic unit of the nanostructure composite (Y) and which contains a polymer (A) having a polyethyleneimine skeleton (a) and metal oxide (B),
    wherein the nanostructure composite (Y) is immobilized on the solid substrate (X), and
    wherein the solid substrate (X) is a substrate selected from the group consisting of glass substrates, metal substrates, metal oxide substrates, glass substrates having an etched surface, resin substrates, resin substrates having a surface treated by plasma, resin substrates having a surface treated by ozone, and resin substrates having a surface treated by sulfuric acid, and resin substrates having a surface treated by alkali, wherein the nanostructure composite (Y) is an aggregate containing a polymer (A) having a polyethyleneimine skeleton (a) and metal oxide (B), wherein the aggregate contains a composite nano-fiber (y1), a composite nano-particle (y2), or a composite nano-film (y3), as a basic unit of the nanostructure composite (Y), wherein the composite nano-fiber (y1) has a thickness in a range of from 10 to 100 nm and a length in a range of from 50 nm to 10 μm, and wherein the composite nano-film (y3) forms a nano-film on the surface of the solid substrate (X), and the film forms a maze containing plural boundaries over the entire surface of the solid substrate (X), and a height of boundaries is in a range of from 100 nm to 2,000 nm, and an interval between the boundaries is in a range of from 200 nm to 5 μm.

* * * * *